(12) United States Patent
Apacible et al.

(10) Patent No.: US 7,831,679 B2
(45) Date of Patent: Nov. 9, 2010

(54) GUIDING SENSING AND PREFERENCES FOR CONTEXT-SENSITIVE SERVICES

(75) Inventors: Johnson T. Apacible, Mercer Island, WA (US); Eric J. Horvitz, Kirkland, WA (US); Murugesan S. Subramani, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1253 days.

(21) Appl. No.: 11/172,529

(22) Filed: Jun. 29, 2005

(65) Prior Publication Data

US 2006/0010206 A1   Jan. 12, 2006

Related U.S. Application Data

(63) Continuation-in-part of application No. 10/881,061, filed on Jun. 30, 2004.

(60) Provisional application No. 60/511,533, filed on Oct. 15, 2003.

(51) Int. Cl.
*G06F 15/16* (2006.01)

(52) U.S. Cl. ............... 709/209; 340/501; 340/825.22; 340/870.16

(58) Field of Classification Search ............ 379/32.01, 379/33, 38, 47, 49, 90.01, 92.03, 93.02, 93.11, 379/100.03, 100.04, 100.06, 201.01, 201.02; 340/350, 825.49, 870.11, 501, 500, 502, 340/540, 825.22, 870.16; 709/206, 207, 709/208, 209
See application file for complete search history.

(56) References Cited

U.S. PATENT DOCUMENTS

| | | |
|---|---|---|
| 5,329,578 A | 7/1994 | Brennan et al. |
| 5,473,672 A | 12/1995 | Khalid |
| 5,493,692 A | 2/1996 | Theimer et al. |
| 5,544,321 A | 8/1996 | Theimer et al. |
| 5,555,376 A | 9/1996 | Theimer et al. |
| 5,603,054 A | 2/1997 | Theimer et al. |

(Continued)

FOREIGN PATENT DOCUMENTS

CN          1115146 A      1/1996

(Continued)

OTHER PUBLICATIONS

Andy Harter, et al., A Distributed Location System for the Active Office, IEEE Network, 1994, pp. 62-70.

(Continued)

*Primary Examiner*—Binh K Tieu
(74) *Attorney, Agent, or Firm*—Wolf, Greenfield & Sacks, P.C.

(57) ABSTRACT

A sensing and context management architecture that can detect that a user is interacting with a given device and in an associated context, and in response thereto, manages device processes as the user moves from device to device, location to location, and/or context to context. The invention comprises a system that facilitates management of a user situation or context. A sensing component is provided that senses a context of a user by way of one or more sensors and/or a particular device with which the user is interacting in the context, for example, and a management component that manages the device and/or one or more services in the context according to rules or inferences user preferences, sensed observations, and user input data.

20 Claims, 72 Drawing Sheets

U.S. PATENT DOCUMENTS

| | | | |
|---|---|---|---|
| 5,611,050 | A | 3/1997 | Theimer et al. |
| 5,812,865 | A | 9/1998 | Theimer et al. |
| 5,857,108 | A * | 1/1999 | Hong .................. 710/260 |
| 6,353,398 | B1 | 3/2002 | Amin et al. |
| 6,466,232 | B1 | 10/2002 | Newell et al. |
| 6,513,046 | B1 | 1/2003 | Abbott, III et al. |
| 6,519,335 | B1 | 2/2003 | Bushnell |
| 6,549,915 | B2 | 4/2003 | Abbott, III et al. |
| 6,672,506 | B2 | 1/2004 | Swartz et al. |
| 6,741,188 | B1 | 5/2004 | Miller et al. |
| 6,747,675 | B1 | 6/2004 | Abbott et al. |
| D494,584 | S | 8/2004 | Schlieffers et al. |
| 6,791,580 | B1 | 9/2004 | Abbott et al. |
| 6,796,505 | B2 | 9/2004 | Pellaumail et al. |
| 6,801,223 | B1 | 10/2004 | Abbott et al. |
| 6,812,937 | B1 | 11/2004 | Abbott et al. |
| 6,837,436 | B2 | 1/2005 | Swartz et al. |
| 6,842,877 | B2 | 1/2005 | Robarts et al. |
| 7,010,501 | B1 | 3/2006 | Roslak et al. |
| 7,040,541 | B2 | 5/2006 | Swartz et al. |
| 7,063,263 | B2 | 6/2006 | Swartz et al. |
| 7,171,378 | B2 | 1/2007 | Petrovich et al. |
| 7,195,157 | B2 | 3/2007 | Swartz et al. |
| 7,385,501 | B2 | 6/2008 | Miller et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0154476 | A1 | 8/2003 | Abbott, III et al. |
| 2004/0017300 | A1 * | 1/2004 | Kotzin et al. .......... 340/870.11 |
| 2004/0128359 | A1 * | 7/2004 | Horvitz et al. ............ 709/207 |
| 2004/0225654 | A1 * | 11/2004 | Banavar et al. ................ 707/6 |
| 2005/0034078 | A1 | 2/2005 | Abbott et al. |
| 2005/0266858 | A1 | 12/2005 | Miller et al. |
| 2005/0272442 | A1 | 12/2005 | Miller et al. |
| 2006/0010206 | A1 | 1/2006 | Apacible et al. |
| 2006/0019676 | A1 | 1/2006 | Miller et al. |
| 2006/0281976 | A1 * | 12/2006 | Juang et al. ................. 600/300 |
| 2007/0214228 | A1 * | 9/2007 | Horvitz et al. ............ 709/207 |
| 2008/0090591 | A1 | 4/2008 | Miller et al. |
| 2008/0091537 | A1 | 4/2008 | Miller et al. |
| 2008/0161018 | A1 | 7/2008 | Miller et al. |
| 2008/0222565 | A1 * | 9/2008 | Taylor et al. ................ 715/810 |

FOREIGN PATENT DOCUMENTS

| | | |
|---|---|---|
| WO | 9800787 | 1/1998 |
| WO | WO-9800787 A1 | 1/1998 |
| WO | WO-0169387 A2 | 9/2001 |
| WO | WO-02/075495 A2 | 9/2002 |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, in Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, August 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

Nitin Sawhney, et al., Nomadic Radio: Scaleable and Contextual Notification for Wearable Audio Messaging, Proceedings of CHI'99, ACM SIGCHI Conference on Human Factors in Computing Systems, May 15-20, Pittsburgh, PA, 1999, 8 pages.

John C. Tang, et al., ConNexus to Awarenex: Extending Awareness to Mobile Users, SIGCHI'01, Mar. 31-Apr. 4, 2001, Seattle, WA, 2001, 8 pages.

Daniel C. MacFarlane, Coordinating the Interruption of People in Human-Computer Interaction, Human Computer Interaction—INTERACT '99, IOS Press, IFIP TC.13, 1999, pp. 295-303.

James M. Hudson, et al., I'd Be Overwhelmed, But It's Just One More Thing To Do, Availability and Interruption in Research Management, CHI 2002, Apr. 20-25, 2002, Minneapolis, MN, 2002 ACM vol. 4, Issue 1, pp. 97-104.

Anind Dey, et al., Distributed Mediation of Ambiguous Context in Aware Environments, UIST '02, Oct. 27-30, 2002, Paris, France, 2002 ACM vol. 4, Issue 2, pp. 121-130

Eric Horvitz, et al., Learning and Reasoning About Interruption, ICMI '03, Nov. 5-7, 2003, Vancouver, Canada, ACM, pp. 20-27.

European Search Report dated Sep. 27, 2006, mailed Oct. 10, 2006, for European Patent Application Serial No. 04 019 099.3—2414, 2 pages.

OA Dated Nov. 7, 2008 for CN Application Serial No. 200410085548.7, 29 pages.

Bahl et al., "RADAR: an in-building RF-based user location and tracking system," Institute of Electrical and Electronics Engineers, Inc., Mar. 2000.

Horvitz et al., "Coordinate: Probabilistic Forecasting of Presence and Availability," *Proc. $18^{th}$ Conf. on Uncertainty and Artificial Intelligence*, Edmonton, Alberta, Jul. 2002, Morgan Kaufmann Publishers, pp. 224-233.

Toyama et al., "Bayesian Modality Fusion: Probabilistic Integration of Multiple Vision Algorithms for Head Tracking," *Proc. ACCV '00, Fourth Asian Conference on Computer Vision*, Jan. 2000, Taipei, Taiwan, http://research.microsoft.com/en-us/um/people/horvitz/modfusion.htm, downloaded Mar. 9, 2010.

* cited by examiner

Call Reschedule

Looking at both of your calendars, here are a few possible times for rescheduling the conversation:

○ Today 2:45 PM–3:00 PM
○ Today 3:00 PM–3:15 PM

Call Details

Reason for call:
Would like to talk about the Bestcom preference schema.

Needs and Resources

☑ I would like to share screens during the call

Please review this before call: _Documents for review_

Please have this available during the call: _Documents requested_

Schedule

Cancel

<< Details

FIG. 21

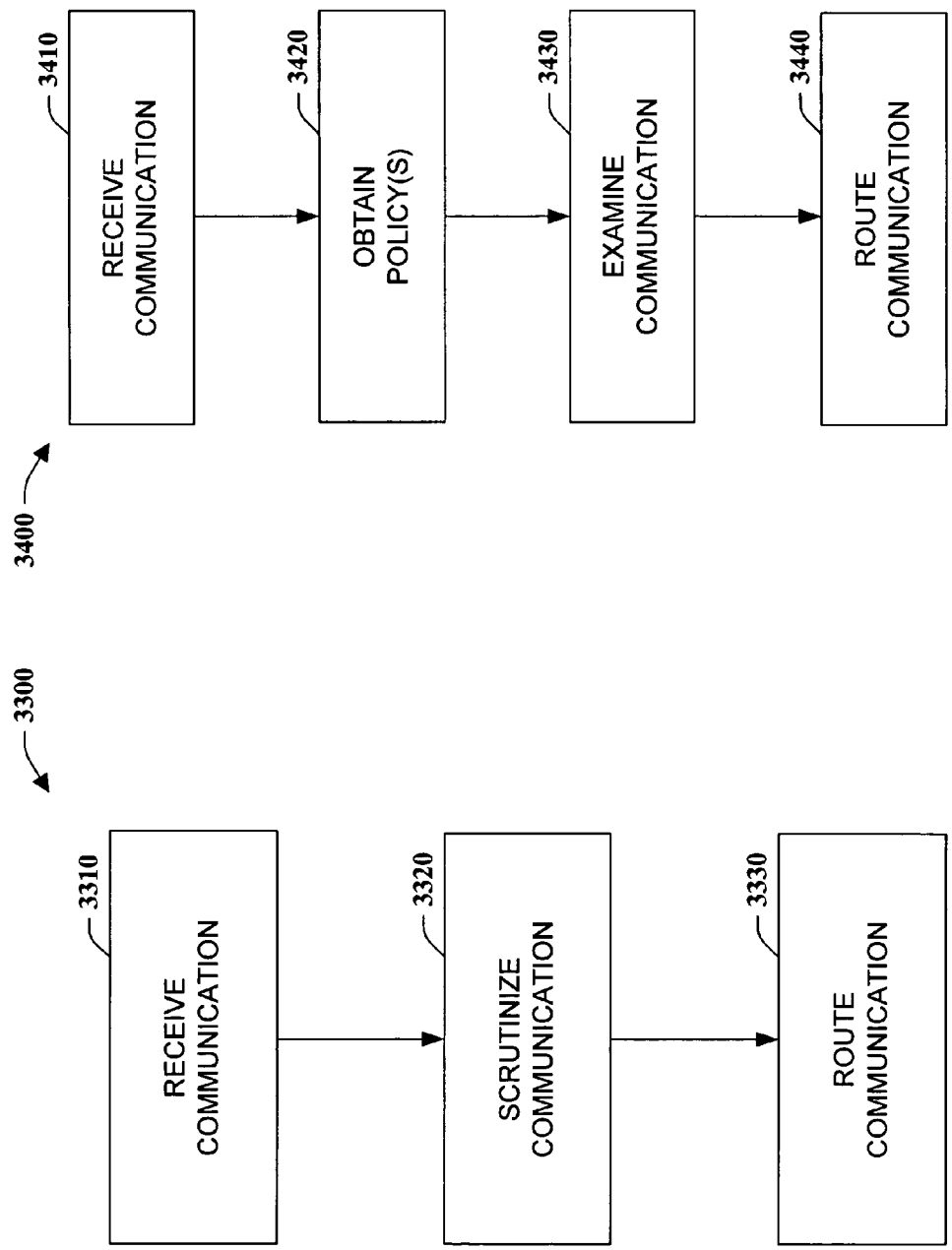

FIG. 50

GUIDING SENSING AND PREFERENCES FOR CONTEXT-SENSITIVE SERVICES

CROSS-REFERENCE TO RELATED APPLICATIONS

This application is a Continuation-in-Part of pending U.S. patent application Ser. No. 10/881,061 entitled "DESIGNS, INTERFACES, AND POLICIES FOR SYSTEMS THAT ENHANCE COMMUNICATION AND MINIMIZE DISRUPTION BY ENCODING PREFERENCES AND SITUATIONS" and filed Jun. 30, 2004, which claims the benefit of U.S. Provisional Patent Application Ser. No. 60/511,533 filed on Oct. 15, 2003 and entitled "SYSTEMS AND METHODS THAT UTILIZE DYNAMIC DECISION MAKING TO PROVIDE A BEST MEANS INTERPERSONAL COMMUNICATION SERVICE." The entireties of these applications are incorporated herein by reference.

BACKGROUND

Despite the common use of online calendar systems for storing reminders and creating contracts with others about meeting times and locations, a great deal of collaboration is based on opportunistic communication arranged under uncertainty. Such informal coordination often hinges on peoples' shared intuitions about current and future locations and activities of friends and colleagues. Even with the use of online group calendar systems, for example, people can be challenged with understanding how available others are for collaboration. Research on user modeling over the last decade has focused largely on applications that center on reasoning about a user's current activities, intentions, and goals. However, knowing a user's status does not necessarily aid future or desired collaboration between communicating parties.

In general, people seeking to communicate with others make decisions about best timing and channel of communication(s). They can select and execute a communication modality or set of modalities based on their own needs and preferences, as well as on their knowledge and intuitions about preferences and context of a person being contacted. However, attempts to communicate are often suboptimal for a contactor (e.g., sender, initiator . . . ) and a contactee (e.g., receiver, recipient . . . ). For example, attempts by a contactor to establish real-time telephony may interrupt the contactee at an inconvenient time for conversing, or frustrate the contactor with a voice message capture that may lead to costly delays for both the contactor and contactee. Contactees can employ multiple techniques to selectively filter incoming communications. Some people might employ well-trained assistants, while others rely on manual screening of incoming telephone calls, voice messages, and batches of email messages. However, limiting or deferring real-time communications to minimize disruptions and maximize privacy is only a piece of the challenge associated with communications management.

By way of example, conventional e-mail systems can be susceptible to communications and message coordination difficulties between parties. For example, a contactee may be situated in a remote region, wherein voice communications via telephone or other medium is not available. The contactee may have indicated to contactors (e.g., fellow workers, supervisors and loved ones) that e-mail provides the most reliable manner in which the contactee will receive a message. Although, conventional e-mail systems can indicate that a transmitted message has been received and opened by the contactee and can include a predetermined/pre-configured reply such as "On vacation for one week" or "Out of the office this afternoon," there is currently no automatically generated indication provided to the contactor when and/or how long it will be before the contactee can respond. Thus, if an emergency were to occur or an important message needed to get through, contactors can only guess when the contactee will potentially receive the message and hope that the message is received and responded to in a timely manner. Similar difficulties arise when attempting to schedule meetings when it is difficult to ascertain whether a party can attend a meeting at some time.

As is common in everyday situations, messages are transmitted with varying degrees of urgency, importance, and priority. Often, key meetings need to be arranged at a moments notice in order to address important business or personal issues. Consequently, one or more messages can be directed to one or more parties to indicate the urgency of the meeting. In addition, messages are often communicated over multiple communications modalities in order to attempt to reach potential parties. For example, a business manager may send e-mails to key parties and follow the e-mail with phone calls, pages or faxes to the parties, wherein voice mails are typically left for non-answering parties. Unfortunately, the business manager is often unsure whether non-responding parties have received the messages and unable to determine with any degree of confidence when all parties may be available to meet.

Contactees also may wish to have richer channels or multiple channels of communication than the particular modality selected by a contacting party. For example, a contacting party may send email when the recipient would have much preferred real-time instant messaging or telephony. Someone working frantically on a document under a deadline may want editorial comments to come via real-time communications, even when they are away from their desktop, except in a few select settings, where they would like to receive an electronic message, coupled with a real-time alert about the attempted contact. Depending on the caller and situation, contactees can often desire to be reached in real time rather than be missed by a caller. With current ad hoc communications, it is common for users attempting to converse with one another to note frustration about nonconvergent attempts at communication.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention is a sensing and context management architecture that can detect that a user is active on a given device, and in response thereto, manages device processes as the user moves from device to device, location to location, context to context, and/or even within a single context. Accordingly, the invention disclosed and claimed herein, in one aspect thereof, comprises a system that facilitates management of a user context. The system includes a sensing component that senses a user context of a user, and a management component that determines a device for user interaction in the user context.

In one example, if a user is detected on a computer, a rule or policy can be invoked that routes a telephone call to the nearest phone. Another rule could be invoked such that if the user is interacting with that computer, then the call is not routed to the nearest phone, or not routed right away, but after a predetermined amount of time.

The rules (or policies) can be employed such that given a number of different input parameters (e.g., type of device, user, user interaction with the device, user preferences, . . . ), the rules are processed to affect the way the sensing and context-awareness architecture functions. The rules can be stored and executed on at least one of the client device and the server. Machine information can be used to invoke preferences as how that machine will operate and interact with a given user.

The context architecture can be used to exclude other user such that only a given user will be allowed to interact with devices of the one or more contexts. In one example, the system powers up and down devices based on where the user could be heading and what the user is currently doing on a set of machines within a context.

The sensing component is sufficiently robust to sense not only user input interactions of a device (e.g., via keyboard, mouse, microphone, touch screen, . . . ), but also via sensors of another device that the user is not interacting with. For example, if the user is working on an existing master desktop computer, but gets up, a pocket device that is recognized by the context architecture as being alive on the network, but a secondary device and employs an accelerometer, for example, can be sensed to cause the master desktop computer to enter an idle phase, or even logoff and power down.

The invention also facilitates determining which set of software and sensor cluster can be used at a given time. Additionally, the system converges on a set of sensing devices and applications rules based on policy such as the last active, which has the most signal strength, for example, and process ties according what sensors provide the best cost for the given situation.

In another aspect, a methodology of establishing which of a set of sensors or set of policies is utilized for taking automated actions is provided. This can be by establishing relevance of one or more of the set of sensors or devices in near proximity or across multiple locations, based on the observations by or status of the one or more of the set of sensors. The methodology can also include optionally communicating the observations by or status of any one or more of the set of sensors, the observations by or status of the one or more of the set of sensors includes findings, policies, and local or global decisions about the usage of sensors and policies among multiple components of a system.

In yet another aspect thereof, a machine learning and reasoning component is provided that employs, logical rules or inference, and/or probabilistic/statistical analyses to prognose or infer an action that a user desires to be automatically performed.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 21 illustrates a second rescheduling user interface that provides a reason for rescheduling the communication.

FIG. 33 illustrates an exemplary communication methodology.

FIG. 34 illustrates an exemplary basic communication methodology.

FIGS. 37-57 illustrate exemplary user interfaces (UIs) that can be employed in accordance with aspects thereof.

DETAILED DESCRIPTION

The innovation relates to systems and methods that automate and semi automate communication handling amongst parties (e.g., contactors and contactees). The systems and methods consider communication preferences, state of the contactees and the contactors, and cost of interruption to enhance interpersonal communication and maximize communication value. The foregoing provides for improvements over conventional systems via a centrality of assessing and reasoning about rich representations of preferences about communications and leveraging principles of cost-benefit analysis and decision theory under uncertainty for communication handling actions.

It is to be appreciated that as utilized herein, the term "component" is intended to refer to a computer-related entity, either hardware, a combination of hardware and software, software, or software in execution. For example, a component can be, but is not limited to being, a process running on a processor, a processor, an object, an executable, a thread of execution, a program, and/or a computer. As an example, both an application running on a server and the server can be a computer component. One or more components can reside within a process and/or thread of execution and a component can be localized on one computer and/or distributed between two or more computers.

In addition, as utilized herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources. Various inferencing schemes and/or systems (e.g., support vector machines, probabilistic graphical models, such as Bayesian networks, influence diagrams, and neural networks) can be employed in connection with performing automatic and/or inferred action in connection with the subject invention.

Figure 1:
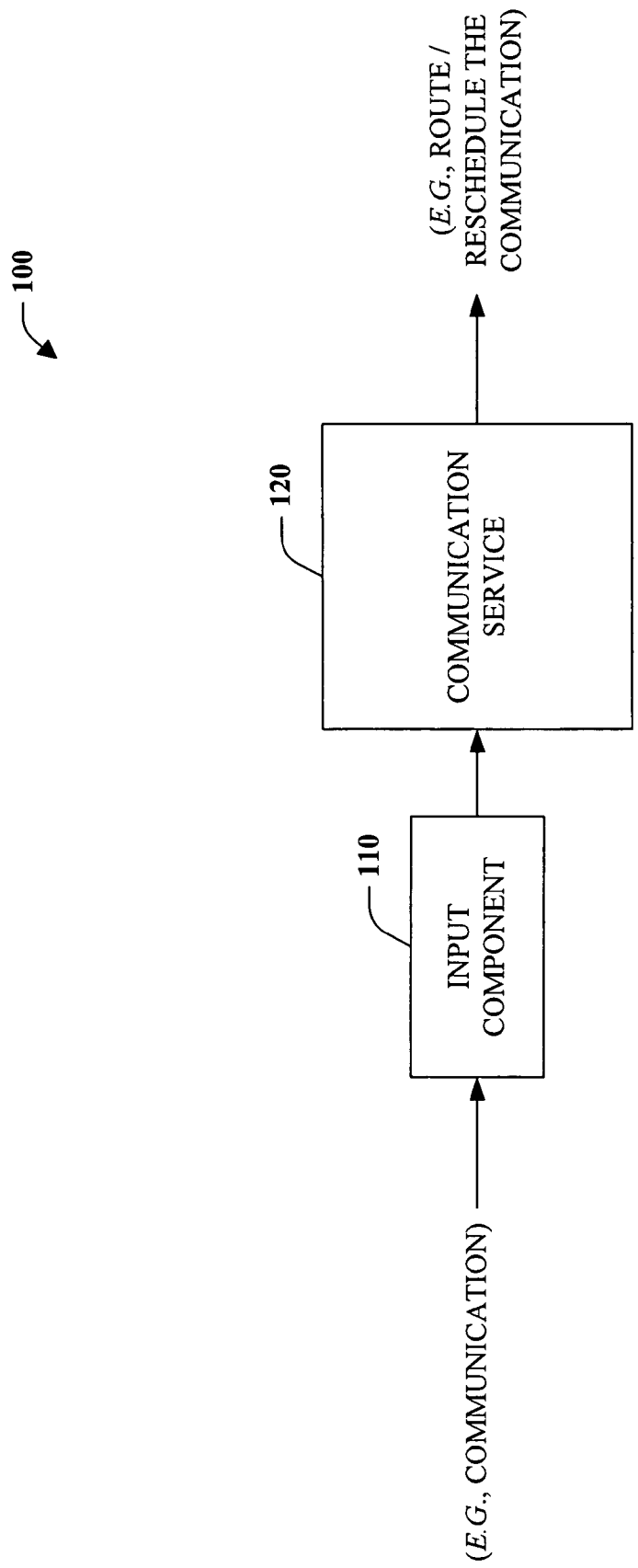
FIG. 1 illustrates a system that manages communications between communication systems.

FIG. 1 illustrates an exemplary system 100 that manages communication between entities. The system 100 comprises an input component 110 and a communication service 120. The input component 110 can be utilized to receive a communication such as, for example, a telephone call. For example, the input component 110 can interface with a private telephone switchboard, such as, for example, a private branch exchange (PBX), and handle incoming and/or outgoing telephone calls. It is to be appreciated that this interface can be software and/or hardware based, hardwired and/or wireless, reside local and/or remote to the communication transmitting system, and/or support essentially any known communication protocol. Upon receiving the communication, the input component 110 can serially and/or concurrently convey the communication to the communication service 120, wherein such conveyance can be a transmission(s) from the input component 110 and/or a retrieval(s) by the communication service 120.

The communication service 120 can analyze and/or utilize an analysis of the communication to determine a conveyance path to a recipient. For example, the communication can include information indicative of its content, a sender, a recipient, an ability of the communication to be delayed, a time of day, a day of week, an importance, etc. Such information can be obtained by the communication component 120 and utilized to facilitate determining the communication path, including, for example, conveying the communication to the recipient and/or another recipient in a manner consonant with the sender's desired mode of communication (e.g., sending a telephone call to the recipient's telephone) and/or an alternative mode (e.g., emailing the recipient in response to a telephone call), a delayed manner (e.g., retrying and rescheduling for a later transmission), and/or rejecting the communication. In addition, information related to the sender can be utilized to facilitate determining a suitable path. For example, the sender can be associated with a priority or other information indicating a relative importance of the sender and/or the message to the recipient. As described in detail below, policies, rules and/or intelligence (e.g., probabilities, inferences . . . ) can be additionally and/or alternatively utilized to facilitate this determination and/or any subsequent action.

Upon determining a message conveyance scheme, the communication can be routed by the communication service 120. As note above, such conveyance can include providing the communication to the recipient and/or other recipient(s), delaying the conveyance, and/or denying the communication. Likewise, the recipient's response, if any, can be received by the input component 110 and routed by the communication service 120 based on information similar to that noted above, and/or other information. In other aspects, a plurality of communications via one or more disparate senders can be serially and/or concurrently received by the input component 110. Such communications can be handled serially and/or in parallel. In addition, such communications can be temporarily stored (e.g., in a buffer), prioritized and/or handled based on the prioritization and/or other criteria.

It is to be appreciated that the system 100 can provide various aspects that enhance interpersonal communication. For example, system 100 can route communications based at least on a cost of interruption. In addition, encoding preferences about which callers should be rescheduled versus put through to the call recipient based on the cost of interruption and a cost of deferring the call can be utilized. Such preferences can further consider whether there is a mutually available time slot for rescheduling the call within a defined time horizon and/or whether there is a mutually available time slot by comparing calendars while a call is being established.

Regarding rescheduling, the system 100 can bypass rescheduling a call during call initiation, for example, when there will not be time for a rescheduled call. This can be determined based on a real-time analysis of calendars and consideration about preferences on an allowed time horizon until communication occurs. In addition, the system 100 can utilize an automated rescheduling operation that pushes the timing out until the call recipient has enough time to be alerted about the rescheduled call. The system 100 can employ a policy on a minimal time from now to reschedule the call as specified by the recipient of the call in a profile on rescheduling, wherein the time is a function of a user's sensed and/or known current location and/or activity. Moreover, the deferral of the alert can be achieved by allowing the call recipient to specify a probability that they will be informed about the rescheduled call before the call via probabilistic inference.

In another aspect of the invention, the system 100 can employ a tool that summarizes all or a subset of (e.g., a current) policy can be utilized. It is to be appreciated that the policy can define information such as "what will happen now." The tool can further specify entry points into making changes. The system 100 can further include one or more components that reveal to users an assumption about their own current busy-ness and why; conveys a summary associated with handling an incoming call; provides a policy and rationale associated with handling the call; and conveys the summary, policy and rationale to a call recipient's email.

In still another aspect of the invention, the system 100 can include a user interface that enables a user to define different levels of interruptability. For example, the user interface can allows the user to build Boolean combinations of meeting properties, desktop activity, and sensed events like conversation detection and visual pose detection. Another user interface can provide a time palette that defines default interruptabilities that work along with Boolean combinations of sensed features to provide a level of interruptability, either making one a default background and the other a foreground that dominates the default background when it is actively matching on a Boolean. This user interface can further allow the user to define meta-rules about the combination of background time-based interruptability and activity based interruptability.

In yet another aspect of the invention, the system 100 can employ a component that facilitates user inheritance from an associated group with the highest call priority and utilizes dynamic groups for assigning users call priorities, based on calendar, activities, and communications. Caller privileges can be granted by the call recipient to allow the caller to break through even when the recipient is busy. These privileges can further specify that the caller and call recipient receive a notification indicating the breakthrough occurred and/or a means of reimbursement for the breakthrough. Such means of reimbursement can include a real-time agreement or a longer-term policy; a fee; and a "breakthrough when busy" currency that is utilized by recipients when they desire to contact the caller. It is to be appreciated that the currency can be a token, which can be exchanged for money or utilized to breakthrough to the caller.

Figure 2:
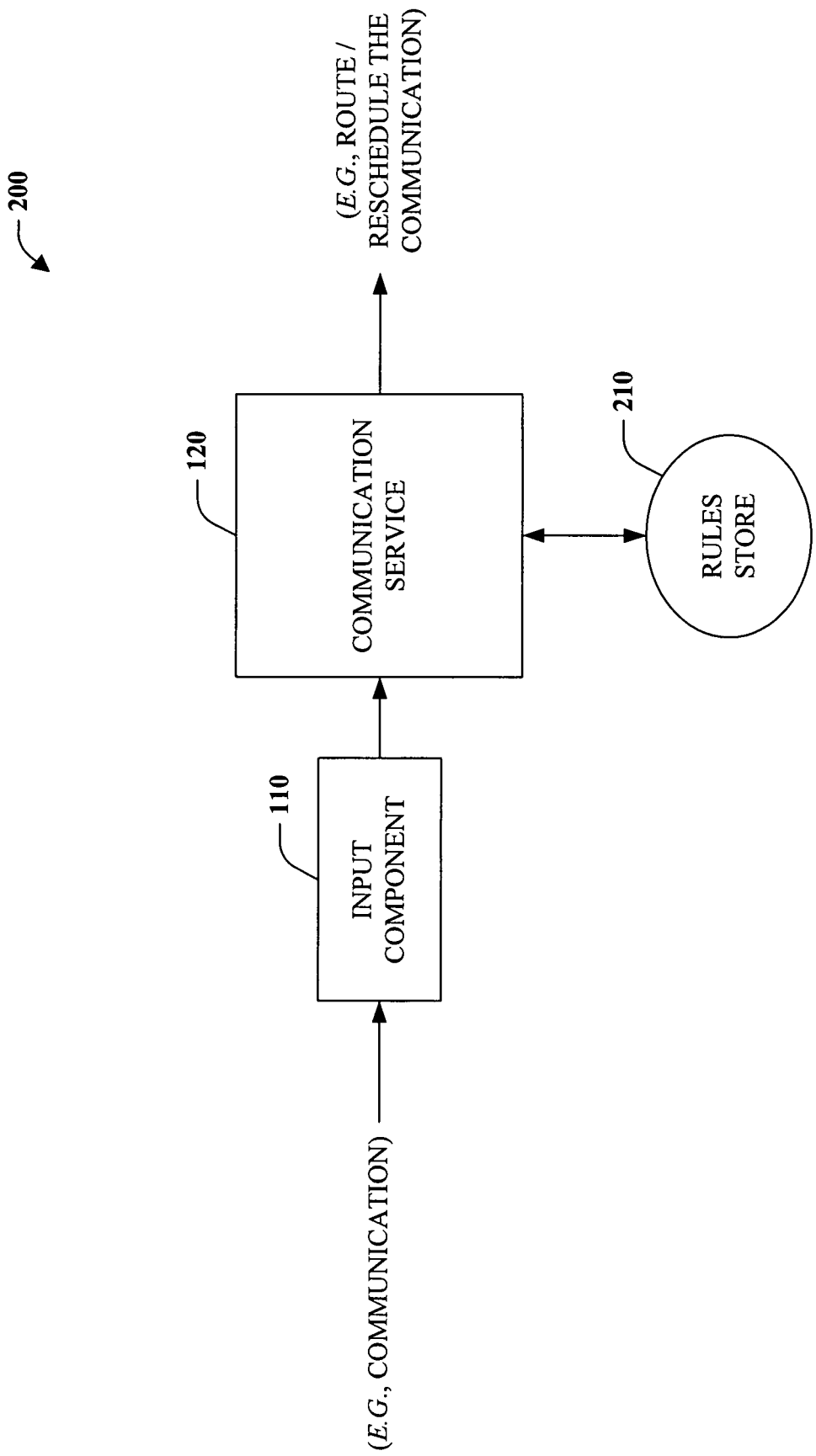
FIG. 2 illustrates a system that utilizes a rule base to facilitate management of communication between communication systems.

FIG. 2 illustrates an exemplary system 200 that manages communication between communication systems. The system 200 comprises the input component 110 and the communication service 120, described above, and a rules store 210. As noted above, the input component 110 can receive communications, which can be subsequently routed by the communication service 120 to recipients over various communication channels, rescheduled for a retry, redirected, and/or ignored. In accordance with an aspect thereof, the communication service 120 can utilize one or more rules from the rules store 210 to facilitate such routing. For example, the rules store 210 can maintain user-defined information (e.g., policies, privileges, rights, properties, configurations . . . ) related to a cost(s) and/or benefit(s) of disparate communication handling actions for a sender(s), a recipient(s), a communication device(s), and/or a communication(s). This allows a user to render assertions about their interruptability, for example, based on observations about their content. In addition, the foregoing provides for assessment of policies regarding communication priority and cost of interruption.

For example, the user can define a changing cost of interruption (e.g., an analog and a discrete function from low to high) with accepting a communication in real-time as a function of time. In addition, the user can assign various priorities (e.g., from low to high) to communication transmitting devices and/or a cost of deferring a communication. In one instance, when a communication from a communication device with priority equal to or greater than the present cost of interruption is received, the communication can be provided to the recipient. As noted above, the communication can be provided to the recipient as specified by the sender and/or another mechanism as determined by the communication service 120. In another instance, when the communication is associated with a communication device with priority lower that the present cost of interruption, the communication can be rescheduled, redirected, discarded, and/or saved for later retrieval (e.g., voicemail and other messaging service).

It is to be appreciated that the rules store 210 can be variously populated. For example, one or more application program interfaces (APIs) can be utilized to upload, modify, and/or created rules. In addition, intelligence can be utilized to automatically generate rules. Furthermore, rules can be combined to form other rules. Moreover, rules can be dynamically modified and/or destroyed.

Figure 3:
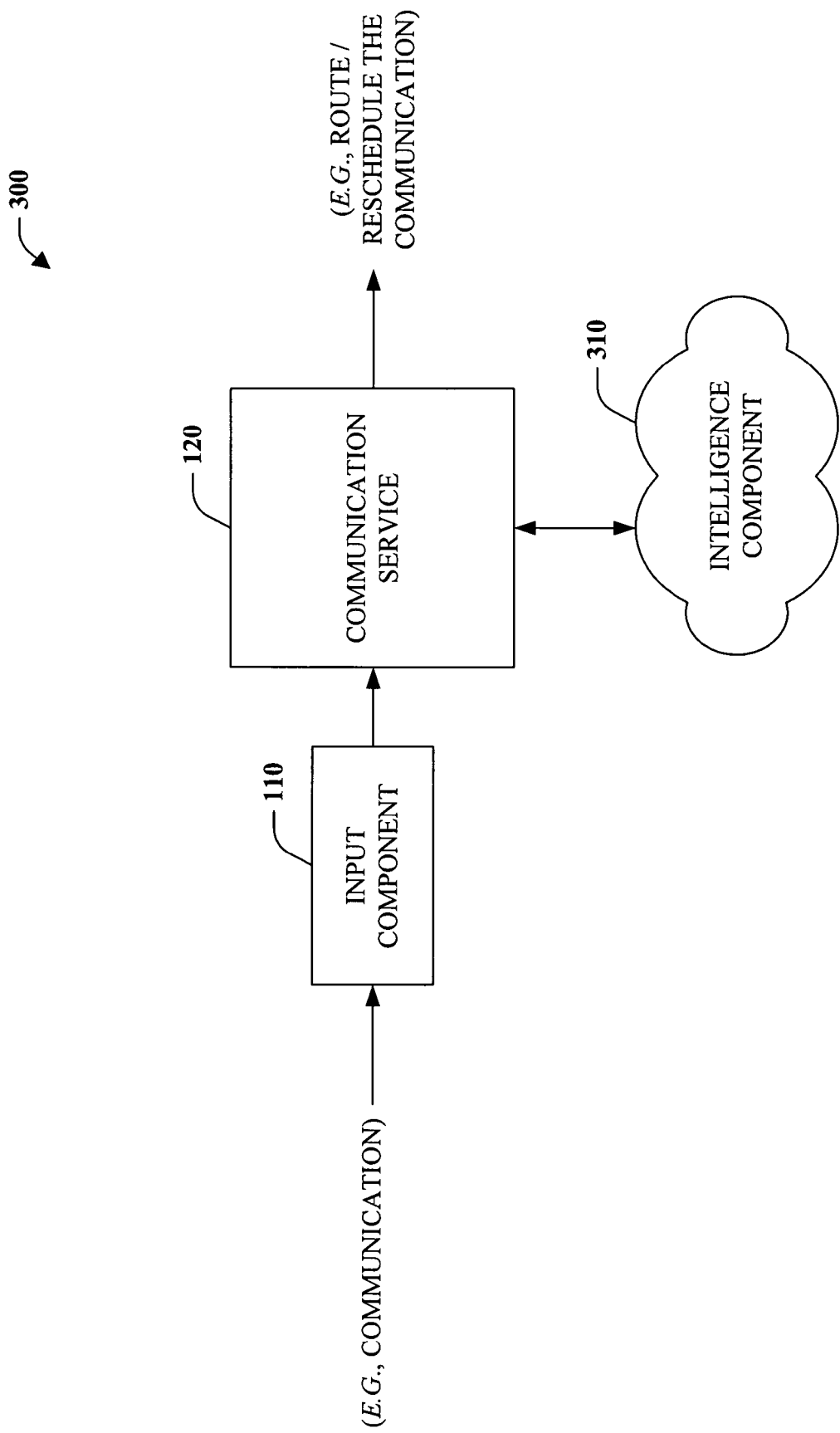
FIG. 3 illustrates a system that utilizes an intelligent component to facilitate management of communication between communication systems.

FIG. 3 illustrates an exemplary system 300 that manages communication between communication systems. The system 300 comprises the input component 110 and the communication service 120 from above, and an intelligence component 310. As noted previously, communications from one or more communication systems can be accepted by the input component 110. Such communications can be routed by the communication service 120 to recipients, rescheduled, and/or discarded. The intelligence component 310 can be utilized to facilitate determining whether and how to transfer received communications. Such intelligence component can utilize Bayesian models that are learned or handcrafted, and/or decision-theoretic procedures to generate an expected cost of interruption, and such models can be created via real-time monitoring of system activity, and/or background, historical, acoustical and/or visual information, for example.

In addition, inferences about present and/or future interruptability and/or predictions regarding availability can be employed to facilitate relaying, delaying and/or rejecting a communication. It is to be appreciated that the intelligence component 310 can further compute a probability distribution over states of interest at the current time or at future times based on a consideration of a set(s) of data and/or events. It is note that inferences can refer to techniques employed for composing higher-level events from the set(s) of events and/or data. Such inference can result in the construction of new events and/or actions from a set(s) of observed events and/or stored event data, whether or not the events are correlated and the events and data come from one or several event and/or data sources. Various learning and inference schemes and/or systems can be employed in connection with performing automatic and/or inferred actions in connection with the subject invention.

Figure 4:
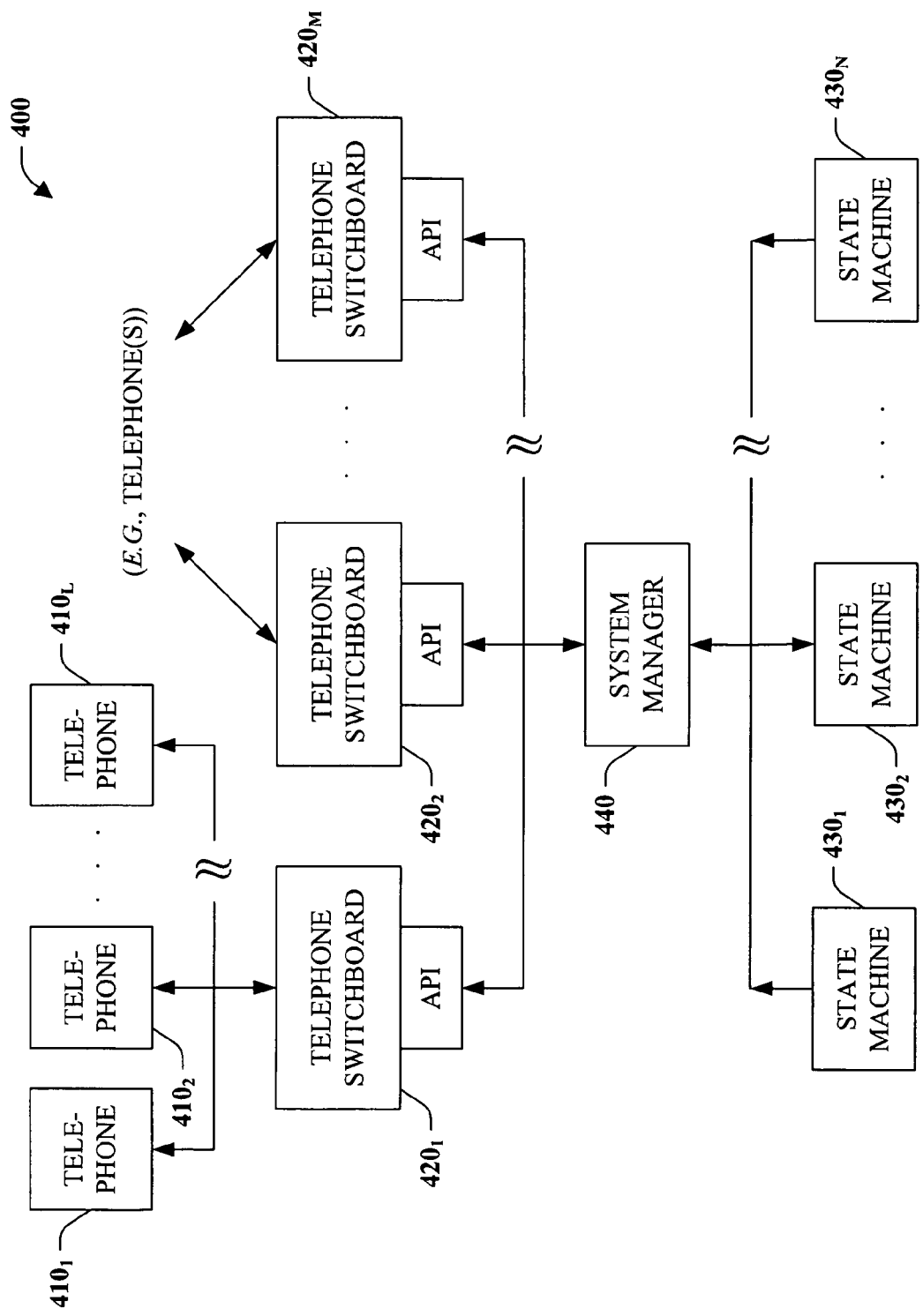
FIG. 4 illustrates a system that manages communication for a telephonic-based communication system.

FIG. 4 illustrates an exemplary telephonic-based communication system 400. The system 400 can be utilized in connection with a plurality of telephones residing within one or more PBXs. For sake of brevity and explanatory purposes, the system 400 is employed with L telephones $410_1$, $410_2$ and $410_L$, where L is an integer equal to or greater than one. The L telephones $401_1$, $410_2$ and $410_L$ can be collectively referred to as telephones 410.

The telephones 410 can be essentially any type of telephonic device. For example, the one or more of the telephones 410 can be conventional hardwired, cordless (e.g., 2.4 GHz, 5.9 GHz . . . ), and/or wireless (e.g., cellular, PCS, "walky talky," CB radio . . . ) telephones. In addition, one or more of the telephones can be voice over Internet (VoIP), beeper, pager, etc. and, thus, include video, audio, text, etc. The telephones 410 can be coupled to one or more telephone switchboards. As depicted, the telephones 410 interface with a telephone switchboard $420_1$. The telephone switchboard $420_1$ can be a PBX or other communication system and can include an API that allows external software to control respective phones $410_1$, $410_2$ and $410_L$ and receive notifications about events for any of the telephones 410. It is to be appreciated that any number of telephone switchboards can be employed in accordance with an aspect of the innovation. For sake of brevity and explanatory purposes, M telephone switchboards, the telephone switchboard $420_1$, a telephone switchboard $420_2$ and a telephone switchboards $420_M$, where M is an integer equal to or greater than one, are shown. The M telephone switchboard $420_1$, $420_2$ and $420_M$ can be collectively referred to as telephone switchboards 420.

The system 400 further comprises N state machines $430_1$, $430_2$ and $430_N$, which can collectively be referred to as state machines 430. The state machines 430 commonly are computer-based devices such as, for example, desktop PCs, workstations, laptops, handhelds, PDAs, tablet PCs, etc. In addition, the state machines 430 can reside local and/or remote to the other components of the system 400. For example, at least one of the state machines 430 can reside within the facility governed by the switchboard $420_1$. For example, the state machine can be coupled (e.g., via wire and wireless) to the facilities network or bus. In another example, at least one of the state machines $430_1$ can be located at a user's home. Such state machine can interact with the telephone switchboard $420_1$ via a dial-up, ISDN, DSL, ADSL, high-speed cable modem, wireless (e.g., Bluetooth, cellular, PCS, Ethernet . . . ) connection.

The state machines 430 can interact with the telephones 410 via a system manager 440. For example, any of the state machines 430 (e.g., software executing therewith), for example, state machine $430_1$, can communicate with the system manager 440, which in turn can communicate with any of the switchboards 420, for example, telephone switchboard $420_1$. The telephone switchboard $420_1$ can transmit one or more suitable communications (e.g., signals, messages, requests, instructions, control data . . . ) to the telephone $410_1$ to execute commands.

Figure 5:
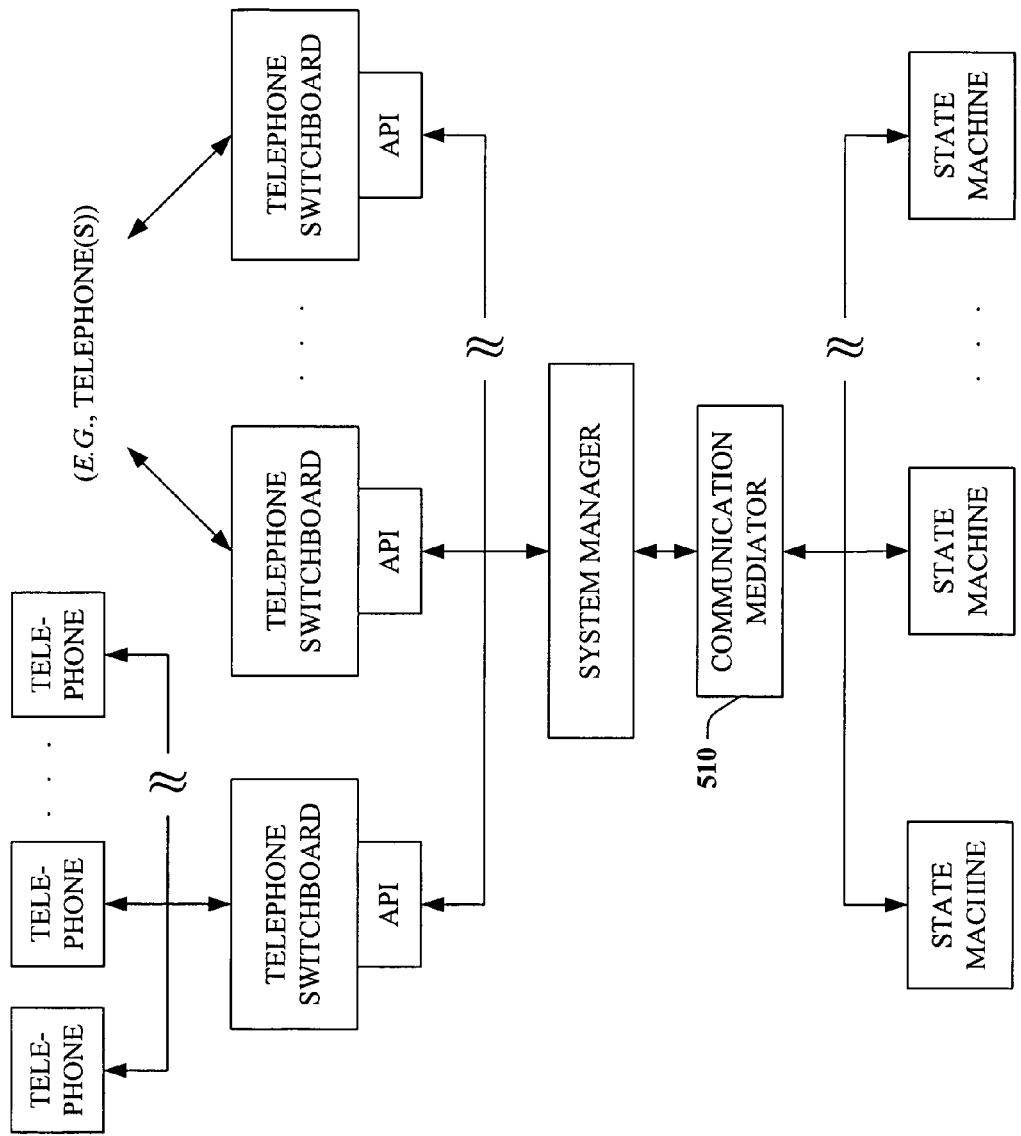
FIG. 5 illustrates a telephonic-based communication system that employs a communication mediator to automate communication decisions.

FIG. 5 illustrates the exemplary telephonic-based communication system 400 with a communication mediator 510. The communication mediator 510 can be employed to facilitate automatic call handling and can store and provide user preferences to one or more of the state machines 430 and the system manager 440. The communication mediator 510 can handle events from and/or transmit information to the state machines 430 and the telephone switchboards 420 in order to mediate communication handling actions such as routing and/or rescheduling communications, for example, based on data from calendars, schedules, email, situations . . . .

The communication mediator 510 can be configured to execute in different modes wherein respective modes can represent a different degree of flexibility, complexity and richness. For example, at one extreme, a first mode can represent an "off" state, wherein the communication mediator 510 serves merely as a pass through. When in this mode, the system depicted in FIG. 5 operates substantially similar to the system presented in connection with FIG. 4. In another instance, a second mode can provide a basic mode, wherein a users can indicate basic preferences such as "Forward calls to my mobile phone," "Forward calls directly to my voicemail when my Instant Messenger is set to Busy," "Forward calls directly to my voicemail when my Instant Messenger is set to Away," "Forward calls directly to my voicemail when my main office system is locked," "Forward calls directly to my voicemail when my screen saver is running," etc. In another instance, a third mode can be configured for users seeking more sophisticated control of communication handling. This mode can be facilitated via generating and considering one or more groups of callers, multi-number forwarded by time, and/or a more expressive cost-benefit approach to communication handling, for example. It is to be appreciated that the foregoing modes are provided for explanatory purposes and do not limit the invention. Essentially, any number of modes can be generated and employed.

As noted above, the system depicted in FIG. 5 can be executed such that the communication mediator 510 is virtually a pass through. Such system can be utilized to couple the state machines 430 with the telephones 410, as described previously in connection with FIG. 4. In this scenario, any of the state machines 430 can communicate with the system manager 440 to communicate with any of the telephones 410 via any of the switchboards 420, and vice versa.

A basic mode can be configured to provide for a wider-scale fielding of the communication mediator 510. For example, a qualitative cost-benefit approach that harnesses key ideas from formal decision analysis, while optionally bypassing the use of detailed inferential models, can be utilized. Such approach can center on an assessment of policies about communication priority and cost of interruption and can leverage results about the cost of interruption via machine-learning analyses. For example, in an office setting, properties that can facilitate discriminating between low and high cost of interruption include the number of attendees at meetings; meeting location; relationship between the organizer and the user; and duration of meetings. In addition, the cost of interruption in office settings can be sensitive to whether conversation is detected in an office, whether a user is currently interacting with a computer, whether the user is typing, and/or the software application that is active and in focus. Moreover, information related to whether a user is speaking, writing, sitting, and/or interacting with objects such as a keyboard and/or phone, the presence and/or activities of occupants, whether the user's office door is open or closed, and/or positions and/or configurations of people can be utilized to facilitate such discrimination.

Figure 6:
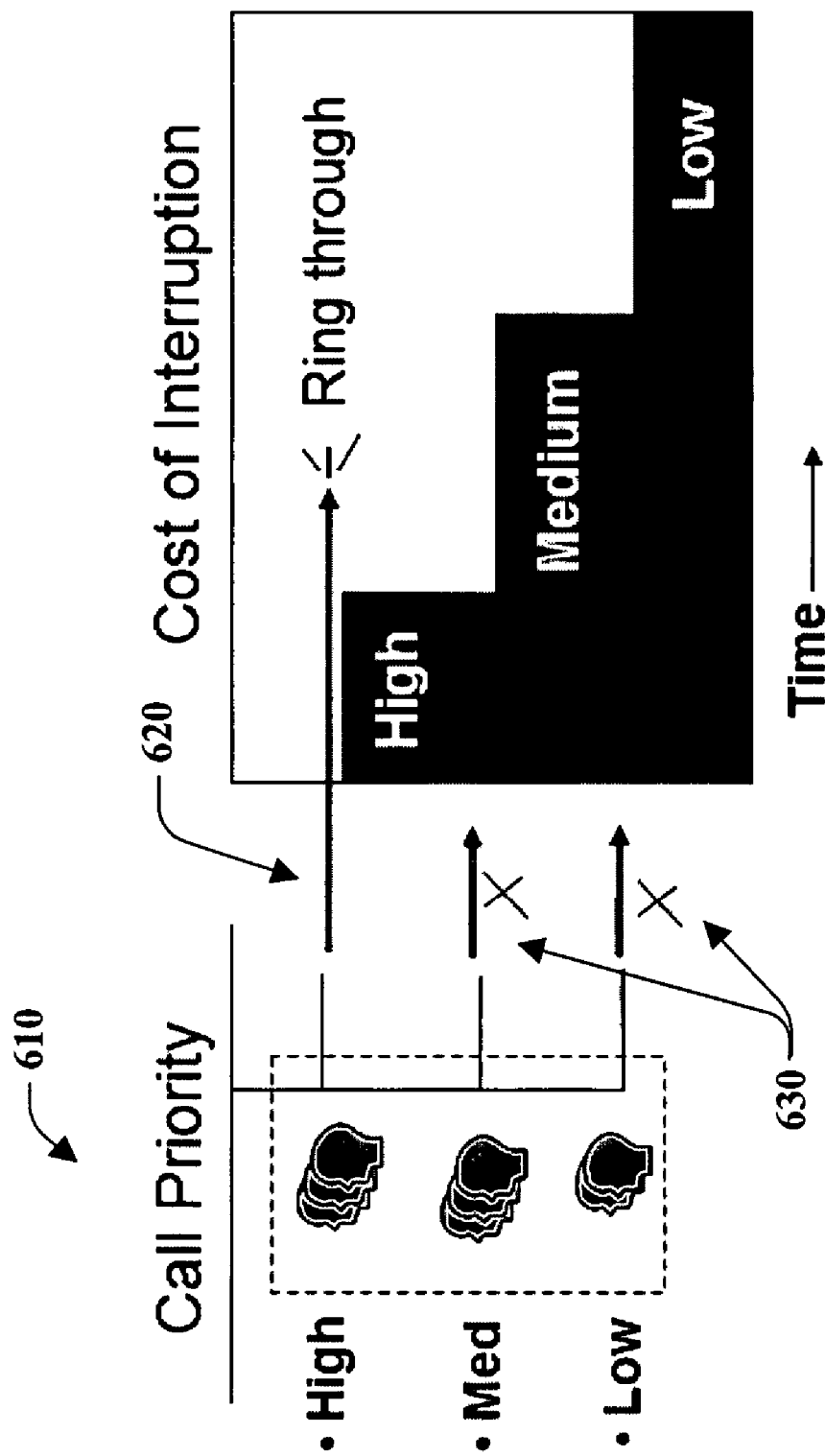
FIG. 6 illustrates an exemplary cost-benefit graph depicting caller priority and cost of interruption.

This basic mode typically enables a user to render assertions about interruptability based on observations about their context. For example, the user can assign costs of interruption over time associated with accepting a real-time telephone and priorities, representing the value of taking a call in real-time or, equivalently, the cost of deferring a communication until a later time, for callers. The foregoing is illustrated in FIG. 6, wherein a cost-benefit graph, assigning values of low, medium, and/or high priority to callers at 610 based on identity and/or situation and to time, is depicted. Typically, users can consider their own definitions of low, medium, and high as a standard currency for value and cost, when assigning low, medium, and high costs of interruption for different contexts. Typically, the priority of a caller must be at least as high as the current cost of interruption for the caller to break through to the user, as illustrated at 620. Otherwise, as depicted at 630, the call is either shunted to voicemail or rescheduled, for example, depending on the privileges assigned by a recipient to the caller.

Figure 7:
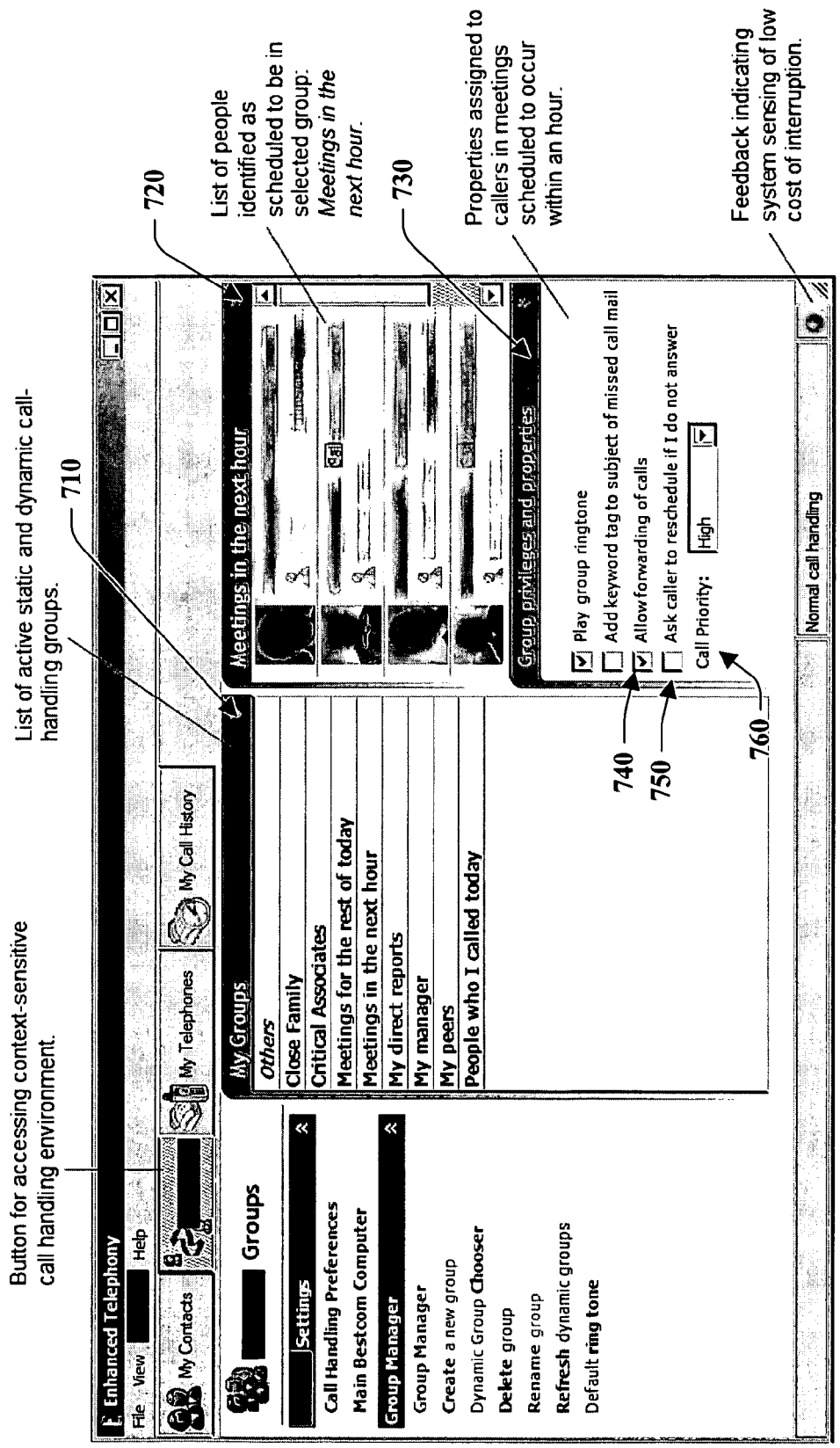
FIG. 7 illustrates an exemplary handling agent interface for defining groups and assigning privileges and properties to the groups.

The foregoing can be facilitated via utilization of a handling agent that can be represented via the exemplary interface depicted in FIG. 7. Such agent can be utilized to generate and/or configure groups, which allow users to abstract callers into groups of callers and to express call-handling policies in terms of these groups. Such groups can include custom-tailored static groups and/or dynamically assigned computed groups that define communication-handling properties to users based on relationships and/or situations. These groups enable users to assign properties to the groups, including priority, forwarding privileges, rescheduling preference, and/or group ring tones, for example. In general, static groups commonly are created by users and then populated from a user's predefined contacts or from an online directory. For dynamic groups, a palette of predefined computed groups is constructed made available to users. Dynamic groups can include several classes of computed sets of callers that serve to map callers into groups depending on relationships and contextual information.

Exemplary categories of groups can include "calendar-centric," "relationship-centric," "communications-centric," and "project-centric" groups. "Calendar-centric" groups can include groups that are computed from the user's online meetings encoded in calendar/mail programs. These include callers in such groups as, "my next meeting," "meeting in the next hour," "meetings today," and/or "meetings for the rest of the week." "Relationship centric" groups can include "my direct reports," "my organizational peers," "my manager," "my manager and manager's manager." "Communications-centric" groups can include "people who I called today" and/or "people who called me today." "Project centric" groups include "people who I've co-authored a document with this week," "people who have assigned bugs to me," and/or "people on my active projects list."

For static and/or dynamic groups, clicking on the group name at 710 in the interface can reveal the members of the group, with contact information, online status if available, and/or a picture, for example, as depicted at 720. Users can assign privileges to respective members of groups by entering options in a group privileges and properties region at 730. Users can check boxes that grant group members forwarding and rescheduling privileges at 740 and 750, respectively, that allow them to be considered for forwarding or rescheduling, respectively, based on an analysis of the user's context. User's can also assign members of groups a priority, including breakthrough, high, medium, and low priority, as depicted at 770. "Breakthrough" privileges allow the caller to be routed through to the user regardless of the user's context.

Figure 8:
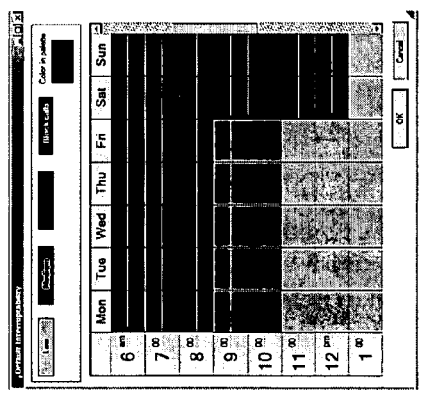
FIG. 8 illustrates an exemplary time-pattern palette interface for assigning costs of interruption to blocks of time.

Interruptability can be assigned to the various created groups. For example, after defining and activating a groups and assessing the priorities of callers, users can optionally assess their background or default interruptability (e.g., for a typical week). Default interruptability can represent the cost of taking phone calls at different times of day and days of the week in situations where there is no further statement about context, for example. Users can assert their background cost of interruption via a time-pattern palette as illustrated in FIG. 8. This palette allows users to sweep out regions of low, medium, and high cost of interruption over a seven-day period. Users can also indicate which periods of time should be set to block calls. At these times, only users assigned breakthrough privileges can get through to the user. Users typically are instructed that they can bypass this palette, thus assuming a background low cost of interruption for substantially all times.

Figure 9:
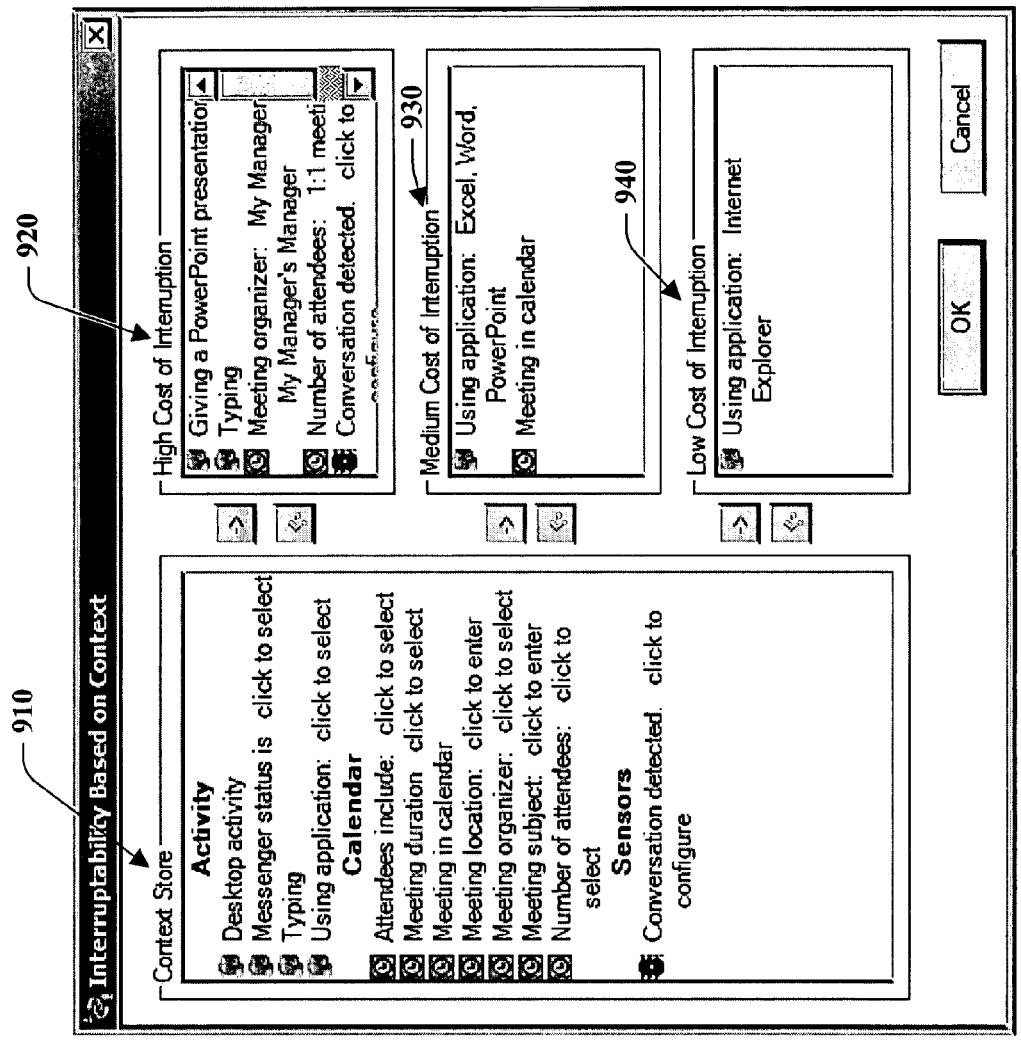
FIG. 9 illustrates an exemplary context-assessment interface tool for assigning a level of cost of interruption to context elements.

Users can additionally specify sets of events that define context-sensitive changes in their interruptability. FIG. 9 illustrates an exemplary context assessment interface tool that enables a user to provide such information. As depicted, users can select and instantiate values of observed events for desktop activity, calendar information, and sensors, for example, via the context store at 910. Such events can be dragged to a low, medium, or high cost of interruption at 920, 930 and 940, respectively. Users can be informed that the system will consider all events specified and select the highest cost of interruption possible for all observed events.

Activity-centric events can include any desktop activity, typing, using one or more applications, and instant messenger presence status of one or more of busy, away, or online. Activity-centric events can be evaluated by a system event-monitoring component. Calendar events can include any meeting currently in progress, meeting duration, location, organizer, subject, attendees, and number of attendees. Calendar events can be gleaned from an application, for example, utilizing a periodic caching procedure to minimize computational effort. For attendees and organizer, users can specify lists of individuals as well as predefined abstractions including direct reports, peers, manager, and manager's manager. For a sensors class of events, users can instruct the system to consider them to be in a state of high, medium, or low cost of interruption when a conversation is detected in their office. Conversation can be detected with a module that detects acoustical energy in the audio spectrum in the human-voice range and can distinguish sound live conversation versus voices coming from speakers, for example, a broadcast from a radio. A separate audio configuration can be provided and accessed when users first activates an associated event while assessing contexts.

Figure 11:
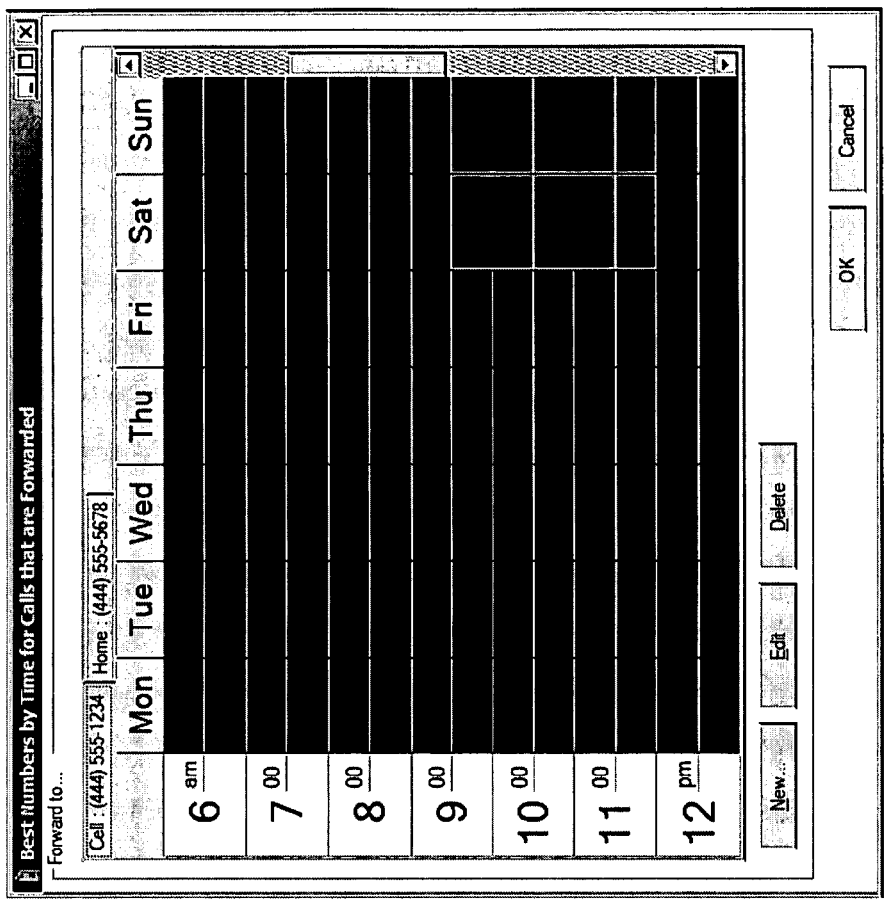
FIG. 11 illustrates another exemplary time-pattern interface.
Figure 10:
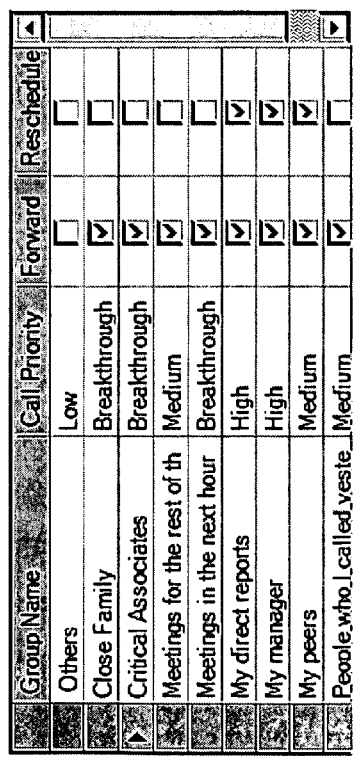
FIG. 10 illustrates an exemplary group summary interface.

An exemplary summary interface illustrated in FIG. 10 can be utilized to review, refine and/or confirm groups that that have been enlisted and/or defined. This interface can be utilized to examine and/or revise group priorities, determine whether a group should be granted a privilege to forward calls to other numbers should the priority of a call exceed the cost of the interruption, and/or whether a caller should be rescheduled or simply shunted to voicemail in the case that the call does not exceed the current cost of interruption, for example. In addition, users can specify preferred numbers for forwarding calls at times when they are away from the their phone, for example, where the benefits of the call exceed the costs of the interruption. Multiple numbers can be specified on a time-pattern palette, as described in detail above, for forwarding numbers, as displayed in FIG. 11. Such palette can utilize a metaphor similar to the seven-day time palette employed for assessing default costs of interruption as described above. The forwarding palette can allow users to specify times of day and days of week when, for example, a mobile phone should be used versus another phone such as an office and/or home phone.

Figure 12:
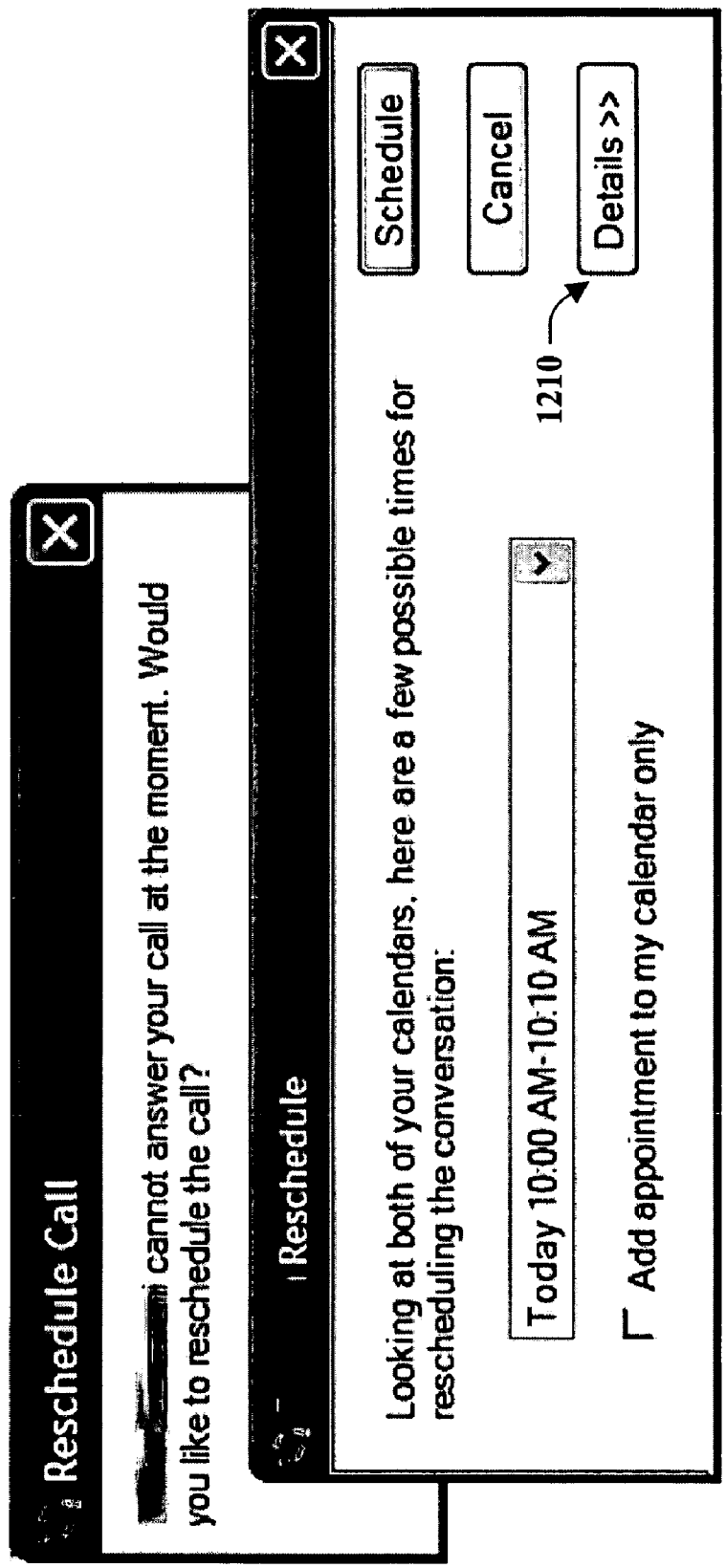
FIG. 12 illustrates an exemplary communication rescheduling interface.

An exemplary automated rescheduling interface illustrated in FIG. 12 can be utilized to seek convergence on a scheduled time for a call. For example, if a caller is a member of a group assigned a rescheduling preference and a priority of their call to a recipient does not outweigh the current cost of interruption for that user, the caller may be actively engaged by an automated rescheduling service. The system can check before engaging the caller to determine whether there is time available for the conversation within a tolerance for delay that the user has specified in a rescheduling preference profile. The automated rescheduling interface can be utilized as a pop-up that indicates that the person they wish to speak with is not currently available and wishes to reschedule the call. By providing such a rescheduling assistant, the service can check calendars associated with the caller and the recipient and recommend a list of potential times for a telephone conversation.

The interface, by clicking Details at 1210, can provide the caller a mechanism to include background information regarding a reason for the call and specify links to material that can be useful for the conversation. Upon completion of such interaction, a tentative appointment can be inserted on the caller's calendar and a call-appointment invitation can be mailed to the recipient. A user can customize the behavior of their scheduling assistant, by asserting minimal times to wait to ensure that they will hear about the appointment. Additionally, they can assert a maximal delay time and ask the system to bypass rescheduling if the first available slot will be after the maximal delay time. For example, a user can assert that attempts should be made to reschedule only if an appointment for the call can be made on the same day as the call. In this case, if a call cannot be rescheduled on the same day, the call can be directed to voicemail, bypassing the invocation of the rescheduling assistant, or directly to the user as a real-time call.

Figure 13:
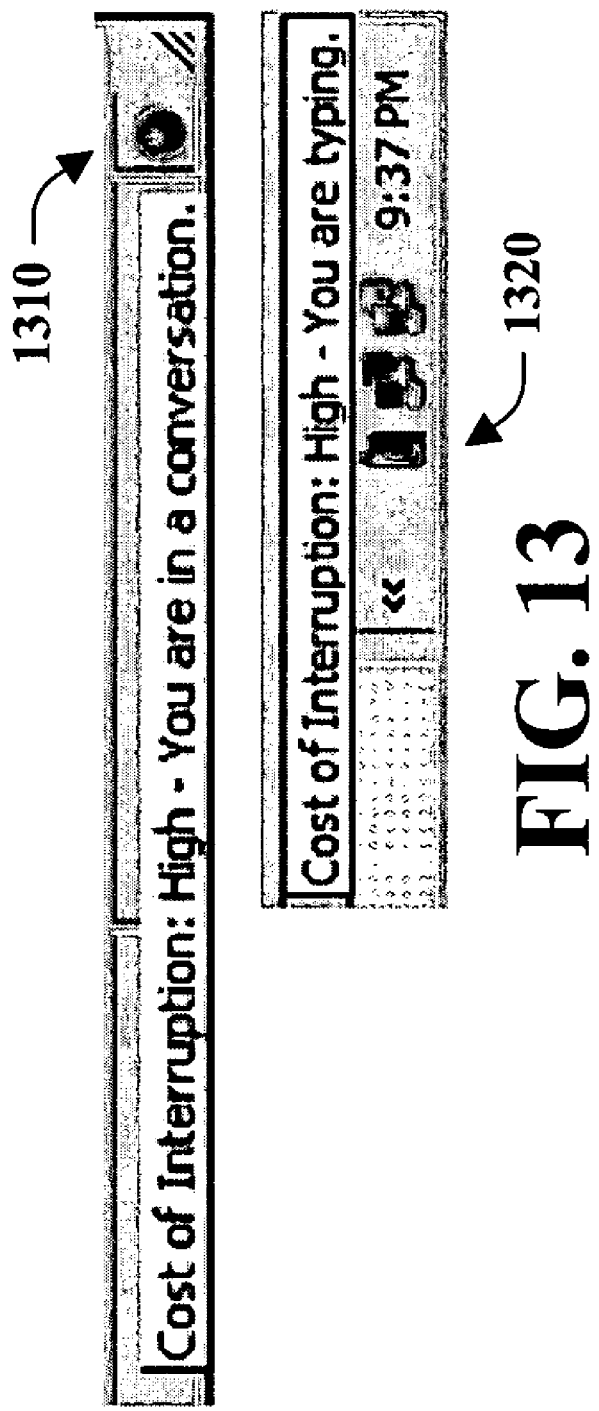
FIG. 13 illustrates an exemplary graphical indicator display that provides a visual indication of a cost of interruption.

An interface, as illustrated in FIG. 13, can be utilized to graphically display indicators that denote whether the system believes that the user is in a low, medium, or high cost of interruption respectively. Typically, information about the interruptability of a user is not shared with others and this information can be utilized for making privately-held call-handling decisions. However, this interface can be utilized to share such information by displaying the information status graphic, where a small LED, depicted at 1310, and a glowing cell-phone icon, depicted at 1320, glow green, yellow, or red to indicate whether the system believes that the user is in a low, medium, or high cost of interruption, respectively.

A more sophisticated or richer mode can consider the costs and benefits of incoming communications. This mode can utilize personalized Bayesian models, learned via training with labeling data to compute the expected cost of interruption for users, for example. Such models can take as inputs calendar information, real-time monitoring of desktop events, and/or information gathered via acoustical and vision-based sensing. inferences about a user's current interruptability and predictions about when a user will be available can be utilized to render decisions about relaying an incoming call to users, taking a message, or deciding if and when to reschedule a call.

Figure 14:
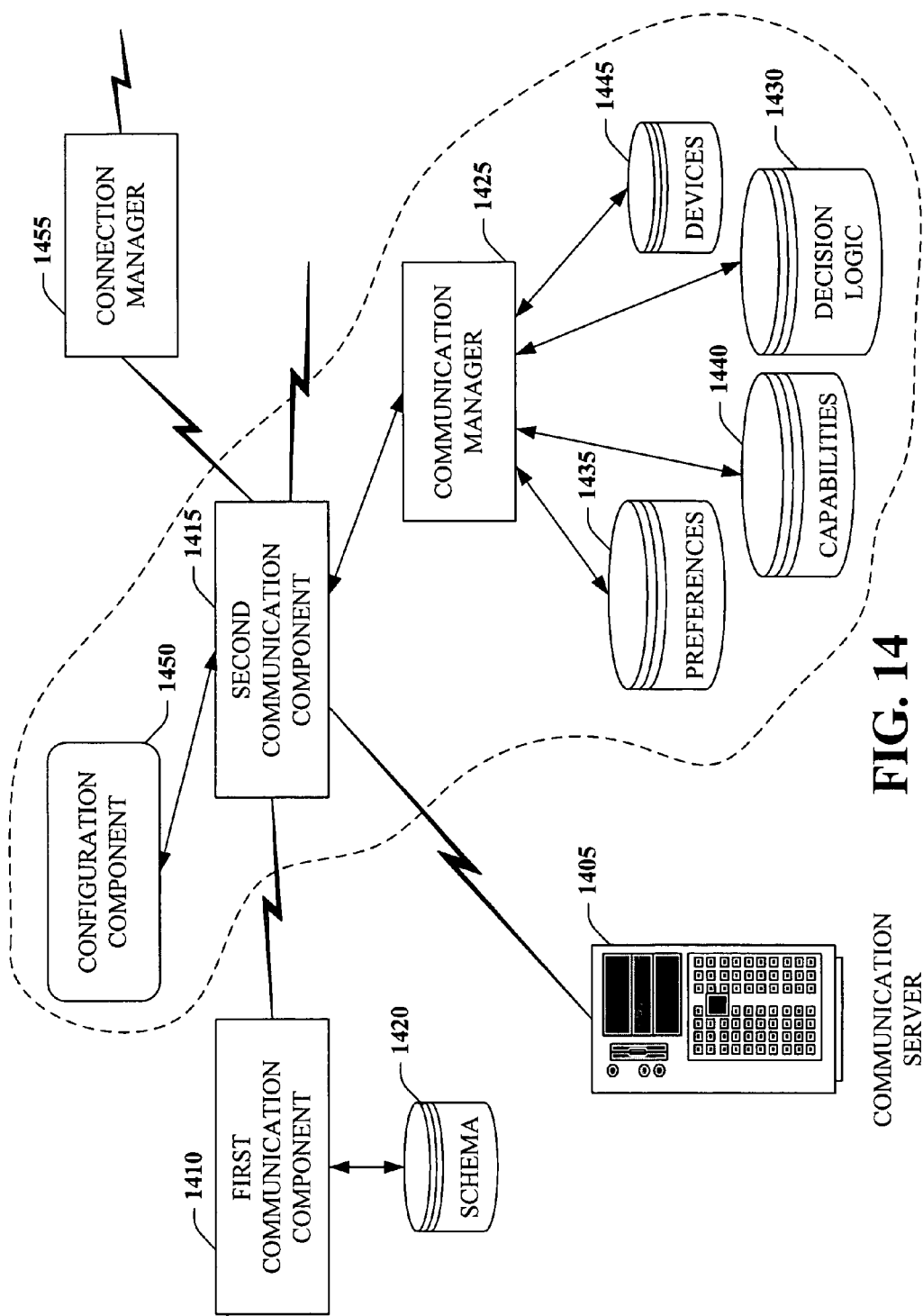
FIG. 14 illustrates an enhanced interpersonal communication system that manages communication between parties.

FIG. 14 illustrates an exemplary interpersonal communication system (system) 1400 that can render communication decisions utilizing features such as advanced components and functionalities that enhance the depth of decision making under uncertainty. In addition, models (e.g., statistical, such as probabilistic graphical models, e.g., Bayesian networks) can be utilized for real-time inferences regarding device availabilities and expected cost of interruption, based on patterns of evidence. The system 1400 comprises a centralized server 1405 that can maintain accounts for contactees and store preferences and user state. In addition, the server 1405 can maintain a whiteboard (not shown) with contextual information. The contextual information can include, for example, whether a user is currently on the telephone, the current meeting status of the user, the user's proximal schedule, and key events sensed about a user's activity on registered client devices.

The exemplary system 1400 can provide for a two-client scenario; however, it is to be appreciated various other configurations such as configurations with additional clients and/or groups of clients can be employed. In the two-client scenario presented, a first communication component (e.g., a contactor, sender . . . ) 1410 can attempt to establish communication with a second communication component (e.g., a contactee, receiver . . . ) 1415. The contactor 1410 is typically associated with a schema 1420 that comprises metadata that is analyzed by a communication manager 1425. The schema 1420 can be structured information that captures the contactor's identity, initial modality, preferred communication modality, device availability, and schedule, for example. However, it is to be appreciated that the invention is not so limited. Other schema such as the contactors preferred communication channel, the contactor's proximal schedule, device availabilities, and task information reflecting the goal of a communication, such as a pointer to edits in a shared document can be employed, as described below.

The communication manager 1425 can be employed to facilitate rendering a decision regarding a type of communication, if any, between the contactor 1410 and the contactee 1415, based on the initial modality, or otherwise shift the modality, reject the call, flow the caller into email or voicemail messaging, and/or reschedule the communication for another time. The decision can be determined based at least in part on a decision logic 1430, a preference 1435, a capability 1440, and/or an available device 1445 that are associated with the contactee 1415. The decision logic 1430 can provide statistically based (e.g., a cost-benefit analyses) instructions to weigh the cost of interruption and the cost of deferring communication between the contactor 1405 and the contactee 1410. In other aspects of the invention, more basic techniques including deterministic policies can be employed.

The configuration component 1450 (or other components, tools and/or utilities) can be utilized by the contactee 1415 to provide flexibility and tuning. For example, the configuration component 1450 can provide a means to define a group(s) of individuals, and associate relationships and activities, including meetings, communication history, and projects. Various groups, relationships and activities can be generated and/or associated, as described in detail below. Group members can be automatically populated based on relationships and activities. Meeting-centric groups can be dynamically populated by an ongoing analysis of appointments encoded in a user's calendar, for example. In addition, the configuration component 140 can be employed to assign privileges and properties to the groups, as described in detail below.

The decision logic 1430 can provide instructions to assess costs of interruption, appointment properties, device activity, and/or infer the expected cost of interruption. In one aspect of the disclosed innovation, costs (e.g., scalar cost values) and/or cost categories can be defined over a particular time period, and indicate low, medium, and high costs of interruption. Default costs additionally can be employed, and typically include costs based on a time of day and/or a day of the week.

In one example, when the contactor 1410 attempts to establish communication with the contactee 1415, the communication manager 1425 can identify the one or more groups that include the contactor 1410. A breakthrough value associated with the one or more groups can be utilized, wherein the group associated with the greatest breakthrough value is employed. The cost of interruption associated with a user's current situation can also be considered. For example, where no activity is reported by an event system (e.g., Eve) and no appointments appear as active on the user's calendar, the system can access the default costs for the time of day and day of week. If activity on the contactee 1410 is registered, a cost associated with the activity and a cost of interruption associated with a meeting appearing on a user's calendar can be considered. If the breakthrough value assigned to a caller exceeds the current cost of interruption, the call can be relayed to the user at a best number, for example, provided by the connection manager 1455. If the cost of interruption is larger than the value assigned, the system either takes a message or attempts to reschedule the call, depending on whether the contactor is in a group that has "seek reschedule" property.

For rescheduling, the system can examine the schedule of the contactee 1415 and attempt to determine a proximal time when the cost of interruption will be lower than the value assigned to accepting a communication. A user can indicate at configuration the minimal amount of time to delay until making an appointment for a real-time call. The schedule of the contactor 1410 can also considered when determining whether to reschedule. For example, information such as a detail about a call can be provided by the contactor 1410. The contactor can also request that the call be set up to share screens during the scheduled conversation.

The decision logic 1430 can additionally provide Bayesian models of the expected cost of interruption. The Bayesian models can be employed in connection with other applications (e.g., Coordinate) and/or employed to provide inferred probability distributions over the state of interruptability of users from sensed data. Such probability distribution provides for the generation of the expected cost of interruption (ECI). The ECI and inferences about the probability distribution can be continually updated, and made available for decision-making. In addition, various extensions can leverage inferences about when a user is likely to read email to dynamically determine how far into the future a call should be scheduled based on preferences about the contactees desire to be aware of these events. Another extension that can be leveraged includes inferences about device availabilities over time to understand when a particular communication channel will likely be available, based on the contactor's group or assertions.

It is to be appreciated that the contactor 1410 and the contactee 1415 can be considered agents. Assumptions regarding agency and privacy can have important implications for design guidelines, methods, and usage of the services. For example, in decision theory, the principle agent of a decision typically is the actor responsible for the decision. Issues of agency arise in many real-world applications of decision analysis. For example, when a physician works with a patient on a medical decision problem, the default principal agent is the patient. Although the physician may do her best to advise a patient on the best course of action, it is the patient's preferences regarding outcomes and uncertainties that should be considered. In cases where a patient is incapacitated, others, such as family members may take on the role of principle agent of the medical decision-making.

In the case of communication between two or more agents, various approaches to agency can be employed. For example, the recipient (contactee) of the communication can be deemed the principal agent since it is the contactee whose attention is being sought by the contactor. With this approach, automated actions about the "if," "when," and "how" of communications are based on the contactee's preferences. Thus, the contactee's preferences can be considered to guide decisions about the acceptance, rejection, rescheduling, and shifting modalities of a communication. Preferences of the contactor can also be considered; however, the recipient's preferences typically take into consideration the preferences and situation of the contactor. Many times, a contactee (e.g., at the contactee's discretion) can assign agency to the contactor at least a portion of the decision-making.

Other approaches include systems where agency can be determined based on the actions that would have the greatest value to both contactees and contactors, per a utility model treating both as equals. In another approach, decisions can be guided by communication guidelines or a specific objective function specified for an enterprise. However, typically a recipient-centric approach is utilized since it is the contactor who seeks, commonly without prior arrangement, the attention of the contactee.

Communication decisions generally are confidential, wherein the agent is provided with access to the rich preferences and context information. Keeping the rationale of decisions and, more generally, the context of contactees confidential by default facilitates with seating the agency of decisions with the contactee. A user can explicitly grant individuals privileges to review real-time or forecasts of presence or availability. Keeping such information private by default facilitates with the wishes of users who become familiar with the richness of the sensing and inference.

Figure 15:
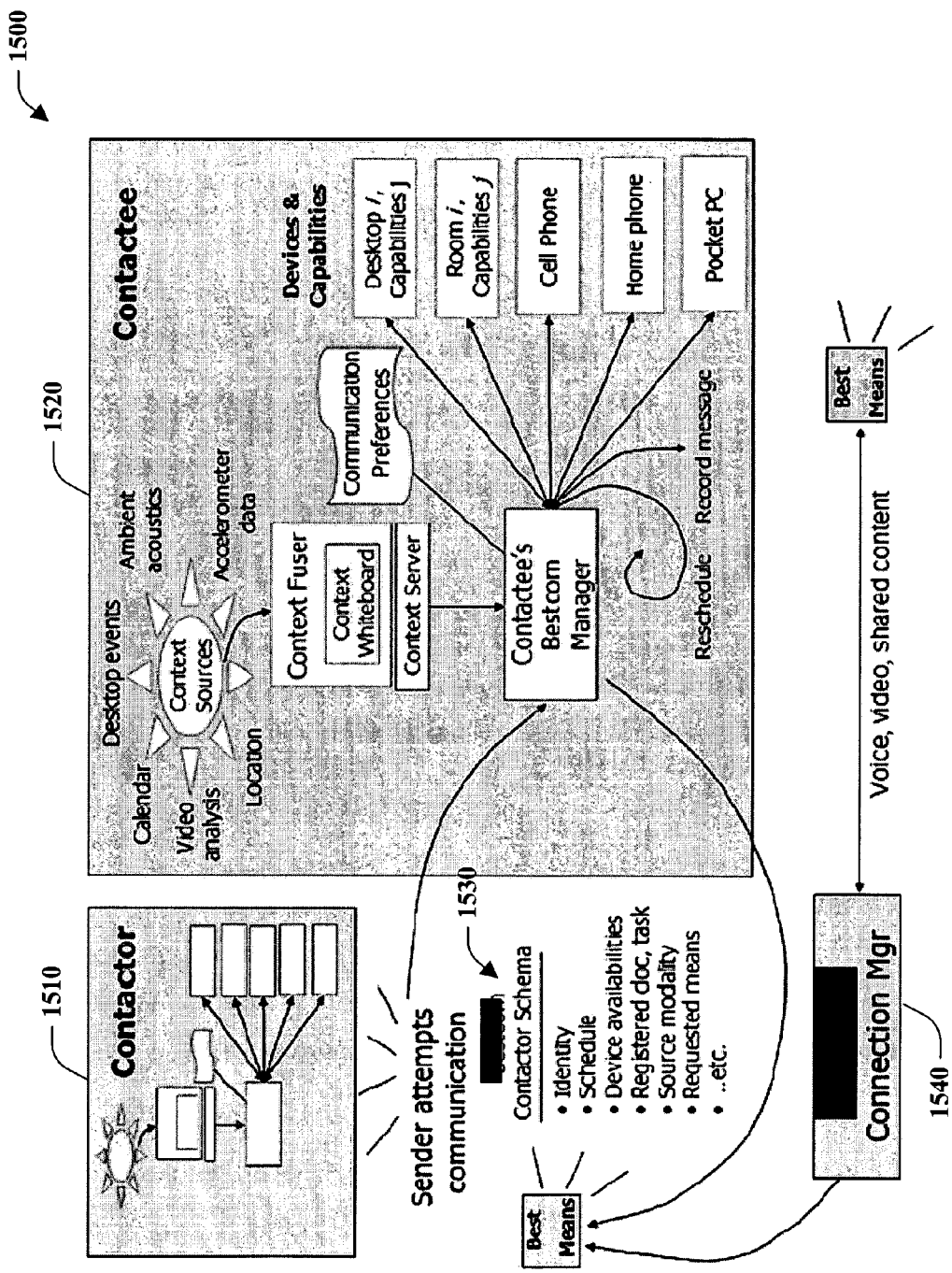
FIG. 15 illustrates an exemplary communication system utilized to facilitate communication handling between a contactor and a contactee.

FIG. 15 illustrates an exemplary high-level, flow and control architecture 1500 that can be employed. The architecture 1500 depicts flow of information and control when a contactor 1510 attempts a communication with a contactee 1520.

The architecture 1500 typically employs metadata formatted in an exemplary schema 1530 that can be analyzed by a communication component such as a communication manager 1540. The exemplary schema 1530 can be structured information that is indicative of an identity, an initial modality, a preferred communication modality, device availability, and a schedule of the contactor 1510, for example. However, the invention is not so limited. For example, an implicit legacy schema can be utilized as a type of communication and an identity of the contactor 1510. In other aspects, more comprehensive schemas can include a preferred communication channel for the contactor 1510, a proximal schedule for the contactor 1510, a device availability(s), and task information reflecting the goal of a communication, such as a pointer to edits in a shared document, for example.

A decision can be rendered as to whether to establish a real-time communication based on the initial modality indicated in the schema, shift a modality, reject a call, redirect a caller to email and/or voicemail messaging, or reschedule the communication for another time. A typical decision can utilize a connection manager 1540, which can handle the switching of a call, for example via in connection with a telephone company switch, a local private branch exchange (PBX) within an enterprise (wherein users of the PBX share one or more outside lines for external telephone calls) and/or a Centrex, which is a PBX where switching occurs at a local telephone office instead of on the company's premises.

It is to be appreciated the various configurations can be employed in accordance with an aspect of the disclosed innovation. For example, the architecture 1500 can provide the contactor 1510 with one or more buttons and automated invocation of the service. In another example, the architecture 1500 can provide the contactor 1510 a prioritized list of the approaches for reaching the contactee 1520, wherein the contactor 1510 can select a suitable approach from the options presented. In yet another example, the architecture 1500 can allow the contactor 1510 to indicate a preferred communication mechanism, wherein the architecture 1500 can employ the preference in connection with an automated decision based at least in part on a preference of the contactee 1520.

Figure 16:
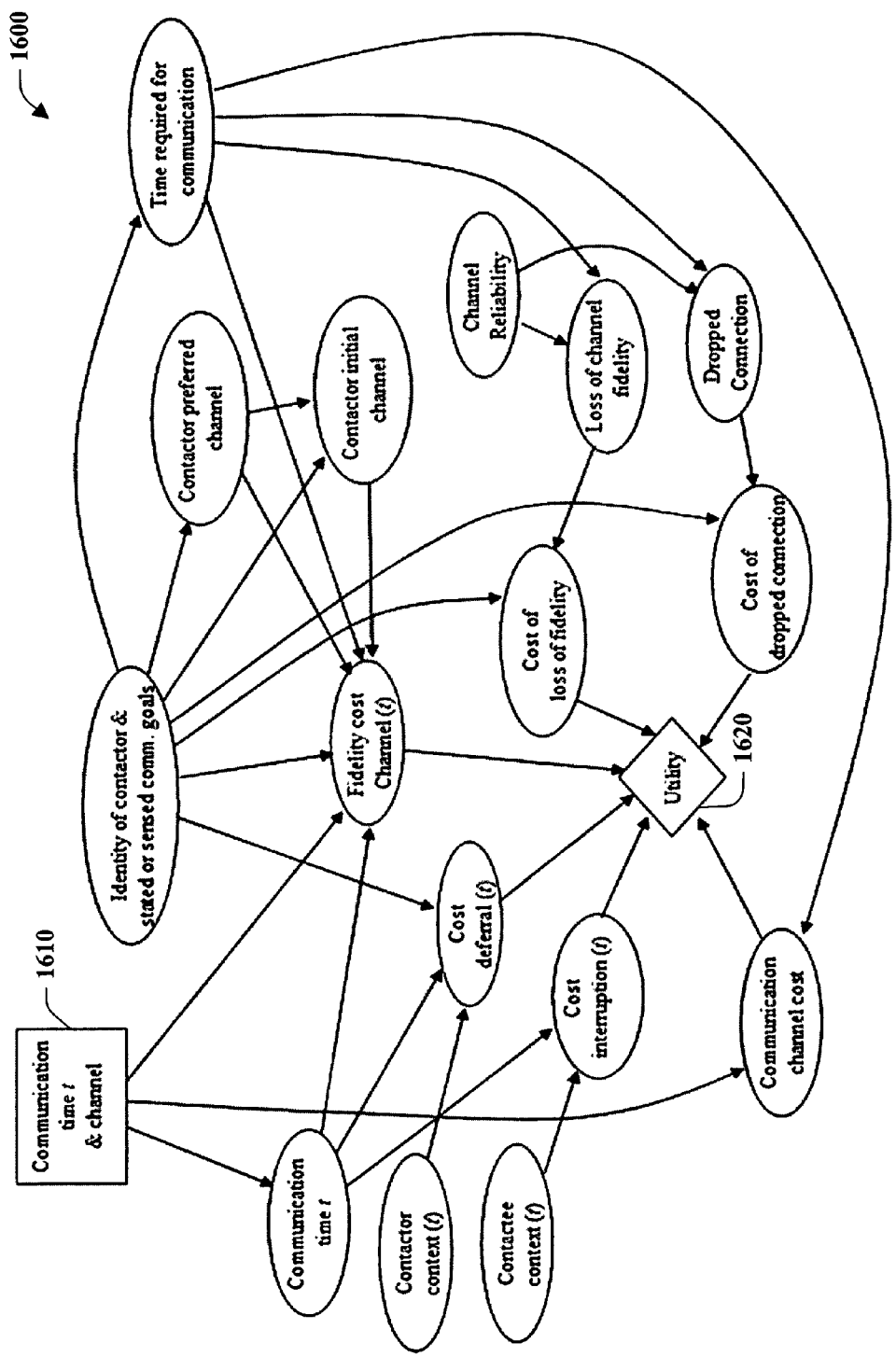
FIG. 16 illustrates an exemplary influence diagram that can be utilized to identify a communication action.

FIG. 16 illustrates an exemplary decision model 1600 that facilitates interpersonal communication system actions. The decision model 1600 is depicted as an influence diagram and can be employed to identify a communication action with maximum expected utility for a situation, considering a cost of interruption, a cost of deferral, and a loss in fidelity associated with the utilization of a different channel(s), given the media and likely goals of the intended communication. The decision model 1600 provides a decision-analytic perspective for automated mediation of interpersonal communications. Both a cost-benefit analysis and an approximation of a cost-benefit analysis can be employed in connection with the decision model 1600.

In one aspect, the decision model 1600 can employ a cost-benefit analysis that balances critical variables, or factors such as a cost of interruption and a cost of deferring communications under the general condition of uncertainty about a context and a goal(s), for example. As depicted, the decision model 1600 illustrates a plurality of dependencies amongst critical factors that typically indicate one or more dimensions of the interpersonal communication decision problem and can comprise a decision node 1610 indicting a communication time t and channel, a value node 1620 indicating a utility, and a plurality of random variables including communication time t, contactor context (t), contactee context (t), identity of contactor and stated or sensed common goals, cost deferral (t), cost interruption (t), communication channel cost, fidelity channel cost (t), cost of loss of fidelity, cost of dropped connection, contactor preferred channel, contactor initial channel, channel reliability, loss of channel fidelity, and dropped connection. It is to be appreciated that various other factors can be employed with the decision model 1600.

By way of example, the decision model 1600 can be constructed to consider a tradeoff (e.g., as determined via a contactee's value function) between a cost associated with interrupting the user with a call and a cost associated with deferring the call until time t, when the cost associated with interrupting the user is lower. In other examples, one or more other factors, including a loss of fidelity with utilizing a different channel, a cost of a channel(s), and a reliability of the different channel(s) can be considered.

In another aspect thereof, the decision model 1600 can employ an approximation of a more detailed decision analysis. Such approximation can be based on a basic cost-benefit analysis and/or a deterministic policy(s), which can render user-friendly systems that are relatively easy to configure and understand. For example, a system can provide both straightforward controls and general configuration, and more advanced controls and configuration, wherein a user can specify preferences and employ more advanced decision-theoretic control.

The straightforward approach can be valuable and intuitive to users and can mitigate the time investment in assessing key uncertainties and preferences that are utilized with the advanced approach. For example, a technique can be employed to assess a value of accepting a communication from an individual, wherein the value can indicate a particular group and/or be associated with a particular class of activity, and the cost of handling a real-time communication can be based on a user's current context. Such an assessment can include a dollar value or a user's personal scalar measure of utility. For example, the approximation can inquire, at setup time, the dollar amount that a user would be willing to pay to accept a call in real-time from a contactor instead of deferring a communication to a future time within a time period provided for rescheduling a communication. After receiving the dollar amount, the system can assess the dollar amount a user would be willing to pay to avoid the interruption of a call in a different setting(s). Such an assessment can include assertions regarding a time of day and a day of a week, a current device activity, and a property(s) of a contactee's appointment(s) that are accessible from electronic representations of meetings.

FIGS. 17-31 illustrate exemplary user interfaces and statistical models that can be employed in accordance with an aspect. In several instances, similar interfaces were presented earlier. However, these earlier descriptions were accompanied with a level of description consonant with the aspect presented. Thus, the following descriptions may provide more or less detail, or variants thereof.

As noted previously, aspects of the subject invention can be based on a cost-benefit analysis technique (including an approximation) and statistical (e.g., a Bayesian) model that can be utilized to infer, in real-time, a device availability and an expected cost of interruption for a contactee in various locations, as a function of a consideration of a pattern of evidence sensed about a user's activities and calendar information. In addition, various aspects can employ advanced components and provide functionalities that can be employed by users to enhance the depth of the system's decision-making under uncertainty. Moreover, other aspects can facilitate real-time telephone communication and merge telephone communication with real-time computer collaboration via optionally sharing displays during conversation. The system can operate on client devices in connection with a centralized server that can maintain accounts for contactees, and store preferences for handling communication and current state of users. The server can maintain a whiteboard of contextual information, which includes whether a user is currently on the telephone, the current meeting status of the user, the user's proximal schedule, and key events sensed about a user's activity on registered client devices.

It is to be appreciated that the respective interfaces described herein can be provided in various other settings and context. For example, the interfaces can be GUIs associated with various applications, including a mail application, a calendar application and/or a web browser, models (e.g., as discussed herein), and/or a desktop development tool. The GUIs can provide a display with one or more display objects, including aspects as configurable icons, buttons, sliders, input boxes, selection options, menus, tabs and so forth with multiple configurable dimensions, shapes, colors, text, data and sounds to facilitate operations with the applications and/or models. In addition, the GUIs can include a plurality of other inputs and/or controls for adjusting and/or configuring one or more aspects, as described in more detail below. As an example, the GUIs can provide for receiving user commands from a mouse, keyboard, speech input, web site, remote web service, pattern recognizer, face recognizer, and/or other device such as a camera or video input to effect or modify operations of the GUI.

Figure 17:
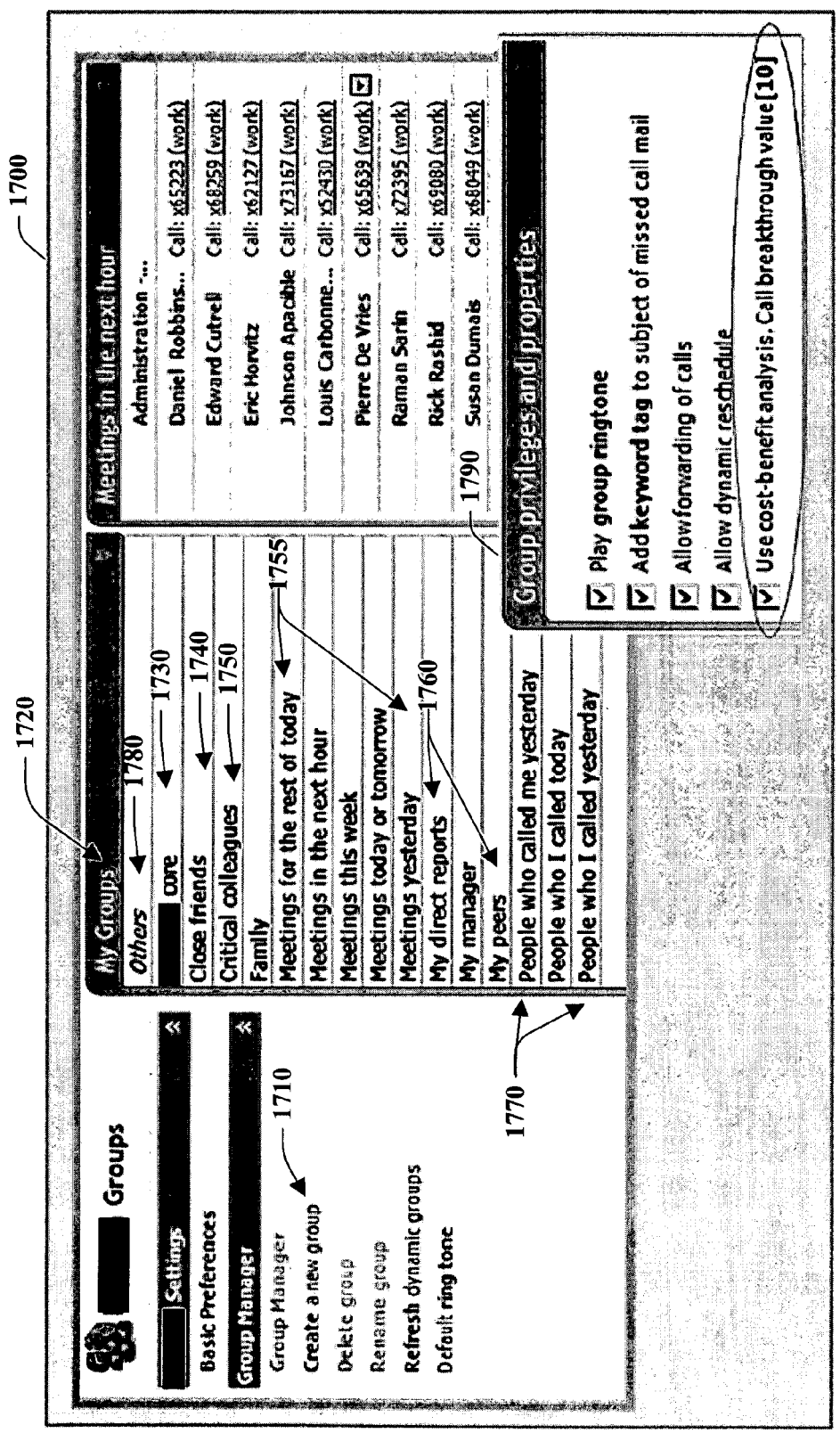
FIG. 17 illustrates a second exemplary group-manager user interface.

Proceeding to FIG. 17, an exemplary group manager user interface 1700 is illustrated. The interface 1700 can facilitate generating groups of users, forming relationships amongst the groups and/or users, and associating activities, including meetings, communication history, and projects. Typically, a respective group can be defined based on several properties that characterize relationships and activities and provide an essential abstraction for reducing the burden of preference assessment. In addition, the user interface 1700 can be employed to assign privileges and properties, including an assessment of the value of allowing a call to breakthrough to a user.

The interface 1700 can include a link 1710 to an editing means to create groups and add users (e.g., internal or external to the group and/or organization) to a group, and a region 1720 to present created groups to the user. For example, ad hoc static groups such as a "Core" group 1730, a "Close friend" group 1740, and a "Critical colleague" group 1750 can be generated and displayed within the region 1720. In addition, the interface 1700 can be employed to define and/or select a predefined class such as "relationship" groups and "dynamic" groups. Such groups can include various relationships and classes of activity that can be employed to automatically populate a group with users (e.g., members) via an examination of the relationships and activities.

In addition, classes of groups can be generated. For example, a class can be generated for a group comprising people associated with meetings 1750 within different time frames as indicated within a user's online calendar, organizational relationships 1760 denoted in an online directory, a tracking of communication history 1770, and project (e.g., via the authoring of registered documents, software development tasks, and contributors to project-servers). Meeting-centric groups typically are populated via an ongoing analysis of appointments encoded in a user's electronic calendar. Such dynamically assembled groups can include potential contactors, for example a user when the user is scheduled for a meeting within a time period such as the next hour and/or the rest of the day.

Dynamic groups can additionally include sets of people based on the history of communications via different modalities. Dynamic groups can include people who have contacted the user and/or have been contacted by the user within different time horizons. Such communication groups include people whom the user telephoned within a time period such as a day or week, and people who had successfully reached the user by telephone within the day or the week. Groupings of people by relationships can be constructed via calls to an Active Directory Service, for example. Such groups can include organizational peers, direct reports, manager, and users within various levels of the organizational hierarchy. A user falling outside of static and dynamic groups can be included with an "Other" group 1780. This group can be employed to handle a default class of users who fall outside of group specifications.

After the user defines new groups and/or adds groups, the user can assign privileges and properties to any group from a region 1790. In one aspect of the innovation, the region 1790 can be a "popup" form, window, or menu provided to the user in order for the user to enable options such as a ring tone, a forwarding privilege, and/or a rescheduling privilege to a group. In addition, the user can invoke a cost-benefit analysis for an incoming communication from a contactor defined in a group, and assess a scalar breakthrough utility to obtain a value of allowing the contactor to breakthrough to the user in real time.

Figure 18:
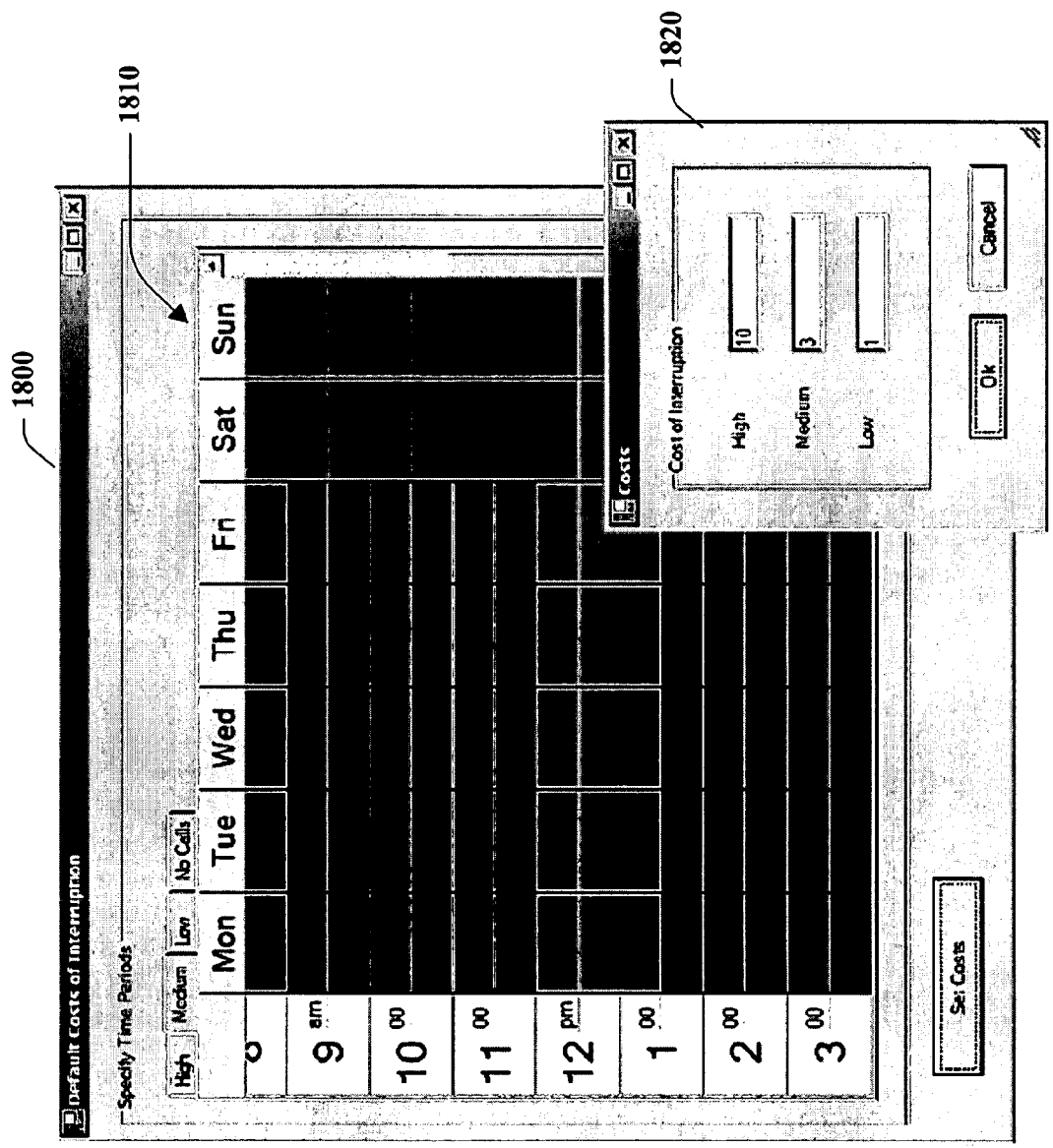
FIG. 18 illustrates a third time pattern interface.

FIG. 18 illustrates an exemplary time pattern user interface 1800. The interface 1800 provides a user a mechanism for assessing default and special costs of interruption by time of day and/or day of week, appointment properties, and device activity, or to invoke more sophisticated models to infer the expected cost of interruption. The interface 1800 includes a region 1810 that can display the days of the week. The region 1810 can be employed to assess the default costs of interruption for different times of day for the days of week. Typically, a default cost is utilized when appointments are not indicated on a user's calendar and/or when device activity is not sensed. However, it is to be appreciated that various configurations for assessing default costs for time of day and day of week can be employed. For example, a configuration can be employed in which a user can indicate a cost over time by clicking and dragging over regions of time within layers representing low, medium, and high costs of interruption. The users can assign a scalar cost value to these layers via a pop-up form 1820, for example. The user can assign a cost with the same units utilized to assign value to receiving a real-time call from another user.

In addition, the user can be provided with means for assigning cost categories to activities to different kinds of meetings, based on meeting properties available from a representation of a meeting. The properties can include the location of a meeting, an organizer of a meeting, a set of people included on an invite list to a meeting, a size of a meeting, and a subject heading of a meeting. In addition, the user can assign low, medium, or high cost labels to the online encoding of a meeting.

The users can additionally indicate whether to consider a desktop event and/or activity. The desktop event can include a user activity with a software application, and an event that often serve as an indication of a concluded task, such as the sending of email and the closing of a file or application. The user can be provided with another interface (not shown) to assign a cost to a category to an activity within different application. For example, an event for sensing a desktop activity on a client device can be employed. Such an event can handle acoustical and visual gaze events in devices that are extended with these capabilities, and provide a user a means for associating a cost linked to a perceptual event, for example as associating a cost with interrupting a detected conversation. Furthermore, it is to be appreciated that registered devices can update a whiteboard maintained on the centralized server, wherein the server can be accessed at the time a contactor attempts to communicate with a contactee.

Figure 19:
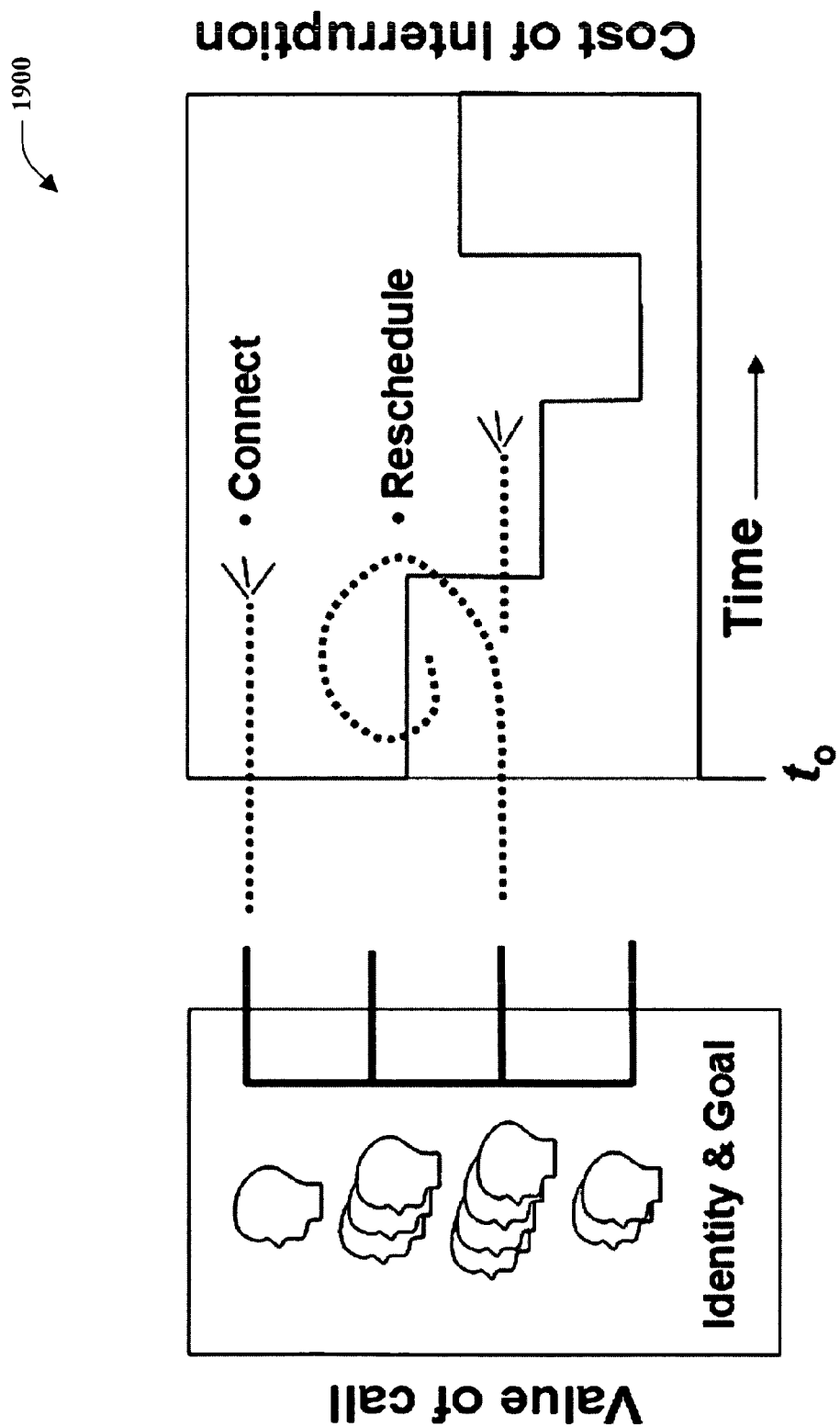
FIG. 19 illustrates an exemplary cost-benefit analysis diagram that can be utilized to determine whether to connect or reschedule a communication.

FIG. 19 illustrates an exemplary basic cost-benefit analysis diagram (diagram) 1900 that illustrates a call breakthrough and a reschedule, based on a cost of interruption and a value assigned to a communication. The analysis can consider status information when making decisions regarding handling calls. For example, information such as whether a user is at or away from the user's desk, a time of day, a day of week, a status of a current appointment, a user's proximal schedule, and a client device activity can be employed. In addition, a user can define a best telephone number based on a context and a time of day with a time-pattern palette.

In general, when a contactor calls a contactee, the service can attempt to identify respective groups that include the contactor. Since the contactor can be a member of a plurality of groups (e.g., a peer and a member of a meeting with the contactee in the next hour), the contactor can inherit a breakthrough value associated with the group with the greatest breakthrough value. Contactors who are not unified with any groups can inherit properties assigned to the "Other" group, as described above.

In addition, the system can assess a cost of interruption associated with a user's current situation. If no activity is reported by an event system operating on a client device and no appointment appears as currently active on the user's calendar, the system can access a default costs for a time of day and a day of week. If the user's activity on the client device is registered on a server, a cost associated with the activity can be provided. The system additionally can provide a cost of interruption associated with a meeting appearing as currently active on a user's calendar. Furthermore, the user can indicate whether an activity or an appointment has a higher priority, or precedence, and/or whether the highest cost of the two sources of contextual information should be taken as the cost of interruption associated with a context.

If the breakthrough value assigned to a caller exceeds the current cost of interruption, the call can be relayed to the user at the best number, established by time of day, day of week, and user presence. If the cost of interruption is larger than the value assigned to taking a communication from a contactor, the system can accept a message or attempt to reschedule the call, depending on whether the contactor is in a group that has a "seek reschedule" property. For rescheduling, the system can examine the contactee's schedule and attempt to find a proximal time when the cost of interruption will be lower than the value assigned to accepting a communication. The user can configure the system with a minimal amount of time to delay associated with scheduling an appointment for a real-time call in order to receive a notification regarding a forthcoming coming communication. The user can be alerted by a means determined during configuration, including an online appointment form, email, and/or pager option.

It is to be appreciated that the invention is not limited to the foregoing cost-benefit analysis technique. For example, the user can employ the system in a rule-based mode, and utilize policies to provide a contactor in a group to breakthrough to a user at the user's desk or another phone, or be rescheduled based on a time of day and a basic contextual state, such as an IM presence status and whether a user is away from the desk.

Figure 20:
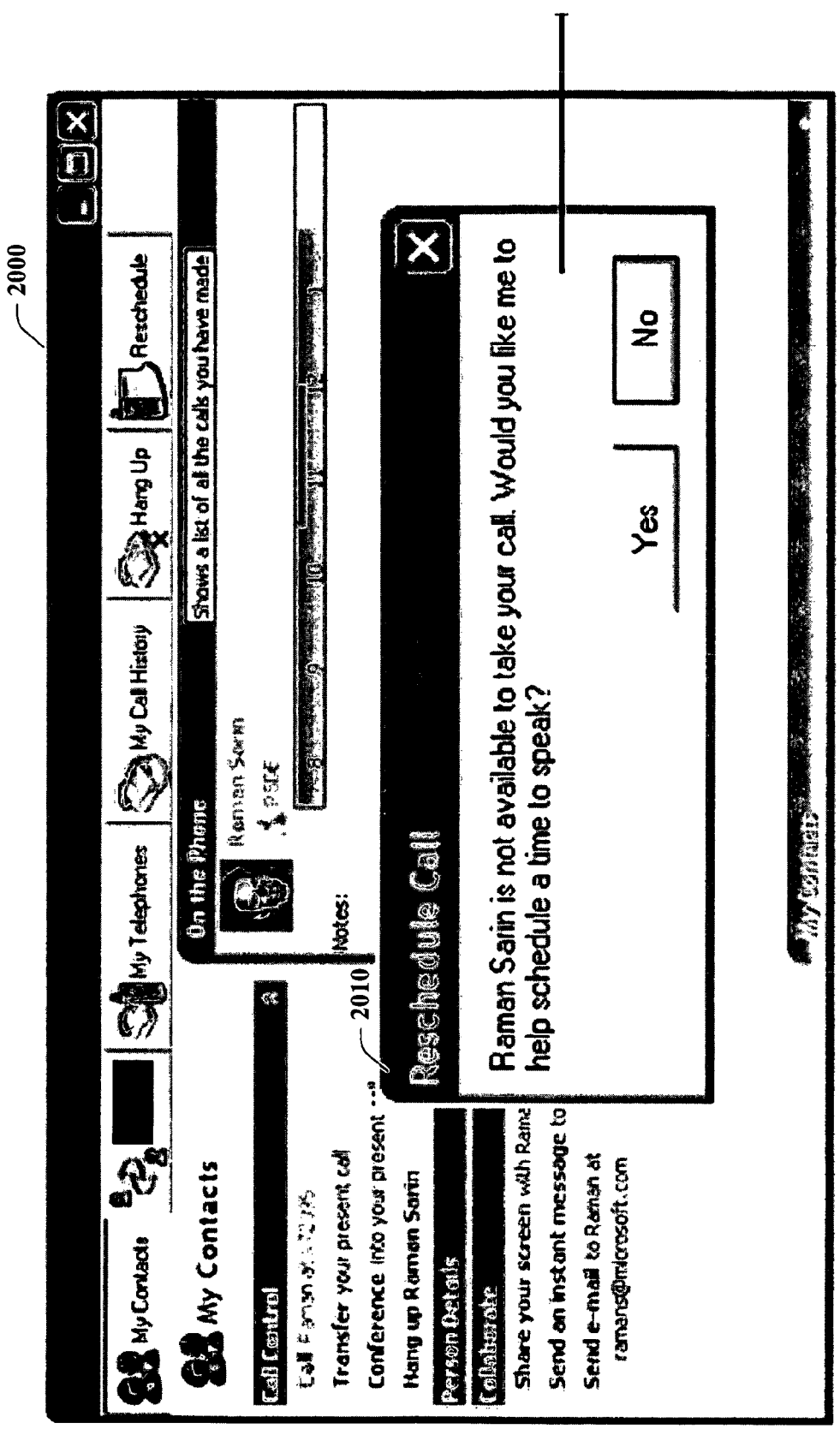
FIG. 20 illustrates a first rescheduling user interface for rescheduling a communication.

FIGS. 20 and 21 (and FIG. 51 described below) illustrate exemplary rescheduling user interfaces 2000, 2010 and 2100 that facilitate rescheduling a real-time call. The interfaces 2000, 2010 and 2100 can provide candidate times and a form to indicate a background, documents, and preferences associated with sharing displays during the scheduled real-time conversation. When the system attempts to reschedule a call, the schedule of the contactor can be utilized to facilitate the rescheduling, wherein the candidate times for the real-time conversation can be employed. In addition, the contactor can provide information associated with the call. Furthermore, the user can be provided with an opportunity to add links to documents to be reviewed prior or concurrent with the conversation. The contactor can additionally request that the call be set up to share screens during the scheduled conversation.

FIGS. 22-31 illustrate interfaces that facilitate extending the basic cost-benefit analysis techniques with statistical models of cost of interruption, in accordance with an aspect. The statistical models can be Bayesian models utilized to extend analyses by providing advanced functionality through interruptability and a set of data mining tools that provide forecasts about a user's presence and availability, for example. In addition, the advanced functionality can facilitate embedded, cross-channel best-means applications, as described in detail below.

FIGS. 22-25 illustrate exemplary interfaces that facilitate forecasting of presence and availability by a tool for forecasting the availability of different channels (hereafter referred to as Coordinate) is illustrated. The interfaces can be employed in connection with Bayesian models of the expected cost of interruption based evidence about desktop activity or from analysis of a user's calendar and presence information, wherein a machine learning approach can be utilized. Such statistical models can infer probability distributions over the cost of interruption from sensed data.

In addition, presence and availability forecasting systems such as Coordinate can be employed with the interfaces. Coordinate was built to perform data collection and analysis about key parameters utilized in the automated handling of communications, and can support communication agents with inferences about interruptability, presence, location, and device availabilities. In general, Coordinate is a server-based system that continues to examine appointments, presence, and activity across multiple devices of users with accounts on the system. Coordinate continues to log activity and presence across multiple machines. When a machine is offline, the device stores a log locally, and the dataset is uploaded to coordinate upon connection to the network. In addition, devices can share the device's current location, based on association points determined via IEEE 802.11 Wi-Fi signals, GPS information, and perceptual sensors including ambient acoustical analyses with Coordinate. Given a query, Coordinate extracts appropriate sets of relevant data from its logs, executes a Bayesian network learning algorithm, and provides forecasts of presence and cost of interruption over time. Suitable queries include the time until a user will be present at different locations, will next read email, and/or will next have access to different channels of communication (e.g., full-screen device, email, etc.), given current location and presence history, time of day, and day of week. More exotic queries include the time until conversation, sensed as being in progress, will end.

Coordinate can compute an expectation cost of interruption (ECI) as follows:

$$ECI = p(A^m \mid E, \xi) \sum_i p(c_i^m \mid E, \xi) c_i^m + (1 - p(A^m \mid E, \xi)) c^d,$$

where $A^m$ is the event of attending a meeting, $c_i^m$ is the cost of interruption associated with interruptability value i, $c^d$ is the default cost for the time period under consideration, and E represents observations about calendar attributes, the proximal context, day of week, and time of day.

Additionally, Coordinate can integrate inferences about the nature and timing of meetings into its predictions about absence and presence. The system performs an approximate meeting analysis to forego the complexity of considering multiple patterns of meetings. In the approximation, the innovation makes the assumption of meeting independence, and considers meetings separately. A subset of meetings on the user's calendar is considered active for the query based on their proximity to the times and transitions dictated in the query. For active meetings, a distinct Bayesian network model, and associated cumulative distribution, is computed for return or absence over the course of a meeting scope, which extends the meeting by periods of time before and after the meeting. In constructing the model for a respective meeting, the case-acquisition component of Coordinate identifies cases that are consistent with the proximal context defined by the query. Generally, only meetings that are marked as attended are considered. Finally, the cumulative distributions for time until return or absence for a respective meeting horizon is combined with the cumulative distribution for the no-meeting situation.

Figure 22:
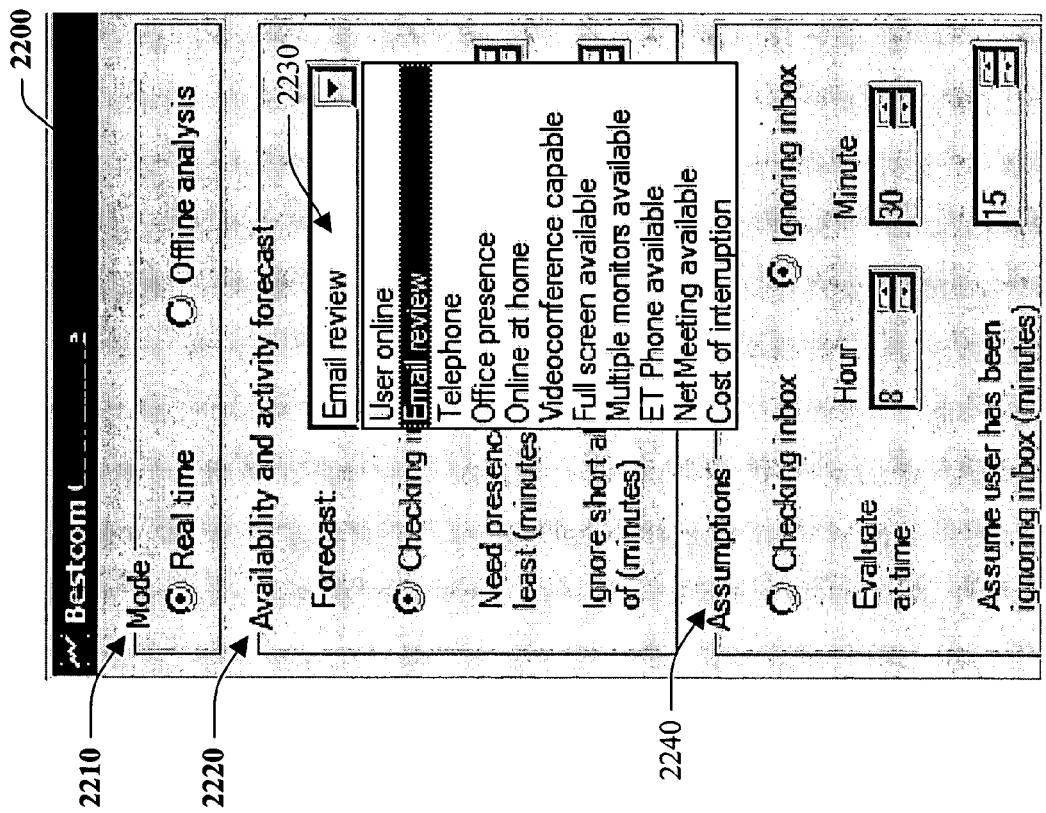
FIG. 22 illustrates an exemplary control panel interface for selecting a mode and forecast algorithm.

Proceeding to FIG. 22, a control panel of an engineering interface to Coordinate that highlights the types of queries that can be submitted to Coordinate is illustrated. In one aspect, a mode selection at 2210 can be provided that enables real time analysis based upon current observations or an offline analysis based upon past data and observations. At 2220, the type of availability and activity forecast 2230 to be retrieved can be selected. Such forecasts can include how long a user will remain online or when they will become online, forecasting time associated with an a e-mail review, time associated with a telephone call, office presence, online at home, video conference capable, full screen available, multiple monitors available, type of phone available, net meeting available, and cost of interruption selections, for example. Associated assumptions can be selected at 2240, such as whether or not the user's inbox is checked or whether the inbox should be ignored. In addition, the time for evaluation (e.g., hour and minute settings) and the time the user has been checking or ignoring their respective message inbox can be set. It is to be appreciated that the selections depicted in the interface 2200 are exemplary in nature and that forecasting can be provided in substantially any communication and/or collaboration environment between systems and/or users.

Figure 23:
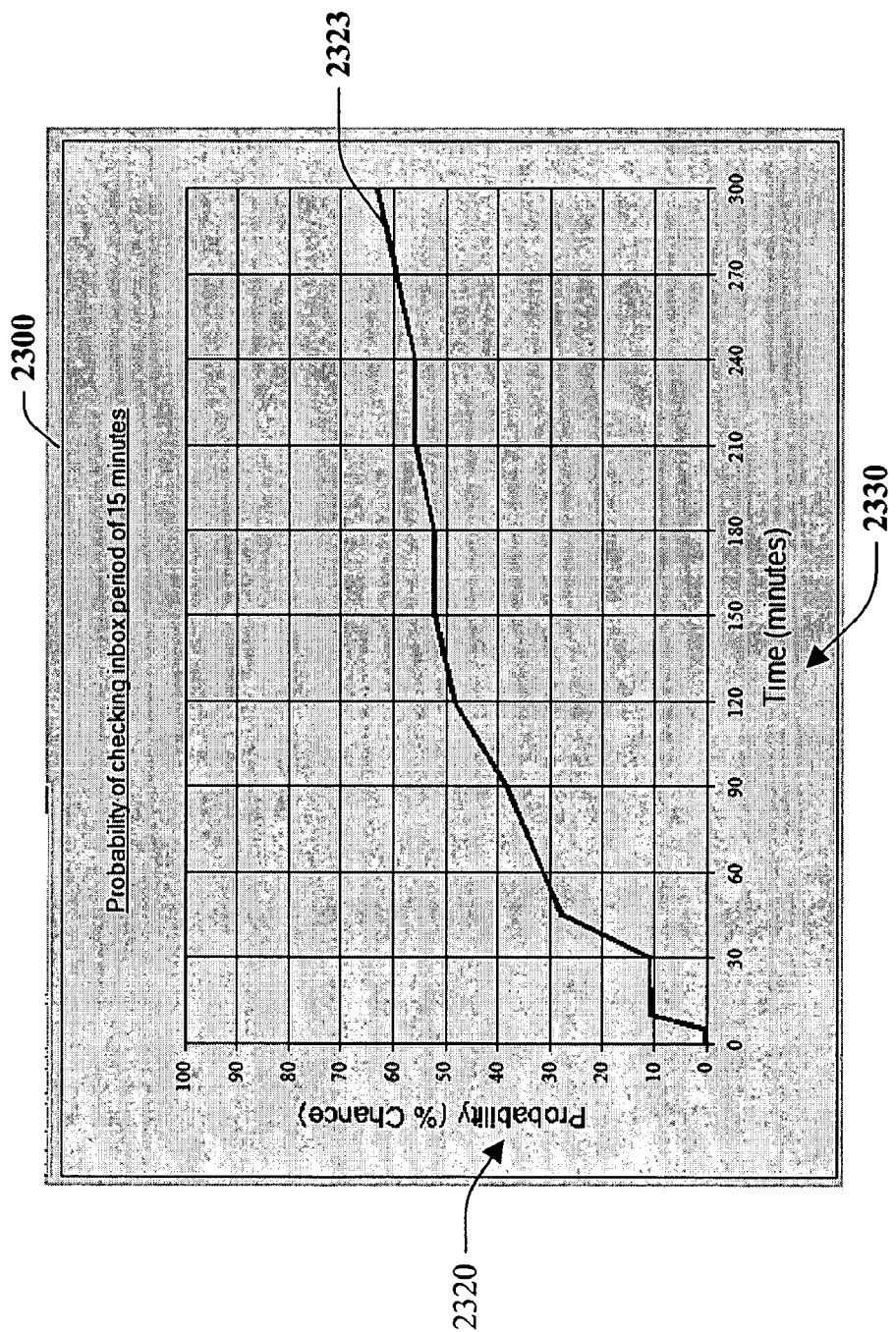
FIG. 23 illustrates an exemplary cumulative probability distribution diagram as a function of time.

Next at FIG. 23, an interface 2300 illustrates a cumulative probability distribution 2310, given for presence and channel access over time that relays the influence of the integration of the likelihood of attending meetings on the forecast of a user's availability. The vertical axis 2320 indicates probability as a percentage of chance and the horizontal axis 2330 indicates time in minutes. In the example provided, the cumulative distribution 2310 of a user returning for the no-meeting situation is depicted. In other examples, a cumulative distribution illustrating the result of folding in a consideration of active meetings, considering the likelihood that the user will attend a respective meeting can be provided.

Figure 24:
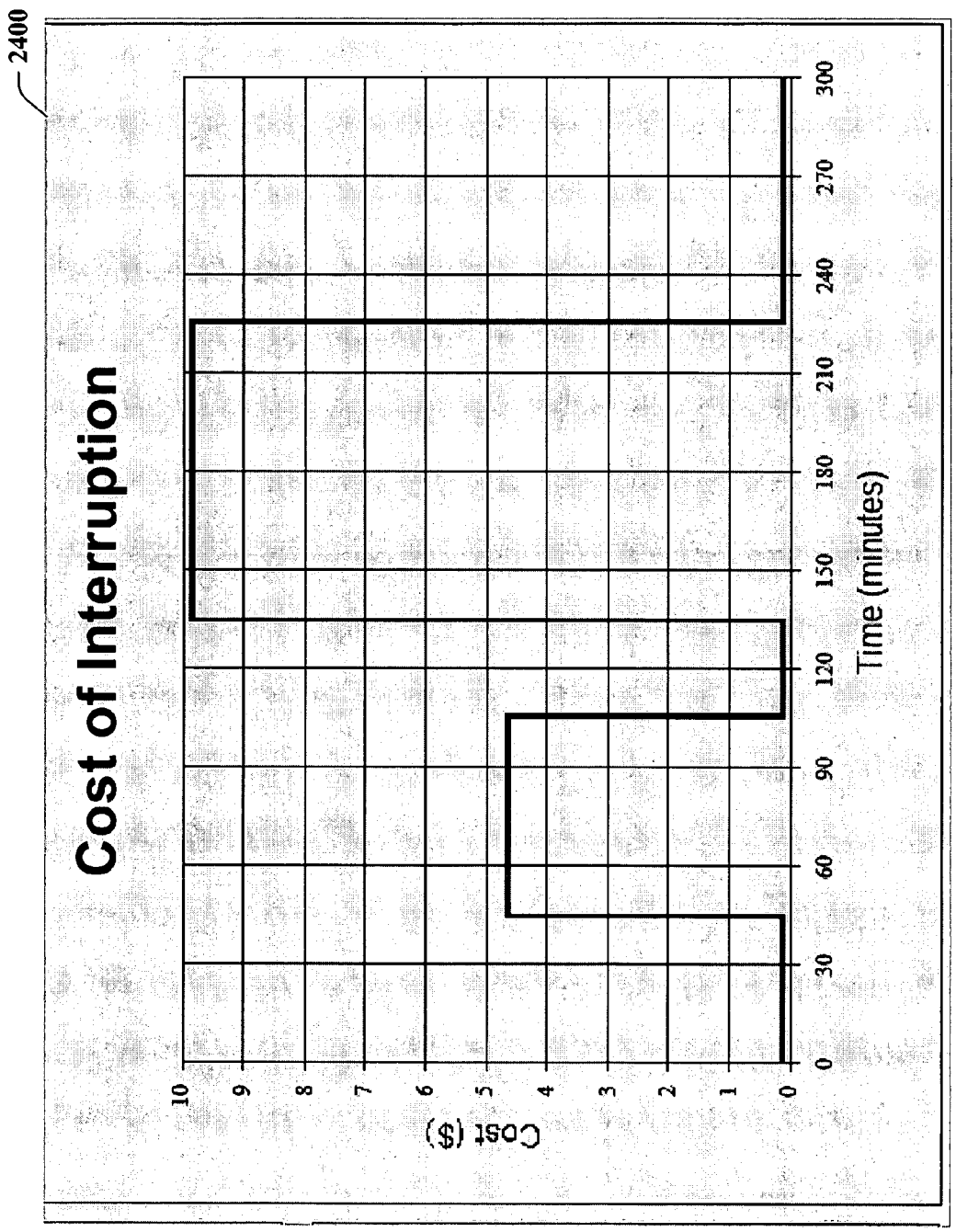
FIG. 24 illustrates an exemplary forecast of an expected cost of interruption as a function of time.

At FIG. 24, an interface 2400 illustrates a graphical forecast of the expected cost of interruption over time, based on inferences about meeting attendance, meeting interruptability, and default costs of interruption by time of day and day of week. Such inferences are based on an analysis of default costs and of properties of active appointments. Coordinate uses several Bayesian-network models learned from tagged data to infer the likelihood that a user will attend each future meeting on their schedule, as well as the probability distribution over the cost of interruption associated with each meeting based on meeting properties, gleaned from appointments. The system combines these inferences along with default costs for time of day and day of week to generate expected costs of interruption over time.

In one example, Coordinate can infer meeting attendance with 0.92 accuracy and the interruptability of meetings with a 0.81 level. The system performs the above by constructing a cumulative distribution for a presence transition for the no-meeting situation. This cumulative distribution is computed in the manner described above, employing cases consistent with the query where no meetings were scheduled or where the user indicated that a meeting was not attended. Then, for the span of time represented by a respective meeting's scope, the cumulative distributions for the no-attend and attend cases are summed together, weighted by the inferred likelihood that the user is attending or will attend the meeting.

Figure 25:
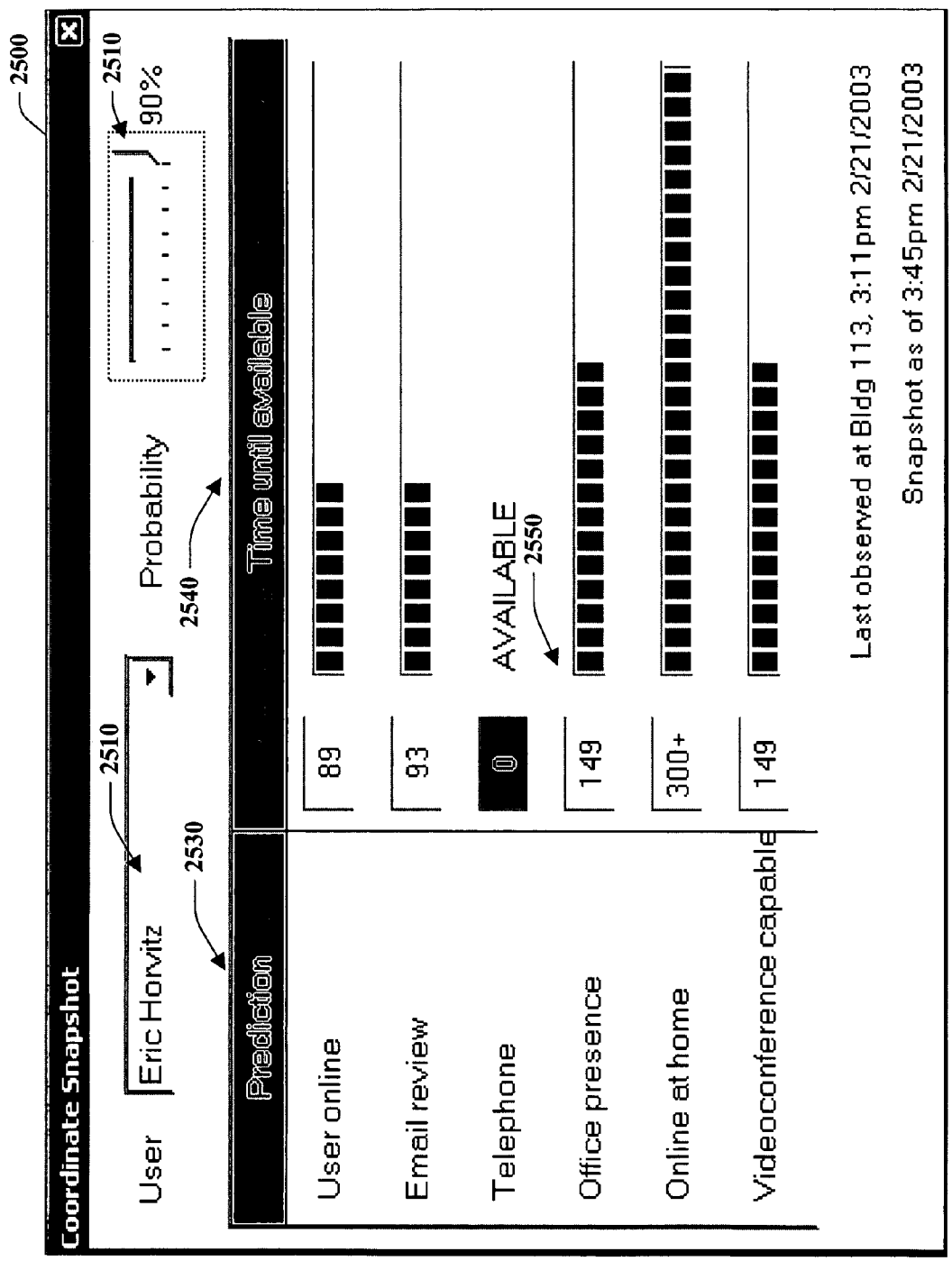
FIG. 25 illustrates an exemplary rich presence palette that includes predictions, probabilities and available time units.

Next at FIG. 25, an interface 2500 illustrates a rich presence palette that provides a summary of multiple queries, updated every few minutes, containing key information about availability for use by communication agents and by people with privileges to inspect such information. The summary provides various predictions relating to time until a user is available to communicate according to various forms of communications or capabilities. At 2510, a user is selected for the respective predictions. At 2520, a probability threshold adjustment is provided to enable users to adjust the amount of certainty associated with the various predictions. At 2530, one or more prediction categories can be provided such as user online, email review, telephone, office presence, online at home, videoconference capable, and so forth. At 2540, associated prediction times are displayed for the prediction categories at 2530. This can include graphical and/or numerical results depicting the predicted amount of time until a user is able to communicate via a given communications medium. For example, at 2550, a graphical display and numeric display indicate the user selected at 2510 will likely be in the office in about 149 minutes with a 90% probability. In addition, other information offering presence clues can be displayed in the interface 2500 such as "Last observed at Bldg 113, 3:11 pm Feb. 21, 2003."

FIGS. 26-29 illustrate exemplary interfaces and statistical models for inferring cost of interruption from real-time activities. The statistical (e.g., Bayesian) models can provide the ability to infer the probability distributions over the state of interruptability of users from sensed data via generating the expected cost of interruption (ECI) by taking the expected value of the cost associated with different states of interruptability under uncertainty. The expected cost of interruption is illustrated in equation 1.

$$ECI = \sum_i p(I_i \mid E) c(I_i) \qquad \text{Equation 1}$$

where p(I|E) refers to the probability distribution over the state of interruptability of the user given vector of evidence E and c(Ii) is the cost assigned to interruptability state i.

Figure 26:
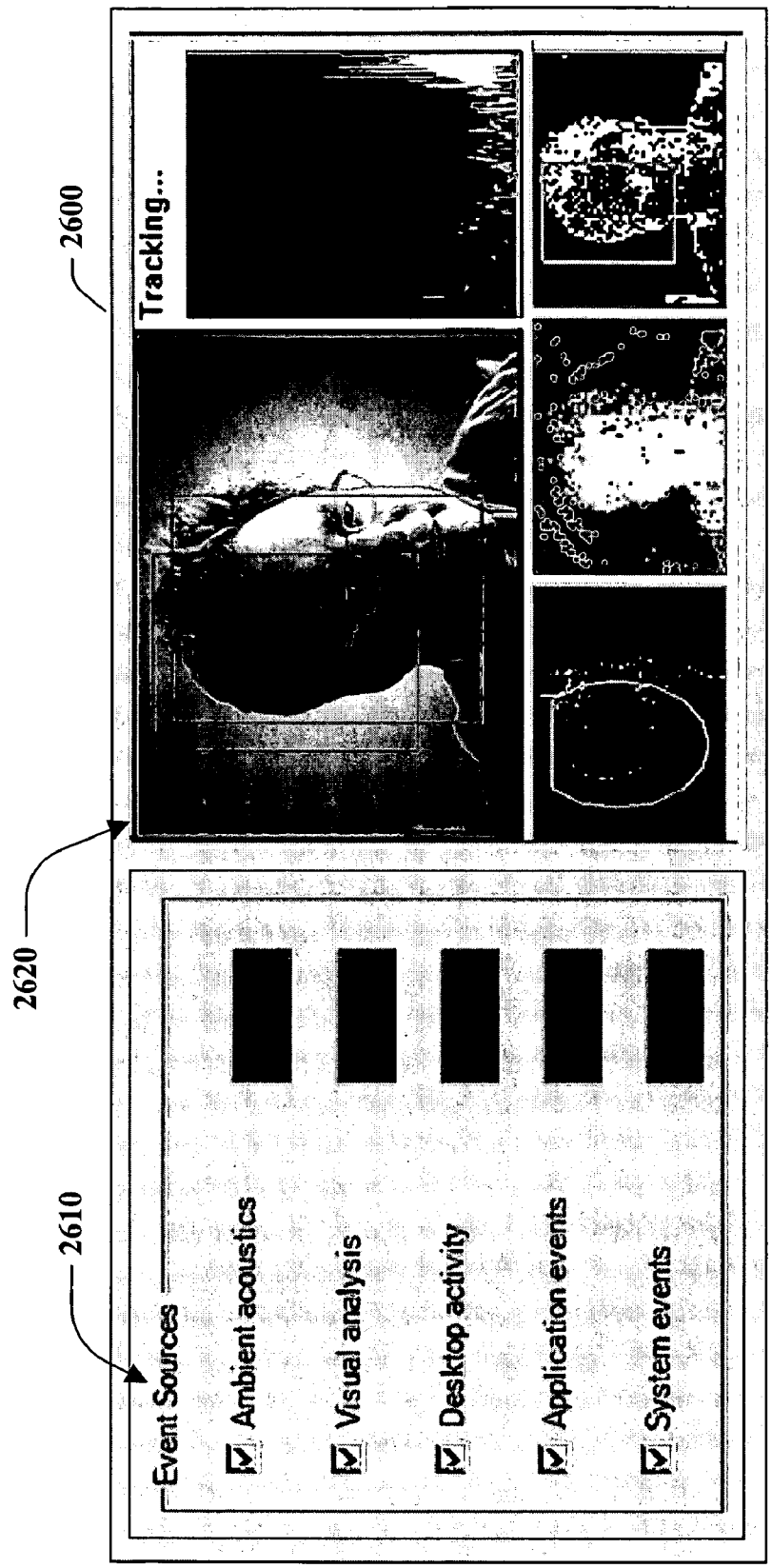
FIG. 26 illustrates an exemplary control panel for an event system.

FIG. 26 illustrates an interface 2600 that includes a control panel 2610 for an event system showing event classes and a graphical display 2620 of processing acoustical and visual information. The interface 2600 can facilitate capturing several hours of a user's sessions at a client device in synchrony with the logging of a time-stamped stream of events from the client device and sensors. The activity can include information from the Eve computer event monitoring system, ambient acoustics, and head pose information, as gleaned by a vision-based head-tracking system.

The interface 2600 considers additional details of a real-world implementation of a system that can provide the cost of interruption from a stream of sensory information. In this example, the activity of a user monitored interacting with a client device with an event sensing and abstraction system that senses computer events from an operating system and applications executed on the client. In addition, a visual pose is processed with a Bayesian head tracking system and ambient acoustical activity with an audio signal processing analysis. Finally, a user's calendar is automatically examined via an interface to an electronic calendar application (e.g., Outlook) to determine if a meeting is scheduled.

A client event system provides an abstraction tool for coalescing patterns of low-level system events into higher-level events. Considered in the models of attention are both low- and high-level events. For example, low-level states can be captured as the application being utilized, whether the user is typing, clicking with the mouse, as well as a set of higher-level events such as the pattern of switching among applications (e.g., single application focus versus switching among applications), indications of task completion (e.g., a message being sent, a file being closed, an application being closed, etc.).

For the calendar events, whether a meeting is in progress can be considered, the length of time until the meeting is over, and the location of the meeting. For the acoustical and visual analysis, it can be determined whether conversation or other signal is identified, and whether a user is present near a desktop system, and if so, whether the user is gazing at or away from the computer.

Low-level states can be observed as the application is utilized, whether the user is typing, clicking with the mouse, as well as a set of higher-level events such as the pattern of switching among applications (e.g., single application focus versus switching among applications), indications of task completion (e.g., a message being sent, a file being closed, an application being closed, . . . ). In addition, whether conversation or other signal is identified, and whether a user is gazing at or away from the computer can be indicated.

Figure 27:
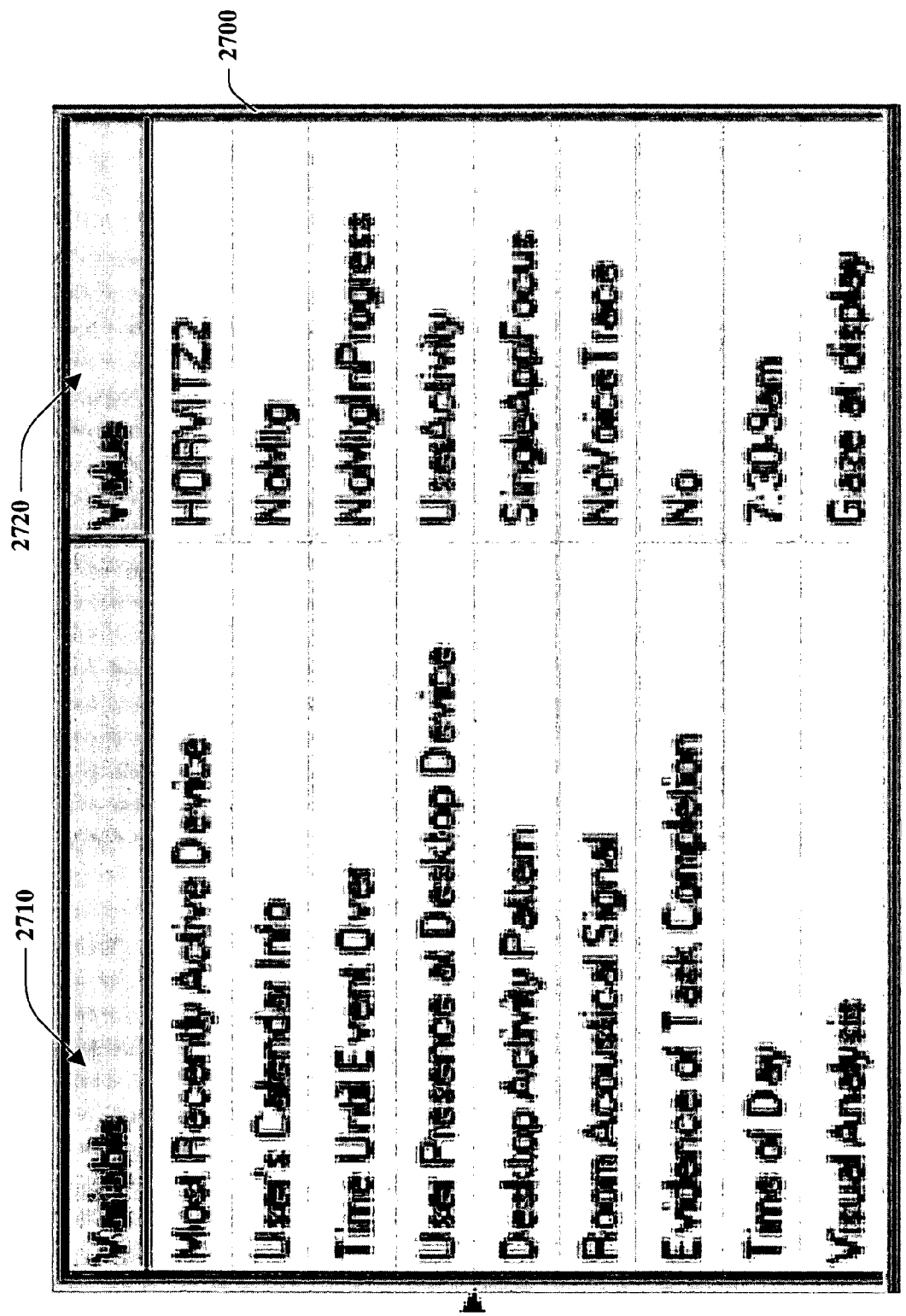
FIG. 27 illustrates exemplary variables and values for an event system.

FIG. 27 illustrates an interface 2700 that provides variables at 2710 and values at 2720 in connection with the interface 2600, described above. Various variables can provided, such as a most recently active device, user's calendar info, time until event over, user presence at desktop device, desktop activity pattern, room acoustical signal, evidence of task completion, time of day and visual analysis. Suitable respective values include Horvitz, NoMtg, NoMtgInProgress, User-activity, SingleAppFocus, NoVoiceTrace, No, 7:30-9 am and Gaze at display. It is to be appreciated additional and/or different variables and corresponding values can be employed.

Figure 28:
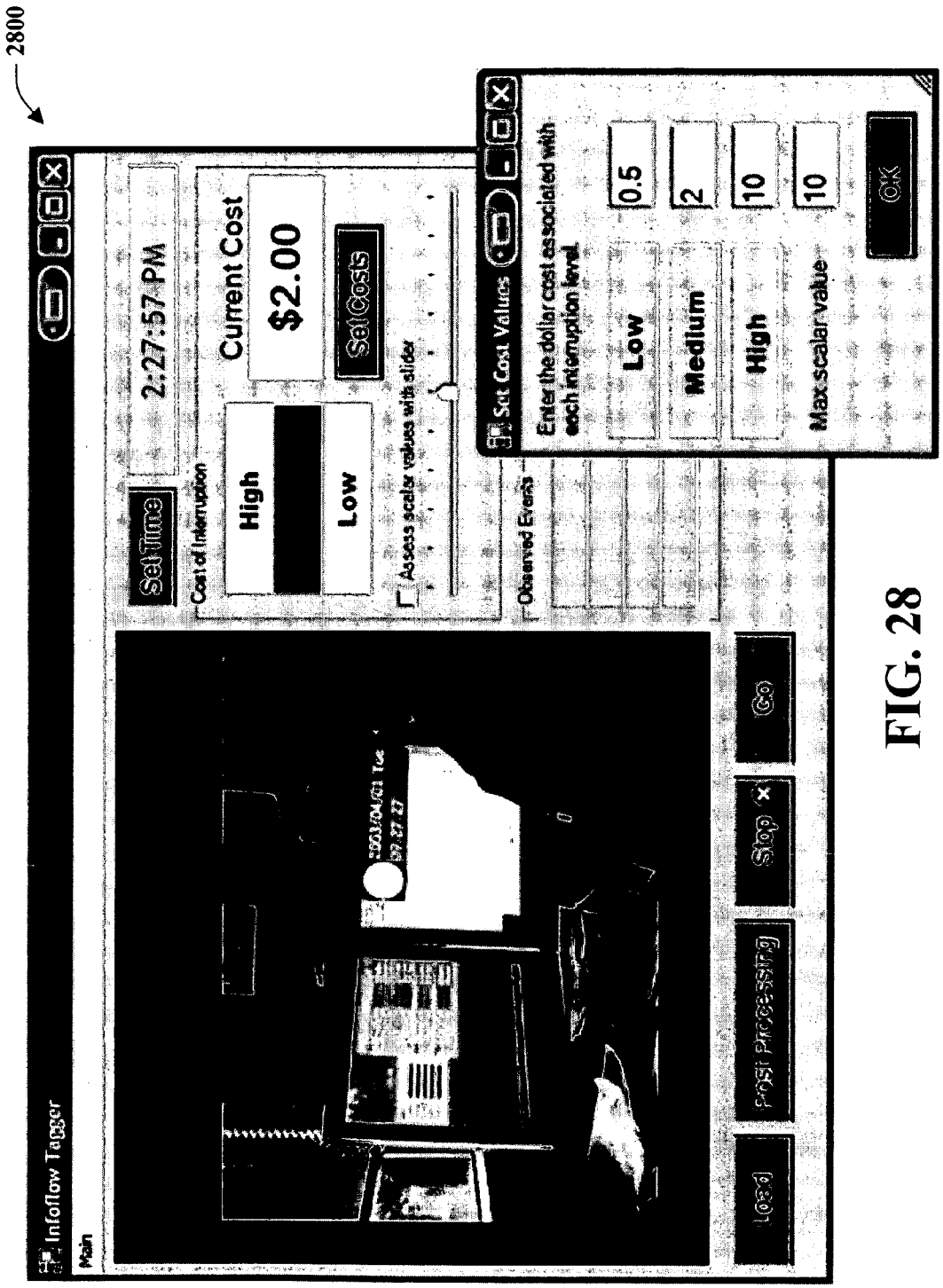
FIG. 28 illustrates an exemplary interruption-cost workbench for assigning monetary values to cost of interruption.

FIG. 28 illustrates an interface 2800 that provides an interruption-cost workbench (e.g., tagging tool) employed to capture and synchronize sensed events for use in tagging periods of time with cost of interruption with an incoming call. The interface 2800 can display video and/or audio of a training session and track the status of events from the log of events gathered during the training session. The workbench allows users to define high, medium, and low interruptability states and to assign a dollar value to each state. Time periods of as small as two-seconds can be labeled individually. The tool also allows the user to label longer swaths through time for efficiency. In addition, the interface 2800 allows users to assess finer grained states with a cost slider.

When a user has completed tagging one or more sessions of office activity, the system creates a data file containing a vector of event states for each two-second period, and associates these periods with different interruptability labels. The system performs a Bayesian learning procedure, employing structure search, and builds a Bayesian network model that predicts the cost of interruption. Variables are automatically created from the data set that addresses several kinds of predictions of the future states of a user. These include inferring the probability distributions over times until a low, a medium, or a high state of interruptability will be reached, and predictions about the times until low, medium, and high interruptability will be achieved for different amounts of time, e.g., the time until a user will remain in a state of low cost of interruption for at least 15 minutes.

By way of example, the interface 2800 can be employed for an exemplary training session where streams of desktop, calendar, and audiovisual events are captured. At labeling time, the interface 2800 displays a time-synched video encoding of a subject's office that had been captured during the training session with a digital video camera. The workbench event logging system synchronizes events monitored with the training session with scenes from the digital videotape, facilitating the labeling of segments of time and associating them with events.

Generally, the first phase of model building is event and context capture. During this phase, a video camera is employed to record a subject's activities and overall office context. The videotape with audio track is shot over the shoulder of subjects, revealing the content displayed on the user's screen in addition to a portion of the user's office environment.

The second phase of the construction of models of interruptability is tagging and assessment. The interface 2800 provides for reviewing the video captured of the screen and room during the training session, and for labeling the state of interruption at different times. The labeling effort is minimized by allowing users to specify transitions among states of interruptability; rather than requiring users to label each small segment of time, all times between transitions inherit the label of interruptability associated with the transition that defines the start of each distinct segment. The interface 2800 provides a manner in which the variables representing the cost of interruptability are discretized and how cost is represented. Subjects can encode their assessments about their interruptability at different times in at least two ways.

With a first approach, subjects tag periods of time viewed on the videotape as high, medium, and low interruptability. As displayed in the foreground of FIG. 28, users are asked to separately map dollar values to each of the high-level states, for different kinds of interruptions, reflecting the willingness to pay to avoid an interruption during the states labeled as high, medium, and low cost of interruption. A dollar value is sought for low, medium, and high for each distinct type of interruption. In a second approach to labeling time segments of a training session, subjects can define a scale and build models that reason directly about the probability distribution over real-valued values, representing the costs of interruption.

In a generation and testing phase, a Bayesian network can be constructed from the tagged case library of case generated in the first two approaches described above. The task of tagging one or more sessions of office activity creates a database of two-second periods of time tagged with an interruptability label and containing a vector of logged event states. The system then performs a Bayesian learning procedure, employing graph structure search, and builds a Bayesian network model that can be used for real-time predictions about the state of interruptability of users, given a live stream of sensed events.

At runtime, the probability distribution over the states of interruptability inferred by the model is used to compute the expected costs of interruption of different classes of interruption. For each disruption under consideration, an expected cost of interruptability is computed by invoking an expectation similar to the expected value calculation defined above, substituting the likelihood of different states of interruptability, $p(I_i|E)$, for the explicit states of attention as follows:

$$ECI = \sum_j p(I_i | E) u(D_i, I_j)$$

Beyond reasoning about the current state of interruptability, the subject innovation can also generate several variables representing attentional forecasts about future state of interruptability. These include variables that capture inferences about the probability distributions over times until a low, medium, or high state of interruptability will be reached, and more specialized variables representing the times until states of interruptability will be achieved that will persist for different amounts of time. As an example, a variable in this family represents the time until a user will remain in a state of low cost of interruption for at least 15 minutes. Such predictions are generally important for deliberating about if, when, and how to mediate communications. For testing the predictions of the generated models, the interface 2800 allows users to hold out a portion of data from training, to use the hold out cases for testing the model. For experiments, models are trained with 85 percent of the data and held out 15 percent for testing.

Figure 29:
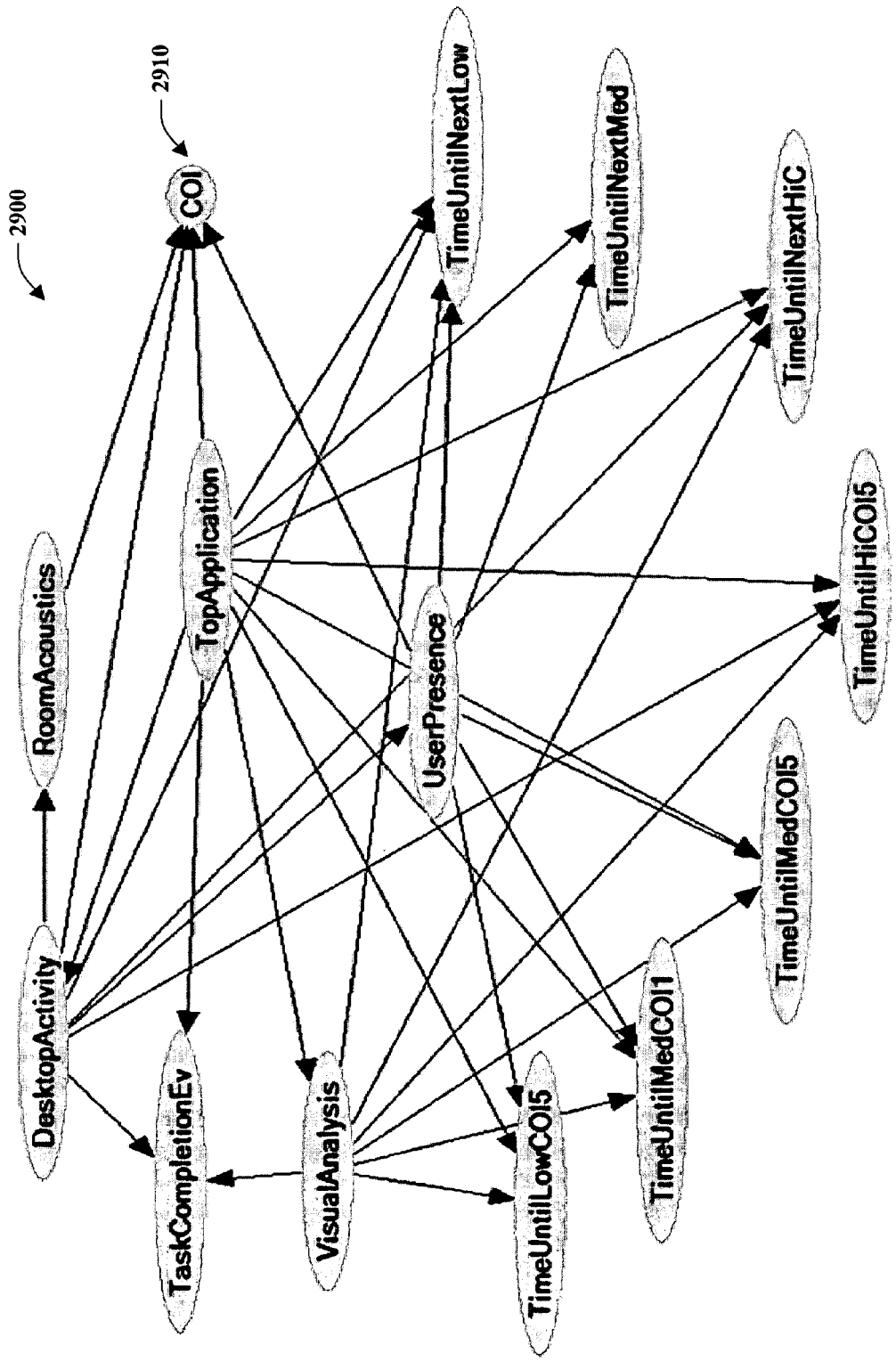
FIG. 29 illustrates an exemplary decision model that can be employed in accordance with an aspect thereof.

FIG. 29 illustrates an exemplary model 2900, in accordance with an aspect of the innovation. The model 2900 depicts a Bayesian network model that can be generated by the workbench described above. The model 2900 can be constructed from a log of a subject's activities tagged by cost of interruptability. For example, the database of cases represents activities in the subject's office and with the subject's computer during a one-hour period. The database can include 1800 two-second cases, representing 43 state transitions among interruptability levels. Eighty percent of the cases were used to build the model. The other 15 percent was held out for training.

The variable representing the current state of interruptability (with states low, medium, and high) is labeled COI at 2910. Other variables include forecasts Time Until Next Low, Time Until Next Medium, Time Until Next High, and variants of these variables representing the time until low, medium, and high costs of interruption will persist for different periods of time. Forecasting variables were discretized into five time states, including Less than one minute, 1-5 minutes, 5-10 minutes, 10-15 minutes, and greater than 15 minutes.

Figure 30:
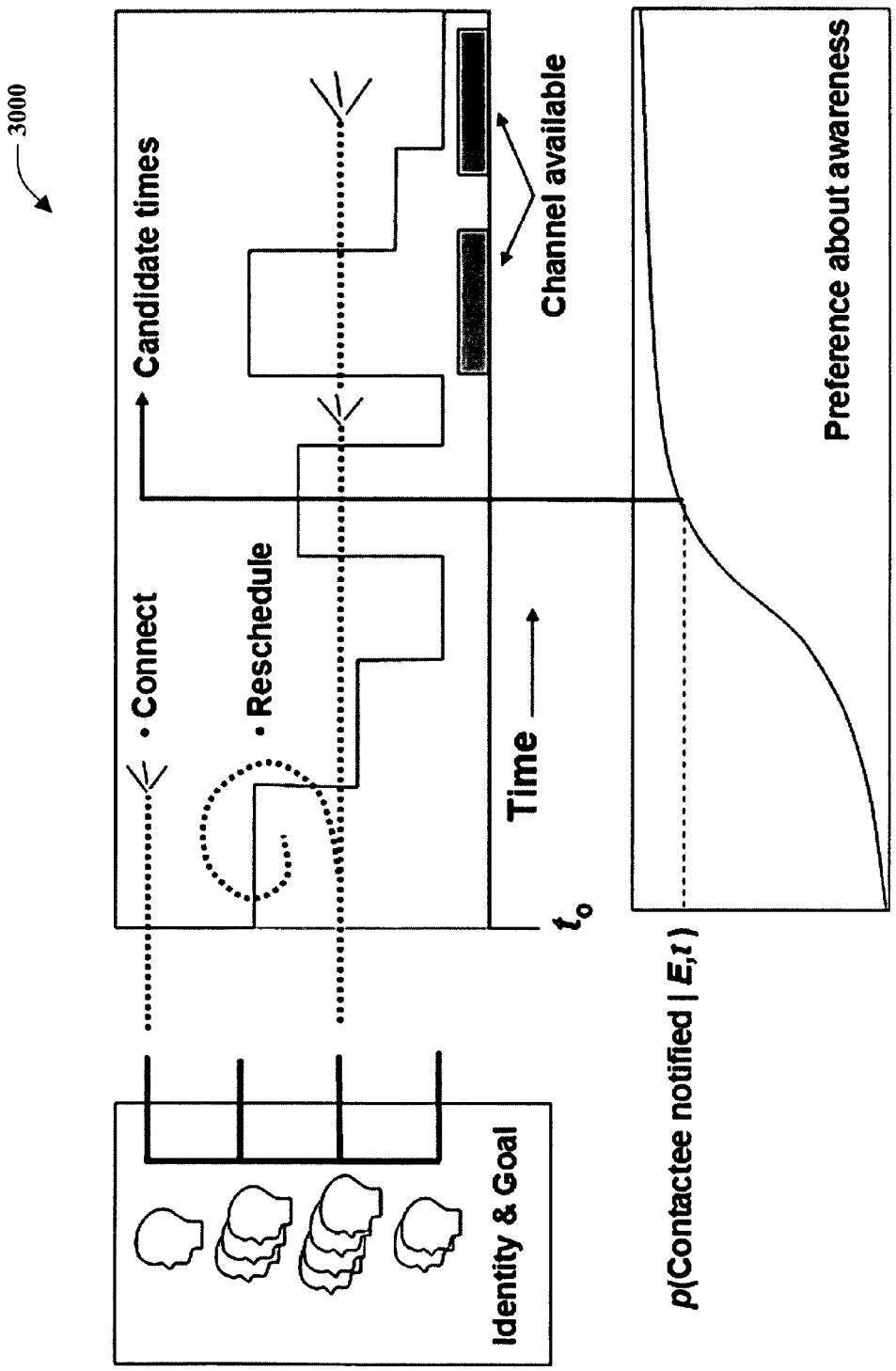
FIG. 30 illustrates an exemplary diagram that utilizes probabilities in connection with caller preferences and cost of interruption to select a suitable communication time and channel.

FIG. 30 illustrates an architecture 3000 that employs a richer decision model that considers cost of interruption and overlays a consideration of the likelihood that users will have time to be notified about a rescheduled call, as well as the availability of a desired channel. The architecture further considers inferences about a user's awareness about a scheduled communication will change over time, as well as overlaying constraints of the availability of a preferred channel on scheduling. The value of the expected cost of interruption as well as inferences about the probability distribution over time until future states of expected cost of interruption are accessed from Coordinate and are continually updated on a whiteboard hosted by the server. These inferences are made available for communication decision making. An advanced version uses these inferences in decision-making, trading off the inferred expected cost of interruption with the value assigned to callers.

In addition, the architecture 3000 provides advanced users with several other extensions, based on forecasting services. During a reschedule operation, a simpler version uses simple delayed scheduling policies that serve as heuristics that give the contactee time to be notified about the scheduled communication. Rather than rely on simple delay rules, the advanced version leverages inferences about when a user is likely to read email, so as to dynamically determine how far into the future a call should be scheduled based on preferences about the contactees desire to be aware of these events. For example, a user can specify that a reschedule should not be for any time sooner than a slot associated with a 0.9 probability of the contactor being appraised about the forthcoming call. Furthermore, the architecture can leverage inferences about device availabilities over time to understand when a particular communication channel will likely be available, based on the contactor's group or assertions. For example, the system can seek times when a videoconference capability may be easily available in cases where a videoconference was requested by the contactor.

Figure 31:
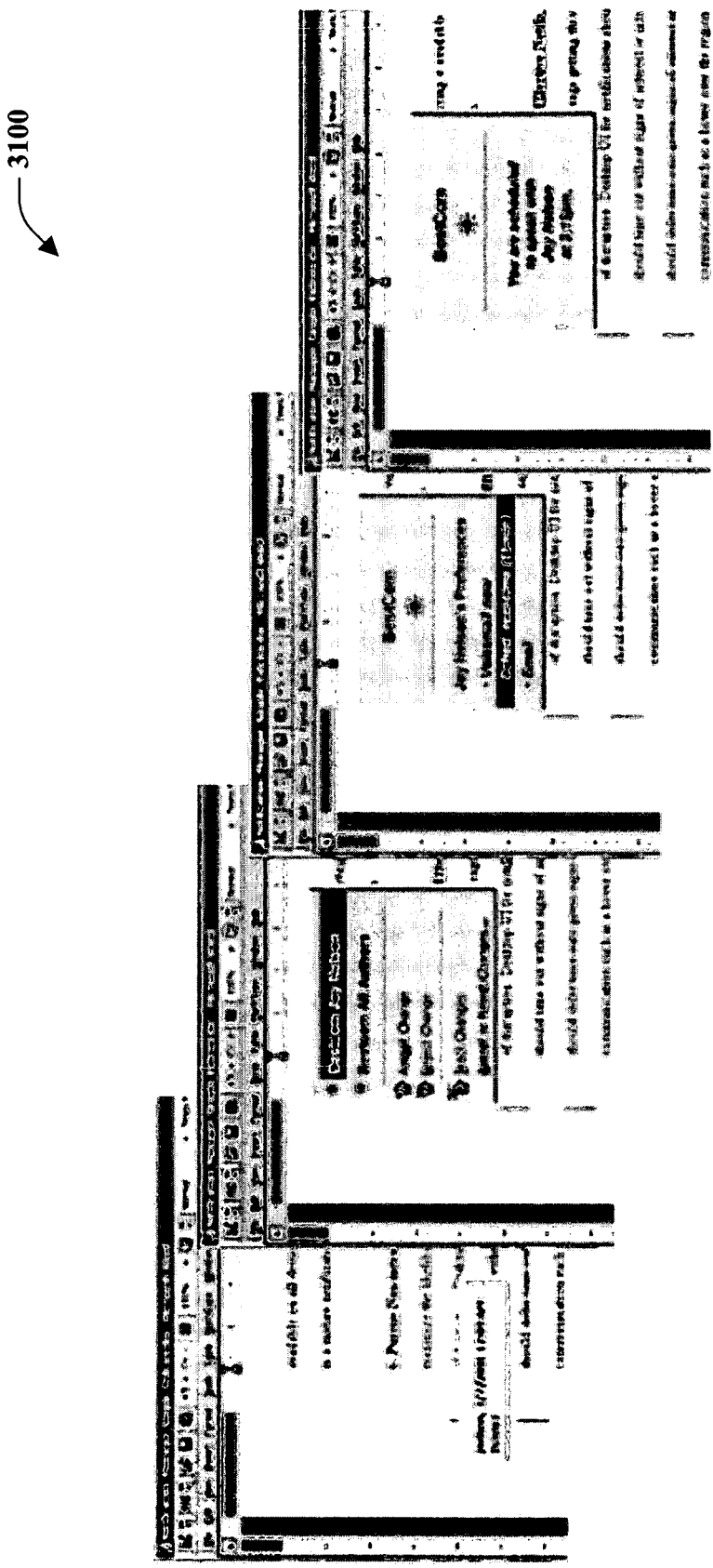
FIG. 31 illustrates various communication actions via a plurality of exemplary graphical user interfaces.

FIG. 31 illustrates the interactions between a contactor and an embedded service about a communication action. When embedded in computer applications, the service allows users to punch through applications, dragging key pointers and bits into a conversation, and decisions about the best timing and channel for a communication. For example, and as depicted, the service can be embedded in a word processor, and can be invoked via a menu item. After invocation, the server can receive back a list of communications actions, sorted by the contactee's preferences.

In this case, the user has engaged the service while reviewing edits by the co-author of a document. By right clicking on an edit, the user can access a menu item. In this case, the contactor's schema that is relayed to the server, in response to a request to communicate, includes information about the document and particular revision at the focus of the user's attention. There is also information that the user currently has access to a full-display client. The contactee's computed or accessed preferences are relayed to the user. As indicated, options include voicemail now, scheduling a real-time conversation in 15 minutes, or sending email. The contactor chooses to schedule to speak with the contactee in 15 minutes and invokes a scheduling service.

Figure 32:
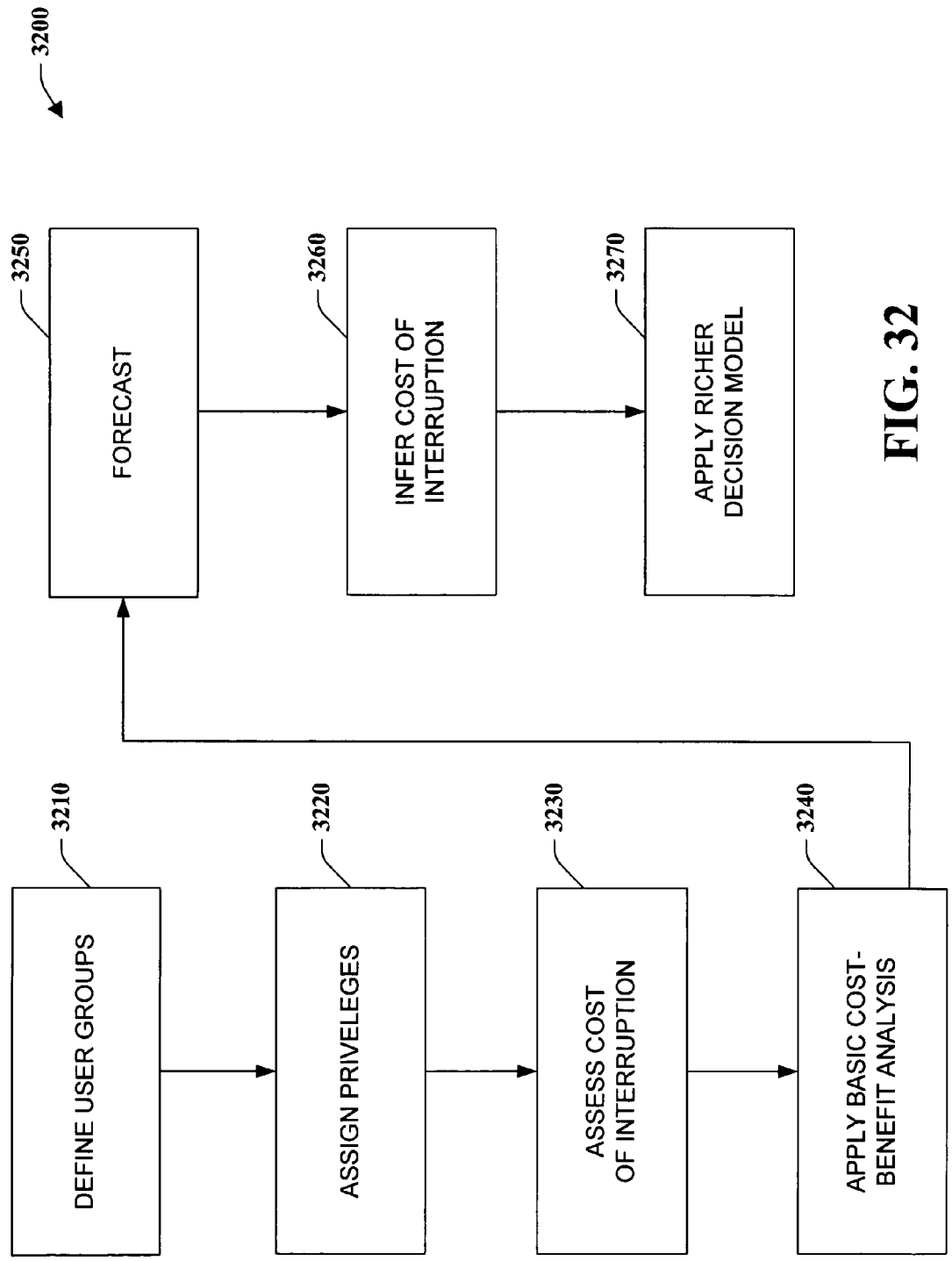
FIG. 32 illustrates an exemplary methodology for interpersonal communication.

FIG. 32 illustrates a methodology in accordance with an aspect. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement a methodology. In addition, those skilled in the art will understand and appreciate that a methodology could alternatively be represented as a series of interrelated states (e.g., state diagram) or events.

Proceeding to FIG. 32, at 3210 groups of users and relationships amongst the groups and/or users can be generated and/or configured. The group can be defined based on properties that characterize relationships and activities and provide an essential abstraction for reducing the burden of preference assessment. In addition, privileges and properties, including an assessment of the value of allowing a call to breakthrough to a user, can be assigned. Various groups can be generated, as described supra. In addition, classes of groups that comprise users associated with meetings within different time frames, organizational relationships, history, and project can be generated.

Meeting-centric groups typically are populated via an ongoing analysis of appointments encoded in a user's electronic calendar. Dynamic groups can include sets of people based on the history of communications via different modalities. Dynamic groups can include people who have contacted the user and/or have been contacted by the user within different time horizons. Groupings of people by relationships can be achieved via calls to an Active Directory Service, for example. Such groups can include organizational peers, direct reports, manager, and users within various levels of the organizational hierarchy. A user falling outside of static and dynamic groups can be included with a miscellaneous, or default group.

Next at 3220, the privileges and properties can be assigned to the groups. For example, options such as a ring tone, a forwarding privilege, and/or a rescheduling privilege can be assigned to a group. In addition, the user can invoke a cost-benefit analysis for an incoming communication from a contactor defined in a group, and assess a scalar breakthrough utility to obtain a value of allowing the contactor to breakthrough to the user in real time.

It is to be appreciated that some groups of callers can be granted special privileges by recipients that allow the callers to break through to recipients even when they are busy, to note that the breakthrough occurred and to provide a means for reimbursement for the breakthrough, either via real-time agreement or a longer-term policy. For example, a recipient may allow a caller (e.g., an unsolicited marketing call) to breakthrough to them if they pay a fee. Alternatively, a set of collaborators may maintain a currency of owed "breakthrough when busy" situations that can be used by the recipients when they wish to contact the caller. A caller can break through to a busy caller but a "breakthrough token" is given to the recipient as a result of accepting the call. Such tokens may be exchangeable with dollars, or may remain simply as a breakthrough token to be used to breakthrough to the caller, when the recipient later needs to speak with that person. Such tokens can allow for a social convention of exchangeable disruptions at an organization.

At reference numeral 3230, a cost of interruption can be assessed, including assessing default and special costs of interruption by time of day and/or day of week, appointment properties, and device activity, or to invoke more sophisticated models to infer the expected cost of interruption. Typically, a default cost is utilized when appointments are not indicated on a user's calendar and/or when device activity is not sensed. However, it is to be appreciated that various configurations for assessing default costs for time of day and day of week can be employed. For example, a configuration can be employed in which a user can indicate a cost over time (e.g., as low, medium, and high).

In addition, the user can assign cost categories to activities to different kinds of meetings, based on meeting properties available from a representation of a meeting. The properties can include the location of a meeting, an organizer of a meeting, a set of people included on an invite list to a meeting, a size of a meeting, and a subject heading of a meeting. In addition, the user can assign low, medium, or high cost labels to the online encoding of a meeting. The users can additionally indicate whether to consider a desktop event and/or activity. The desktop event can include a user activity with a software application, and an event that often serve as an indication of a concluded task, such as the sending of email and the closing of a file or application.

Furthermore, the user can assign a cost to a category to an activity within different application. For example, a system event system for sensing one or more desktop activities on a client device can be employed. Such events can include acoustical and visual gaze events in devices that are extended with these capabilities, and provide a user a means for associating a cost linked to a perceptual event, for example as associating a cost with interrupting a detected conversation.

Turning to reference numeral 3240, a basic cost-benefit analysis can be applied. A call breakthrough and a reschedule, based on a cost of interruption and a value assigned to a communication can be employed. The analysis can consider IM status information when making decisions regarding handling calls. For example, information such as whether a user is at or away from the user's desk, a time of day, a day of week, a status of a current appointment, a user's proximal schedule, and a client device activity can be employed. In addition, a user can define a best telephone number based on a context and a time of day with a time-pattern palette.

In addition, the system can assess a cost of interruption associated with a user's current situation. If no activity is reported and no appointment appears as currently active on the user's calendar, the system can access a default costs for a time of day and a day of week. If the user's activity on the client device is registered on a server, a cost associated with the activity can be provided. The system can provide a cost of interruption associated with a meeting appearing as currently active on a user's calendar. Furthermore, the user can indicate whether an activity or an appointment has a higher priority, or precedence, and/or whether the highest cost of the two sources of contextual information should be taken as the cost of interruption associated with a context.

If the breakthrough value assigned to a caller exceeds the current cost of interruption, the call can be relayed to the user at the best number, established by time of day, day of week, and user presence. If the cost of interruption is larger than the value assigned to taking a communication from a contactor, the system can accept a message or attempt to reschedule the call, depending on whether the contactor is in a group that has a "seek reschedule" property. For rescheduling, the system can examine the contactee's schedule and attempt to find a proximal time when the cost of interruption will be lower than the value assigned to accepting a communication. The user can configure the system with a minimal amount of time to delay associated with scheduling an appointment for a real-time call in order to receive a notification regarding a forthcoming coming communication. The user can be alerted by a means determined during configuration, including an online appointment form, email, and/or pager option.

When the system attempts to reschedule a call, the schedule of the contactor can be utilized to facilitate the rescheduling, wherein the candidate times for the real-time conversation can be employed. In addition, the contactor can provide information associated with the call. Furthermore, the user can be provided with an opportunity to add links to documents to be reviewed prior or concurrent with the conversation. The contactor can additionally request that the call be set up to share screens during the scheduled conversation.

Next at 3250, the type of availability and activity forecast can be indicated. Such forecasts can include how long a user will remain online or when they will become online, forecasting time associated with an a e-mail review, time associated with a telephone call, office presence, online at home, video conference capable, full screen available, multiple monitors available, type of phone available, net meeting available, and cost of interruption selections, for example. Associated assumptions can be selected, such as whether or not the user's inbox is checked or whether the inbox should be ignored. In addition, the time for evaluation (e.g., hour and minute settings) and the time the user has been checking or ignoring their respective message inbox can be set.

After indicating the type of availability and activity forecast, a cumulative probability distribution, given for presence and channel access over time, that relays the influence of the integration of the likelihood of attending meetings on the forecast of a user's availability, can be generated. In other examples, a cumulative distribution based on considering active meetings and the likelihood that the user will attend a respective meeting can be utilized. A forecast of the expected cost of interruption over time, based on inferences about meeting attendance, meeting interruptability, and default costs of interruption by time of day and day of week, can be generated. Such inferences are based on an analysis of default costs and of properties of active appointments. Bayesian-network models can be utilize to learn from tagged data to infer the likelihood that a user will attend each future meeting on their schedule, as well as the probability distribution over the cost of interruption associated with each meeting based on meeting properties, gleaned from appointments. The system combines these inferences along with default costs for time of day and day of week to generate expected costs of interruption over time.

A summary of multiple queries, updated every few minutes, containing key information about availability for use by communication agents and by people with privileges to inspect such information, can be generated. The summary can provide various predictions relating to time until a user is available to communicate according to various forms of communications or capabilities.

At 3260, inferences related to the cost of interruption from real-time activities can be generated. Statistical models can be utilized to infer the probability distributions over the state of interpretability of users from sensed data via generating the expected cost of interruption (ECI) by taking the expected value of the cost associated with different states of interruptability under uncertainty.

Next at reference numeral 3270, a richer decision model can be employed. The model can consider the cost of interruption, and overlays a consideration of the likelihood that users will have time to be notified about a rescheduled call, as well as the availability of a desired channel. The model considers inferences about a user's awareness about a scheduled communication will change over time, as well as overlaying constraints of the availability of a preferred channel on scheduling. The value of the expected cost of interruption as well as inferences about the probability distribution over time until future states of expected cost of interruption are accessed from Coordinate and are continually updated. These inferences are made available for communication decision making. Advanced versions utilize the inferences in decision-making, trading off the inferred expected cost of interruption with the value assigned to callers.

In addition, the model can provides advanced several other extensions, based on forecasting, which leverages inferences about when a user is likely to read email, so as to dynamically determine how far into the future a call should be scheduled based on preferences about the contactees desire to be aware of these events. For example, a user can specify that a reschedule should not be for any time sooner than a slot associated with a 0.9 probability of the contactor being appraised about the forthcoming call. Furthermore, the model can leverage inferences about device availabilities over time to understand when a particular communication channel will likely be available, based on the contactor's group or assertions. For example, the system can seek times when a videoconference capability may be easily available in cases where a videoconference was requested by the contactor.

FIG. 33 illustrates an exemplary communication routing method. At 3310, a communication is received. The communication can be received by an interface (e.g., coupled to a PBX) that handles incoming and/or outgoing communications. It is to be appreciated that this interface can be software and/or hardware based, hardwired and/or wireless, reside local and/or remote to a communication transmitting system, and/or support essentially any known communication protocol. Moreover, the communication can be from a one or more of the telephones (e.g., conventional hardwired, cordless, and/or wireless) telephones and/or other services such as VoIP, a beeper, a pager, etc.

At reference numeral 3320, the communication and/or associated information is scrutinized to determine a suitable conveyance. For example, the communication can include information indicative of its content, a sender, a recipient, an ability of the communication to be delayed, a time of day, a day of week, an importance, etc. Such information can be obtained and utilized to facilitate determining the communication path, including, for example, conveying the communication to the recipient and/or another recipient in a manner consonant with the sender's desired mode of communication and/or an alternative mode, a delayed manner, and/or rejecting the communication. In addition, information related to the sender can be utilized to facilitate determining a suitable path. For example, the sender can be associated with a priority or other information indicating a relative importance of the sender and/or the message to the recipient. Upon determining a conveyance path, at 330, the communication can be suitably routed, as described herein.

FIG. 34 illustrates an exemplary communication routing method. At 3410, a communication is received. The communication can be received by an interface (e.g., coupled to a PBX) that handles incoming and/or outgoing communications. It is to be appreciated that this interface can be software and/or hardware based, hardwired and/or wireless, reside local and/or remote to a communication transmitting system, and/or support essentially any known communication protocol.

At reference numeral 3420, one or more policies (e.g., rules, preferences, properties . . . ) can be obtained. Such policies can provide user-defined information related to a cost(s) and/or benefit(s) of handling disparate communications for a sender(s), a recipient(s), and/or a communication device(s). This information allows a user to render assertions about their interruptability, for example, based on observations about their content. In addition, it provides for assessment of policies regarding communication priority and cost of interruption. For example, the user can define a changing cost of interruption (e.g., an analog and a discrete function from low to high) with accepting a communication in real-time as a function of time. In addition, the user can assign various priorities (e.g., from low to high) to communication transmitting devices and/or a cost of deferring a communication.

At reference numeral 3430, the communication, policies, and/or associated information can be scrutinized, as describe in detail above, to determine a suitable conveyance path. For example, when a communication from a device with a priority equal to or greater than the present cost of interruption is received, the communication can be provided to the recipient.

It is to be appreciated that this communication can be provided to the recipient as specified by the sender and/or another mechanism. In another example, when the communication is associated with a communication device with priority lower that the present cost of interruption, the communication can be rescheduled, discarded, and/or saved for later retrieval (e.g., voicemail and other messaging service). At 3440, the communication can be suitably routed, as described herein.

Figure 35:
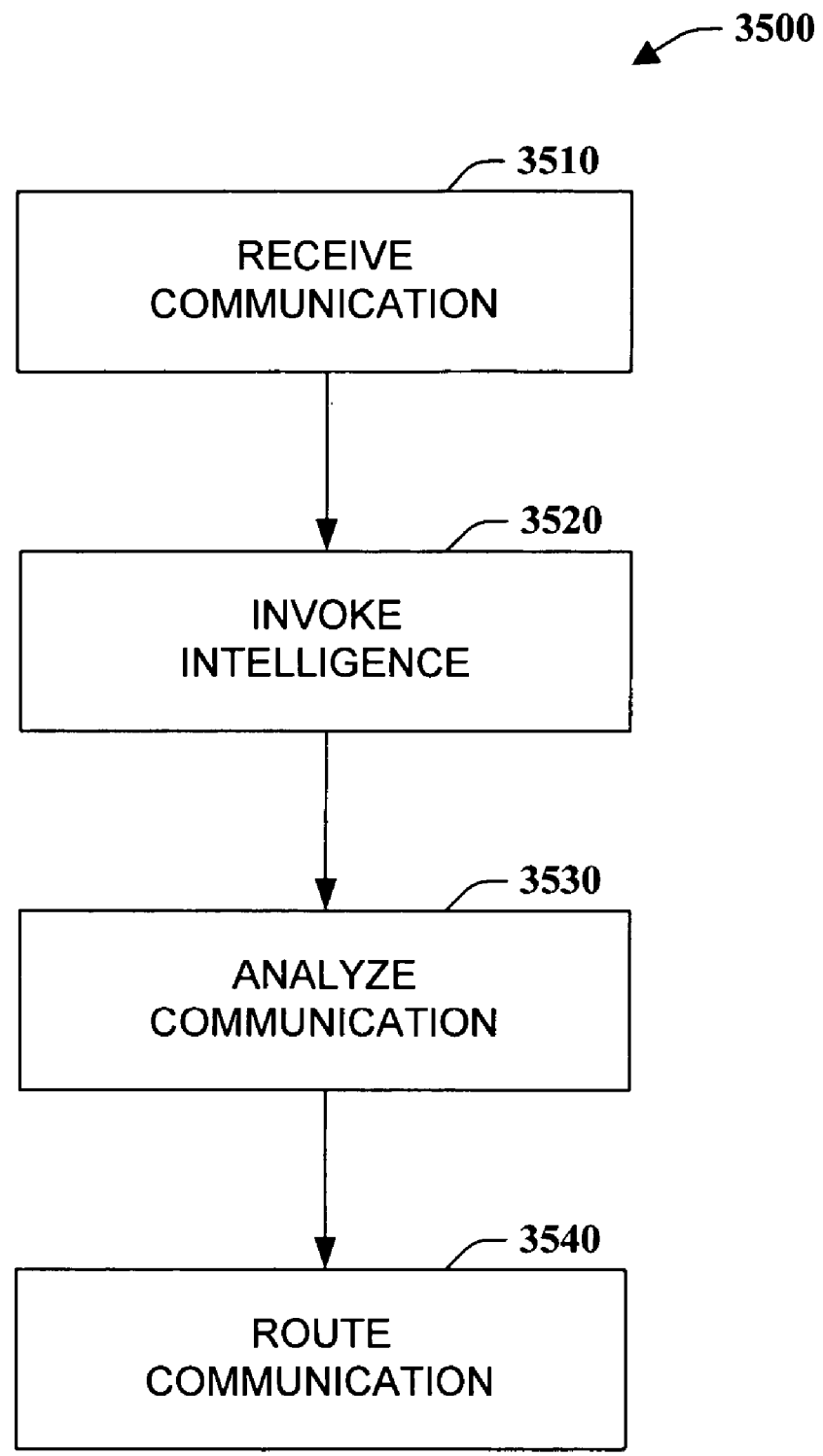
FIG. 35 illustrates an exemplary rich communication methodology.

FIG. 35 illustrates an exemplary communication routing method for managing communication between communication systems. At 3510, a communication is received. The communication can be received by an interface (e.g., coupled to a PBX) that handles incoming and/or outgoing communications. It is to be appreciated that this interface can be software and/or hardware based, hardwired and/or wireless, reside local and/or remote to a communication transmitting system, and/or support essentially any known communication protocol.

At reference numeral 3520, intelligence can be employed to facilitate communication routing. For example, intelligence can be utilized to determine whether and how to transfer the received communications. In one instance, the intelligence can be based on one or more Bayesian models and/or trained via machine and provide an expected cost of interruption. Such models can be created via real-time monitoring, and/or historical, acoustical and/or visual information, for example. In addition, inferences about present and/or future interruptability and/or predictions regarding availability can be employed to facilitate relaying, delaying and/or rejecting a communication. It is to be appreciated that the intelligence can further be a probability distribution over states of interest based on a consideration of a set(s) of data and/or events.

Inferences can refer to techniques employed for composing higher-level events from the set(s) of events and/or data, wherein such inference can result in the construction of new events and/or actions from a set(s) of observed events and/or stored event data, whether or not the events are correlated and the events and data come from one or several event and/or data sources. Various classification schemes and/or systems (e.g., support vector machines, neural networks (e.g., back-propagation, feed forward back propagation, radial bases and fuzzy logic), expert systems, Bayesian networks, and data fusion) can be employed in connection with performing automatic and/or inferred actions in connection with the subject invention.

At reference numeral 3530, the communication, policies, and/or associated information can be scrutinized, as describe in detail above, to determine a suitable conveyance path. For example, when a communication from a device with a priority equal to or greater than the present cost of interruption is received, the communication can be provided to the recipient. It is to be appreciated that this communication can be provided to the recipient as specified by the sender and/or another mechanism. In another example, when the communication is associated with a communication device with priority lower that the present cost of interruption, the communication can be rescheduled, discarded, and/or saved for later retrieval (e.g., voicemail and other messaging service). At 3540, the communication can be suitably routed, as described herein.

Figure 36:
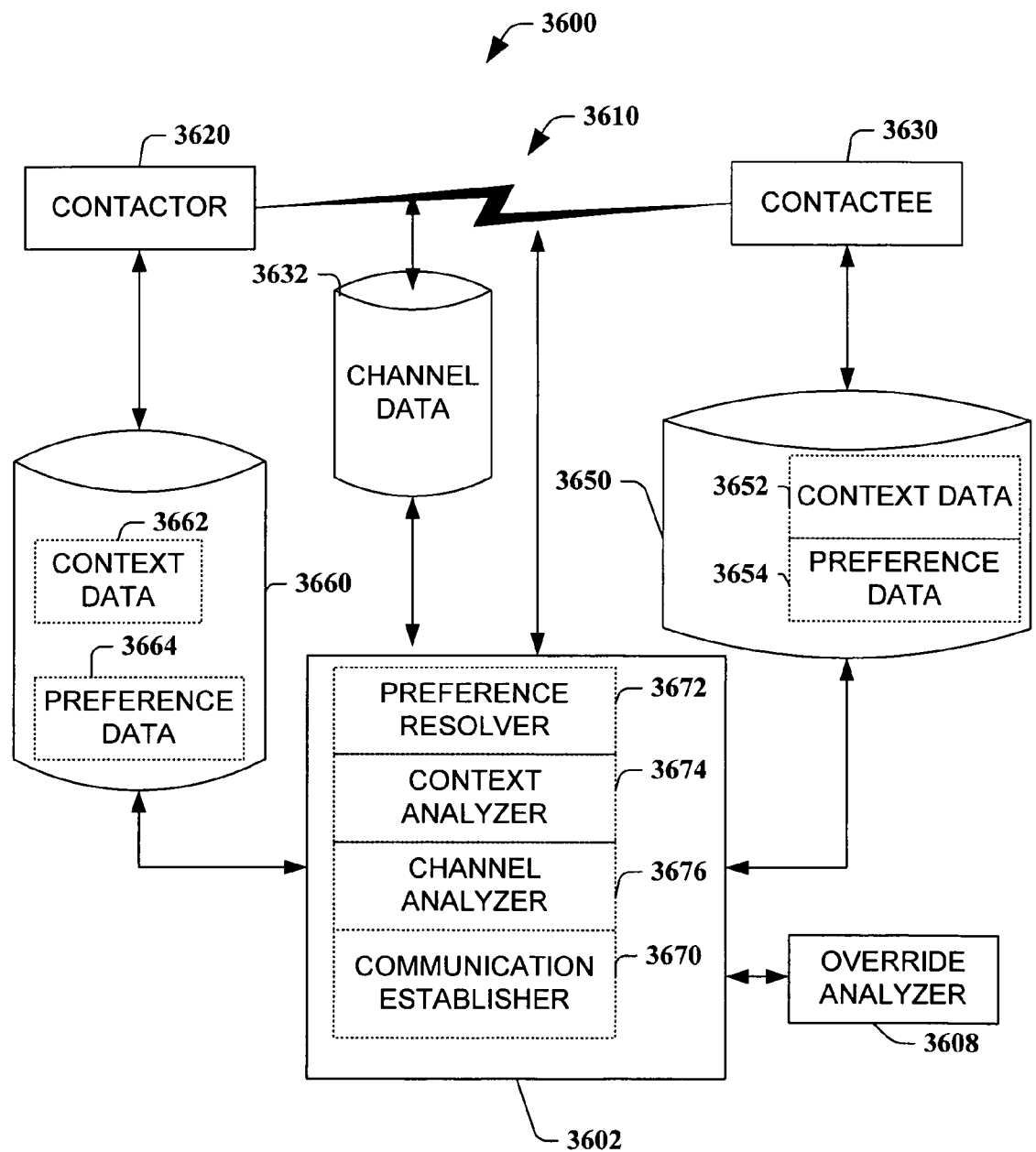
FIG. 36 illustrates an exemplary system that can be employed connection with the novel aspects of the invention.

FIG. 36 illustrates a system 3600 that can be employed in conjunction with various aspects herein. A channel manager 3602 identifies communication channels that facilitate optimizing the utility of a communication 3610 between a contactor 3620 and a contactee 3630. While one contactor 3620 and one contactee 3630 are illustrated, it is to be appreciated that the system 3600 facilitates identifying optimal communication channels between two or more communicating parties (e.g., communication groups). It is to be further appreciated that the parties to the communication 3610 may include human parties, apparatus and/or electronic processes. Thus, as employed herein, the terms contactee and contactor include groups of contactors and groups of contactees.

The communication 3610 may be carried over a variety of channels including, but not limited to, telephone channels, computer channels, fax channels, paging channels and personal channels. The telephone channels include, but are not limited to POTS telephony, cellular telephony, satellite telephony and Internet telephony. The computer channels can include, but are not limited to email, collaborative editing, instant messaging, network meetings, calendaring and devices employed in home processing and/or networking. The personal channels include, but are not limited to video-conferencing, messaging and face-to-face meeting. Data concerning a current channel (e.g., a phone that is busy) can be analyzed, as can data concerning the likelihood that the channel may become available (e.g., phone will no longer be busy).

Identifying the optimal communication channel can include considering the benefits of establishing the communication 3610 at a first point in time, with the communication channels available at that point in time, and considering the costs of delaying establishing the communication 3610 to a second point in time when other communication channels may be available.

The channel manager 3602 has access to a channel data store 3635, a contactor data store 3660 and a contactee data store 3650. The contactor data store 3660, the channel data store 3635 and the contactee data store 3650 can store data in data structures including, but not limited to one or more lists, arrays, tables, databases, stacks, heaps, linked lists and data cubes and can reside on one physical device and/or can be distributed between two or more physical devices (e.g., disk drives, tape drives, memory units). Furthermore, the contactor data store 3660, the channel data store 3635 and the contactee data store 3650 can reside in one logical device and/or data structure.

The channel manager 3602 can be a computer component, as that term is defined herein, and thus the channel manager 3602 can be distributed between two or more cooperating processes and/or reside in one physical or logical device (e.g., computer, process).

In a general formulation of the problem addressed by the channel manager 3602, the disclosed innovation considers a "communications value function", f, that returns a value for each communication channel or subset of channels under consideration or an ordering over communication channels in terms of acceptability of the channel or subset of channels.

$$\text{Value(Channel)}=f(\text{preferences(contactee, contactor, organization), context(contactee, contactor)})$$

where the context of contactee and contactor include group membership, group context, the devices that are available, the time of day, tasks and situation at hand for the contactor and contactee, and the like. It is to be appreciated that the context of the contactee and contactor may be stored in one or more formats, including, but not limited to, an XML schema. In one example, the channel manager 3602 initially orders the channels by assigned value and attempts to create a connection or to advise the contactor 3620 and/or contactee 3630 concerning the best possible connection.

In general, there may be uncertainty concerning preferences and one or more parameters employed to model a context. In this situation, a probability distribution over the different states of variables can be inferred and expected values for channels can be computed. For example, if there is uncertainty concerning aspects of the context of the contactee, the probability distribution (here represented abstractly), given evidence observed about the context, can be considered in the generation of expected values.

While this expected value can be employed to initially identify the channel that is predicted to optimize the utility of the communication 3610, in one example, the contactee 3630 will be presented with options concerning the communication. The contactee 3630 reaction to the options will then determine the channel that is selected for the communication 3610. The reactions to the options can be employed in machine learning that facilitates adapting the channel manager 3602.

Thus, in an example, the conditional probability $p(context^R_i|E)$ that the contactee 3630 has a certain context given the evidence E is employed in conjunction with the utility function u to determine the ideal communication actions that can be taken to maximize the utility of the communication 3610 between the contactor 3620 and the contactee 3630. The basic formulation for identifying optimal communication channels can be extended by introducing uncertainty about the context of the contactor 3620 and computing expectations.

The contactor 3620 and contactee 3630 contexts represent rich sets of deterministic or uncertain variables. Data associated with automated assessments and/or directly marked indications of urgency or importance in the communications can also be evaluated in identifying optimal communication channels. The contextual variables can be treated as explicit deterministic or probabilistic factors in the optimization.

The subject innovation can also compare the best communication option available now with the best communication option that will be available later, and update the value of the communication for the losses based in delays in communication, and potential gains or losses based on changes in disruptiveness if the communication should come at the later time t when the contactee is in a different state (e.g., more available or less available). Such comparison can be captured by equation four:

Decision-theoretic optimization can be employed to produce one or more expected utilities for one or more sets of contactors and/or contactees that are established into one or more groups that are subsequently managed. In one example aspect, a communication is automatically initiated, scheduled and/or calendared based on such information. However, in another aspect, information concerning those expected utilities is presented to one or more parties. By way of illustration, a contactor 3620 is presented with a list of communications with high utilities determined in accordance with the preferences of the contactee. The contactor 3620 then selects from the list.

While one communication 3610 between one contactor 3620 and one contactee 3630 is illustrated, it is to be appreciated that a greater number of communications between a similar or greater number of contactors 3610 and/or contactees 3620 can be identified. By way of illustration, communications 3610 to facilitate group meetings can be identified by the system 3600, as can multiple communications 3610 between two communicating parties (e.g., duplicate messages sent simultaneously by email and pager).

The communication 3610 that is identified by the channel manager 3602 may depend, at least in part, on one or more sets of data concerning communication channels, contactors and/or contactees, for example. One possible data set, the communication channel data set 3635 concerns the available communication channels. The available communication channels can include, but are not limited to email (of various priorities), telephone (POTS, cellular, satellite, Internet), paging, runners/couriers, video conferencing, face-to-face meeting, instantaneous collaborative editing, delayed posting collaborative editing, picture in picture television, home device activation (e.g., turning on lights in the study, ringing the telephone with a distinctive pattern) and so on. A communication channel may not be a static entity, and thus information concerning the state, capacity, availability, cost etc., of the communication channels can change. Thus, the communication channel data set 3635 can contain current state information and/or data to facilitate making predictions concerning future state, capacity, availability, cost etc. associated with one or more communication channels.

The channel manager 3602 can also have available the contactee data 3650 that includes information related to hardware, software, contactee task being performed, contactee attention status, contactee context data 3652 and contactee preference data 3654, for example. By way of illustration, the hardware data can include information related to what hardware is available to the contactee, what hardware is being employed by the contactee (e.g., desktop, laptop, PDA), the capabilities of that hardware (e.g., enough memory and communication bandwidth for videoconferencing), the cost of employing that hardware and the state(s) in which that hardware is currently functioning (e.g., online, offline). The hardware data can also include information concerning usage patterns that facilitate determining the likelihood that an unavailable piece of hardware will become available. The software data can include information related to what software is available to the contactee, what software is currently being employed by the contactee (e.g., word processor in use), the capabilities of that software (e.g., allows collaborative editing) and the state(s) in which that software is currently functioning (e.g., running and active, running but inactive). The software data can also include information concerning usage patterns that facilitate determining the likelihood that an unavailable piece of software will become available.

The contactee data 3650 can also contain preference data 3654 concerning the preferences of the contactee 3630. The preference data 3654 can include data concerning how the contactee 3650 prefers to be contacted, with those preferences varying over time with respect to, for example, various contactors 3620, various times, various channels and various topics of communication. The contactee preference data 3654 can include data concerning, but not limited to, preferences concerning the time of day for communicating (e.g., early morning, business hours, evening, late night, sleeping hours), the time of the week for communicating (e.g., Monday through Friday, Weekend, Holiday, Vacation), identity of contactors (e.g., employer, employees, critical colleague, colleague, peers, nuclear family, extended family, close friends, friends, acquaintances, others), hardware currently available or available within a time horizon of a communication attempt (e.g., desktop, laptop, home computer), preferred software (e.g., email, word processing, calendaring) and preferred interruptability (e.g., do not interrupt while focused on work, only interrupt while not focused), for example. While six preferences are identified in the preceding sentence, it is to be appreciated that a greater or lesser number of preferences can be employed.

The contactee data 3650 can also include a context data 3652. The context data 3652 is generally related to observations about the contactee 3630. For example, observations concerning the type of activity in which the contactee 3630 is involved (e.g., on task, not on task), location of the contactee 3630 (e.g., office, home, car, shower), calendar (e.g., appointment status, appointment availability), history of communications with other party (e.g., have replied to email in the past, have spoken to on the telephone recently, the utility of the interaction, the duration of the interaction), background ambient noise at current location, number of hours at work that day and attentional status (e.g., high focus, focus, light focus, conversation with another person, light activity) can be stored in the context data 3652.

On some occasions the context data 3652 may be incomplete (e.g., video analysis data unavailable because video camera broken). Thus, the channel manager 3602 reasons concerning the optimal communication while relying on such incomplete data. Thus, the contactee data 3650 can also include information to facilitate producing one or more probabilities associated with a missing data element. By way of illustration, the contactee data 3650 can contain information operable to predict the likelihood that the contactee 3630 is in a high attentional state even though gaze tracking information is unavailable.

The contactee data 3650 can further include information concerning the long-term and/or acute, dynamically changing communication needs of the contactee 3650. By way of illustration, the contactee 3650 may need to have no interruptions for the next hour (e.g., "hold everything unless high critical on this task or an hour from now"). By way of further illustration, to prevent a contactor 3620 from "ducking" the contactee 3630 by leaving an email or a voice mail when the contactee 3630 desires to speak with the contactor 3620, the contactee 3630 can require that contacts from the contactor 3620 be made in a certain way within X units of time of notification that the contactor 3620 desires communication.

In addition to the contactee data 3650 employed in determining the optimal communication, data concerning the contactor 3620 may also be employed. The contactor data 3660 can include hardware, software, context, preference and communication needs data substantially similar to that available for the contactee 3630, but different in that it is prepared from the point of view of the contactor 3620.

The innovation is not limited to communications between two parties or to a single communication channel between two parties. It is to be appreciated that multiple channels and/or multiple communicating parties can be treated as increased sets of alternatives that complicate utility optimizing maximizing computations without changing the fundamental process of identifying and establishing one or more communication channels based on the preferences, contexts and capabilities of the communicating parties.

The channel manager 3602 can include several computer components responsible for implementing portions of the functionality of the channel manager 3602. For example, the channel manager 3602 can include a preference resolver 3672. The preference resolver 3672 examines the contactee preference data 3654 and the contactor preference data 3664 to find correlations between the two sets of data. In one example, information concerning the correlations is stored in a resolved preference data. For group communications, the preference resolver 3672 examines multiple sets of preference data to find correlations between the preferences. By way of illustration, for a communication between two parties, the preference resolver 3672 can determine that both parties would prefer to communicate by high priority email for communications associated with a first task.

Similarly, the preference resolver 3672 can determine that the contactee 3630 would prefer to communicate by collaborative editing and phone for communications concerning a particular document, while the contactor 3620 would prefer to communicate only by telephone. Thus, the preference resolver 3672 produces data (e.g., resolved preference data) or initiates processing that assigns values to the correlations between the contactee 3630 preferences and the contactor preferences 3620. In one example aspect, the preferences of the contactee 3630 are given more weight, and thus, if the contactor 3620 attempted a phone conversation concerning the document for which the contactee 3630 preferred both phone and collaborative editing, then the preference resolver 3672 produces data or initiates processing that makes it more likely that the contactor 3620 communicates by both phone and collaborative editing. In another example aspect, the preferences of the contactor 3620 are given priority over the preferences of the contactee.

By way of illustration, when a human contactor 3620 is attempting to communicate with an electronic contactee 3630, the preferences of the contactor 3620 are considered more important, and thus the preference resolver 3672 produces values or initiates processing that makes it more likely that the preferences of the contactor 3620 are observed. In another example aspect, the preference resolver 3672 produces a list of potential communication channels ranked on their responsiveness to the preferences.

The channel manager 3602 can also include a context analyzer 3674. The context analyzer 3674 examines the contactee context data 3652 and the contactor context data 3662 to find correlations between the two sets of data. In one example, information concerning the correlations is stored in an analyzed context data. For group communications, the context analyzer 3674 may examine multiple sets of context data to extract information concerning the contexts. By way of illustration, for a communication between two parties, the context analyzer 3674 may determine that the contactee context is such that real-time communications are not immediately available but there is an $X_1\%$ likelihood that such communications will be available at a point of time $T_1$ in the future, and an $X_2\%$ likelihood that such communications will be available at a point of time $T_2$ in the future.

Further, the context analyzer 3674 may determine that although the contactor 3620 has requested real-time telephony that the context of the contactor 3620 is such that email communication may optimize utility. For example, the context of the contactor 3620 may include information concerning the ambient noise at the location of the contactor 3620. The context analyzer 3674 may determine that the noise level is not conducive to optimizing utility by real-time telephony and thus may produce values and/or initiate processing that will make it more likely that the contactor 3620 will communicate with the contactee 3630 via email. Similar to processing performed by the preference resolver 3672, the context analyzer 3674 may, in different examples of the system 3600, weight the context of the contactee 3630 more than the context of the contactor 3620 or vice versa.

The channel manager 3602 can also include a channel analyzer 3676. The channel analyzer 3676 analyzes the communication channel data set 3635. The channel analyzer 3676 produces data concerning the current availability of a communication channel and/or the likelihood of the channel becoming available. In one example, such data is stored in a communication channel data. The channel analyzer 3676 also examines one or more channels that the contactor 3620 specified for the communication, and/or one or more channels that the contactee 3630 listed as preferences in the contactee preference data 3654, for example.

The channel analyzer 3676 also examines currently available channels as determined by location information associated with the contactee 3630 and channels that may become available based on the activity of the contactee 3630. For example, if the contactee 3630 is currently driving home (as determined by GPS and schedule, for example), then the channel analyzer 3676 examines current cellular channels and additionally examines the channels available at the home of the contactee 3630. Thus, the channel analyzer 3676 facilitates producing data and/or initiating processing that makes it more likely that a desired channel is employed when determining the optimal communication channel(s) for the communication 3610 between the contactor 3620 and the contactee 3630.

The channel manager 3602 can also include a communication establisher 3678. Once the ideal communication actions A* have been identified, the communication establisher 3678 undertakes processing to connect the contactor 3620 and the contactee 3630 through the identified optimal communication channel. Such connection can be based, at least in part, on the resolved preference data, the analyzed context data and the communication channel data. For example, if the optimal communication 3610 is identified as being email, then the communication establisher can initiate an email composing process for the contactor 3620 (e.g., email screen on computer, voice to email converter on cell phone, email composer on two-way digital pager), and forward the composed email to the most appropriate email application for the contactee 3630 based on the identified optimal communication 3610. For example, the communication establisher 3678 can forward the email to the pager of the contactee 3630 based on GPS data associated with the location of the contactee 3630. In an alternative example, the system 3600 does not include a communication establisher 3678, relying instead on contactor 3620 and/or contactee 3630 actions, for example, to establish the communication. It is to be appreciated that the preference resolver 3672, the context analyzer 3674, the channel analyzer 3676 and the communication establisher 3678 are computer components as that term is defined herein.

Figure 37:
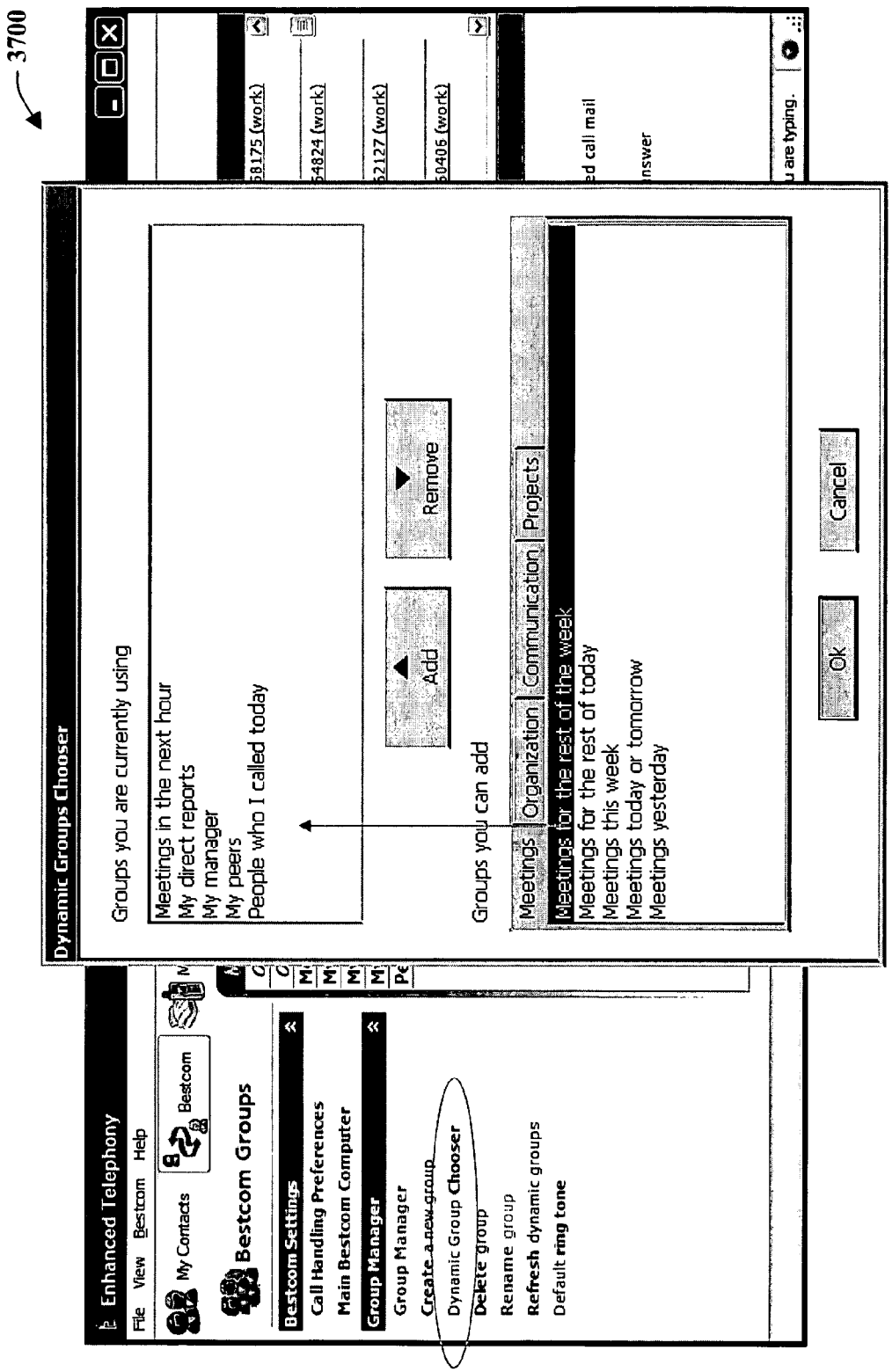
Figure 38:
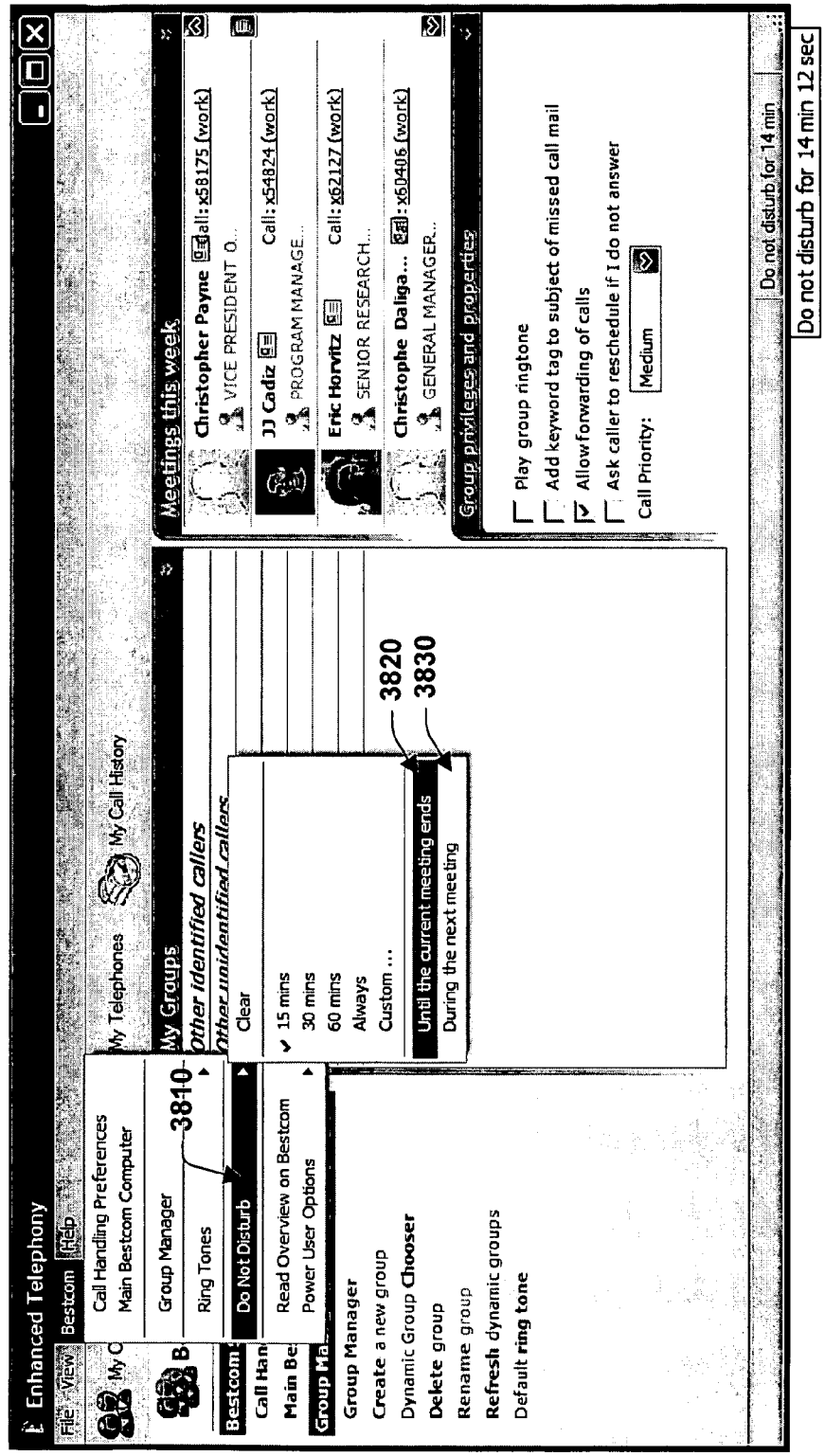
Figure 39:
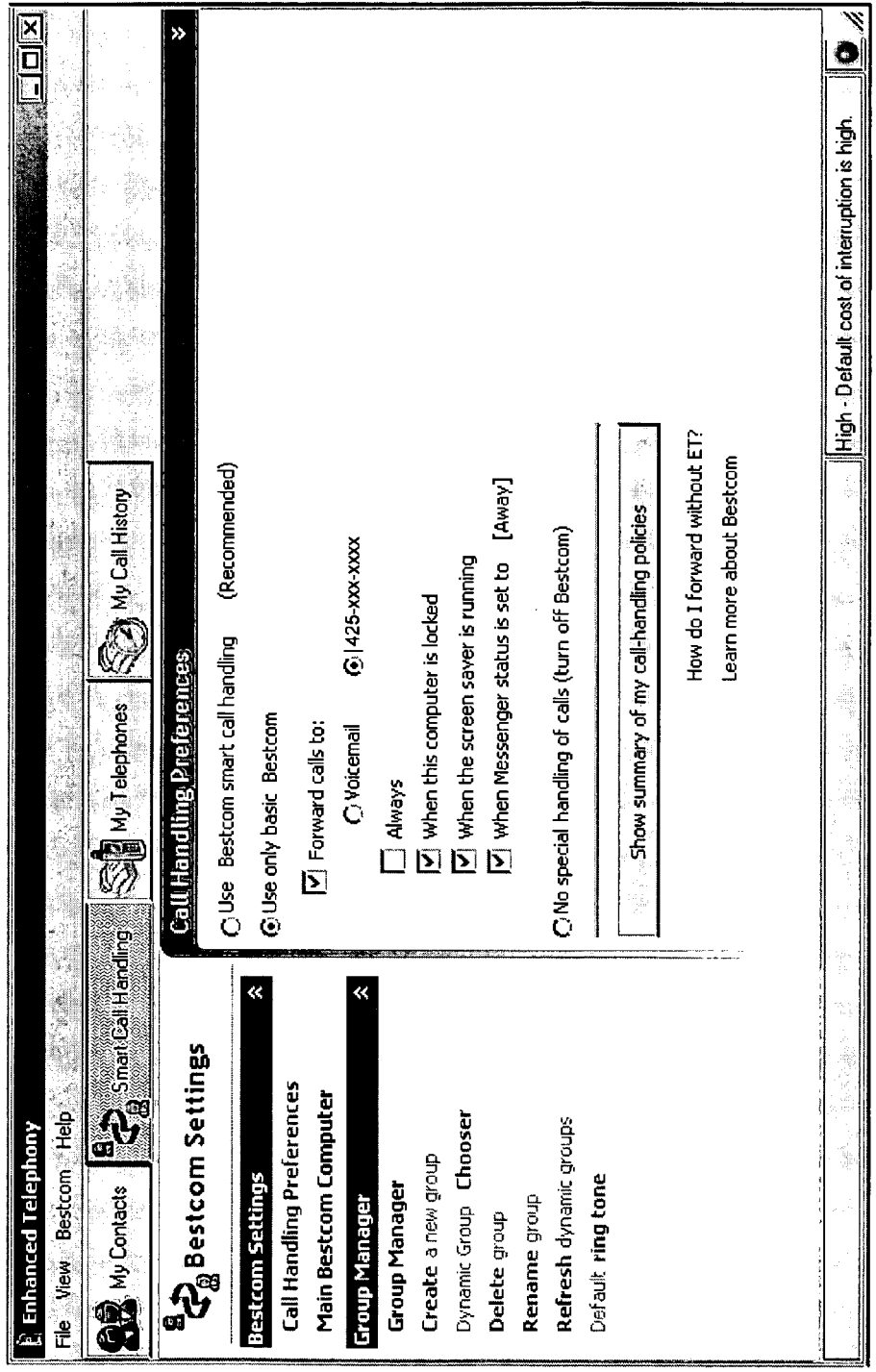
Figure 40:
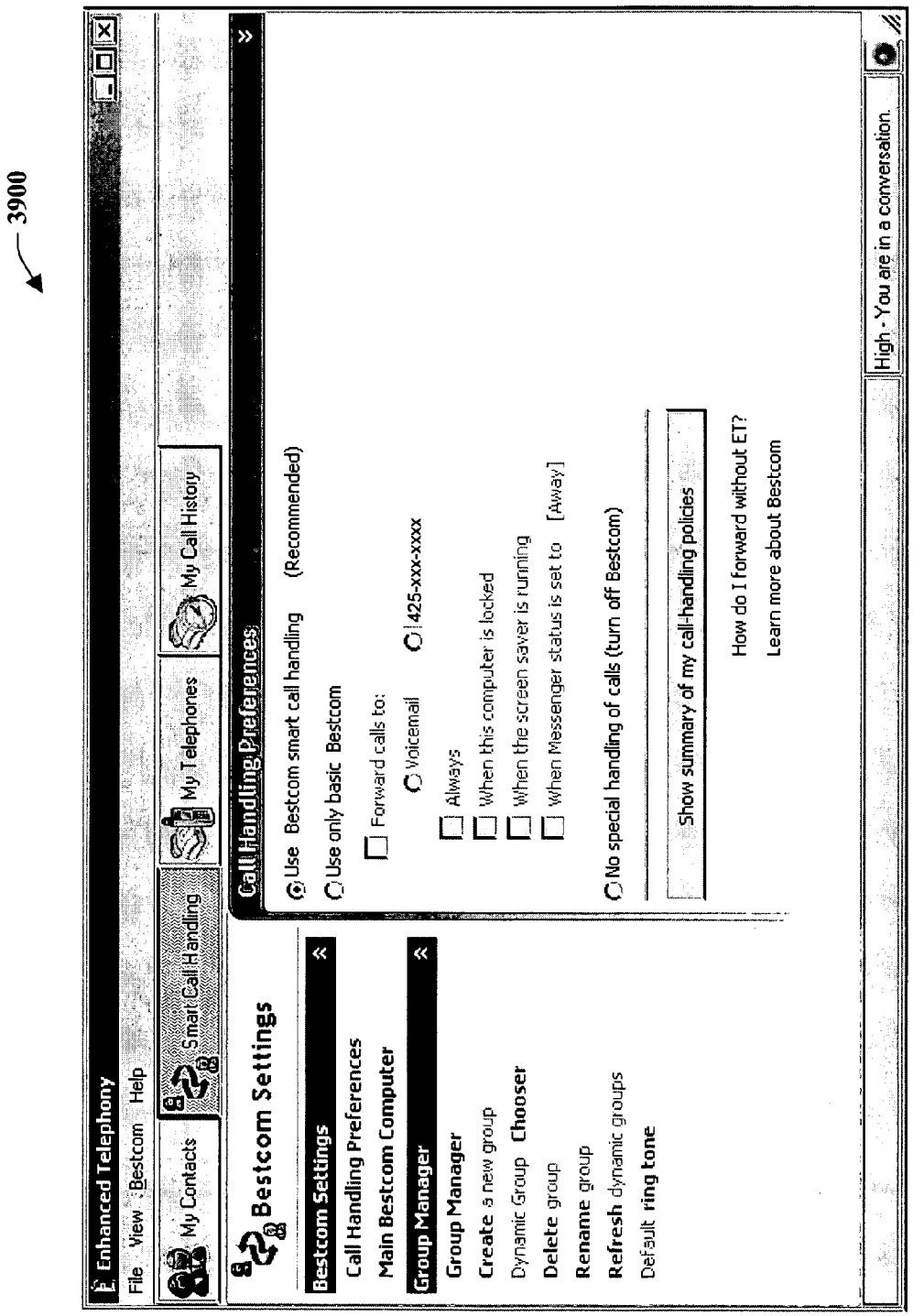
Figure 41:
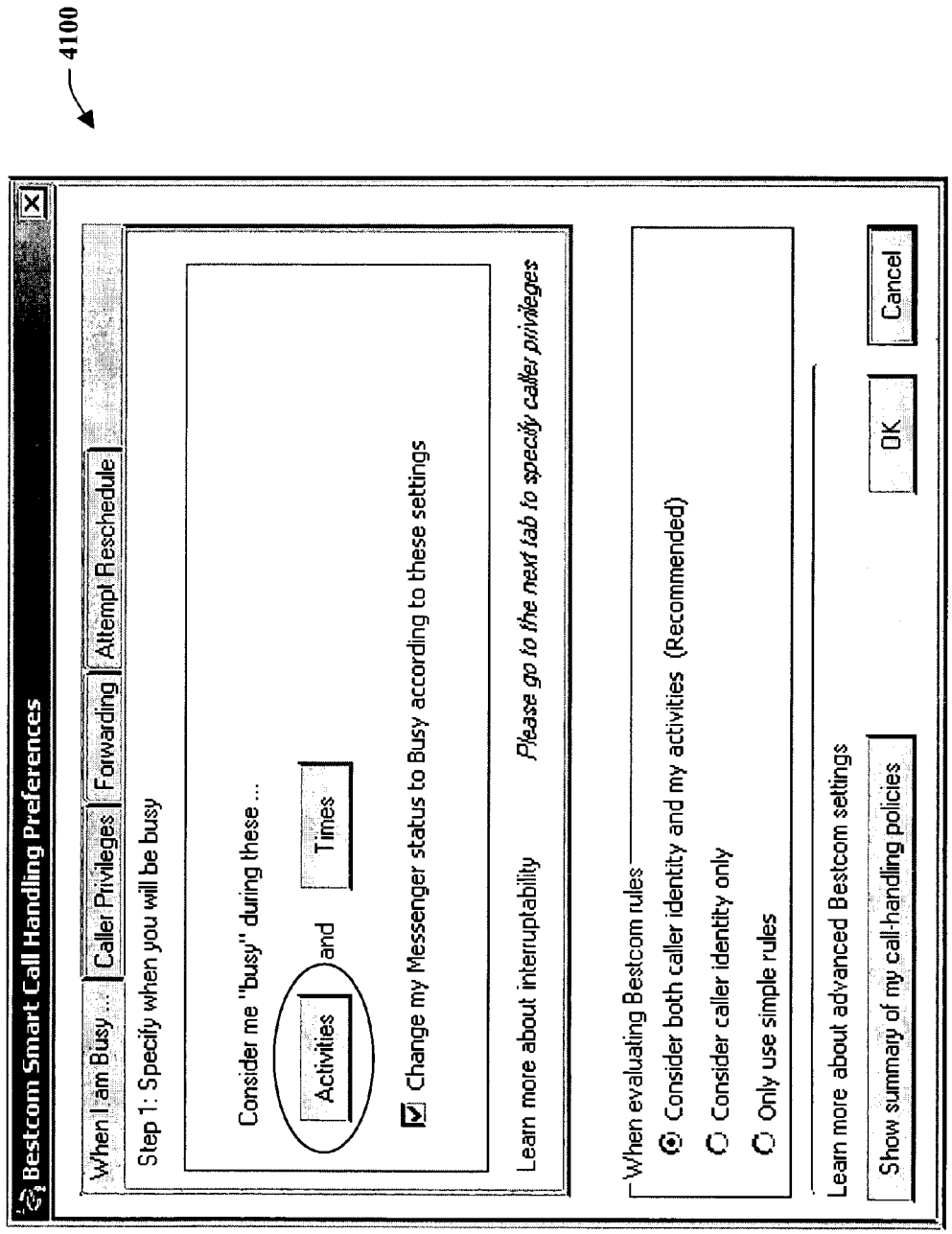
Figure 42:
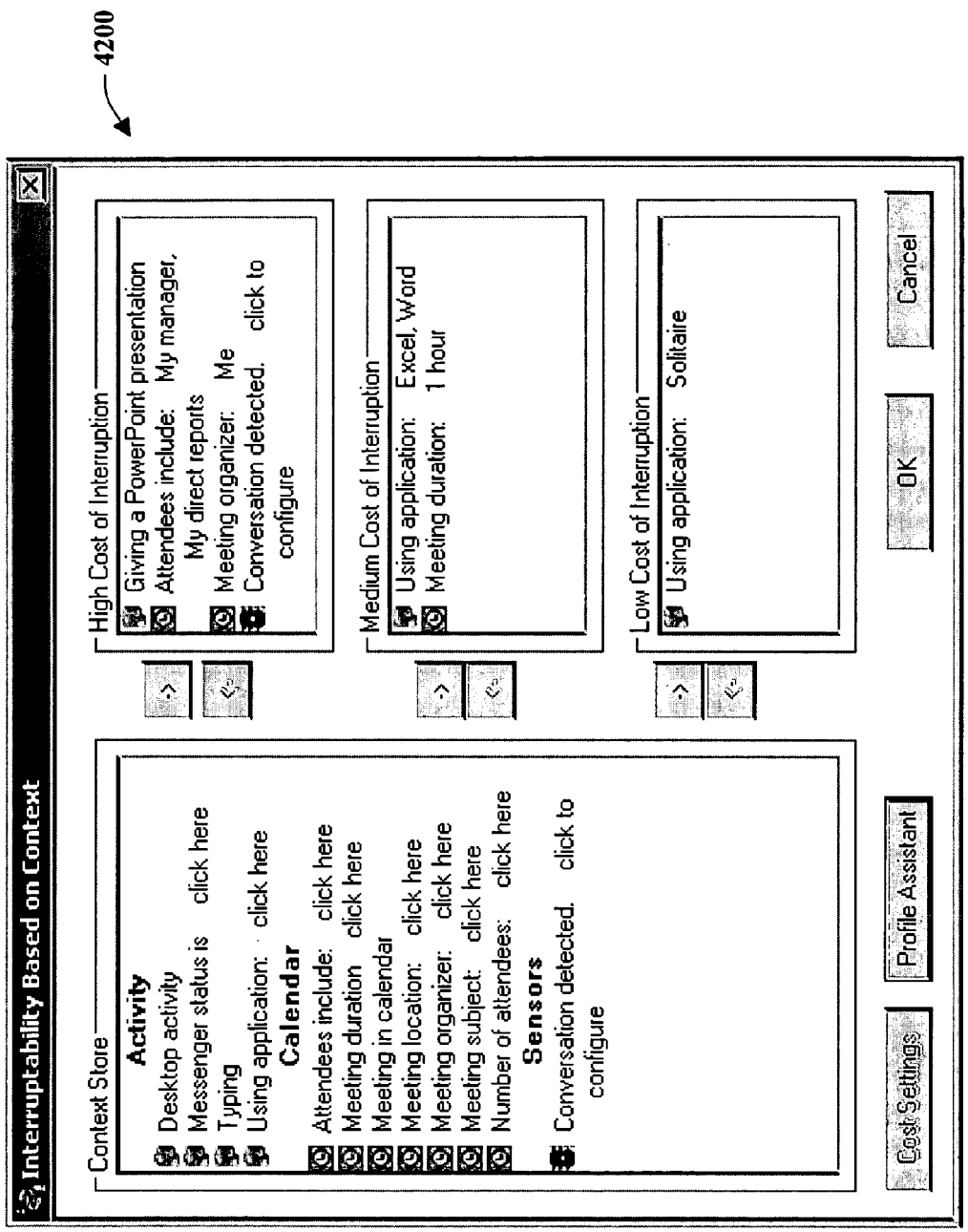

FIGS. 37-57 illustrate exemplary user interfaces (UIs) that can be employed. Respective UIs are associated with various functionality as described next. FIG. 37 illustrates a UI 3700 that enables selection of different kinds of dynamic groups and activation of groups for a user. FIG. 8 illustrates a UI 3800 with a Do Not Disturb (or Snooze) features at 3810. This feature can leverage the calendar as "until the current meeting ends" at 3820 and/or "during the next meeting" at 3830. In addition, a do not disturb status with a hover at 3840 (lower right) in order to show the quantity of time left on Do Not Disturb. FIG. 39 illustrates a UI 3900. This UI can provide a user a very simple variant that can do some basic things for user. FIG. 40 illustrates the UI 3900 where context is provided by showing access to different variants of the system. FIG. 41 illustrates a UI 4100 that provides tabbed preference set up for a high-level cost-benefit policy version, wherein selecting activities can bring up a context palette as described in detail above. FIG. 42 illustrates a UI 4200 that depicts interruptability based on context.

Figure 43:
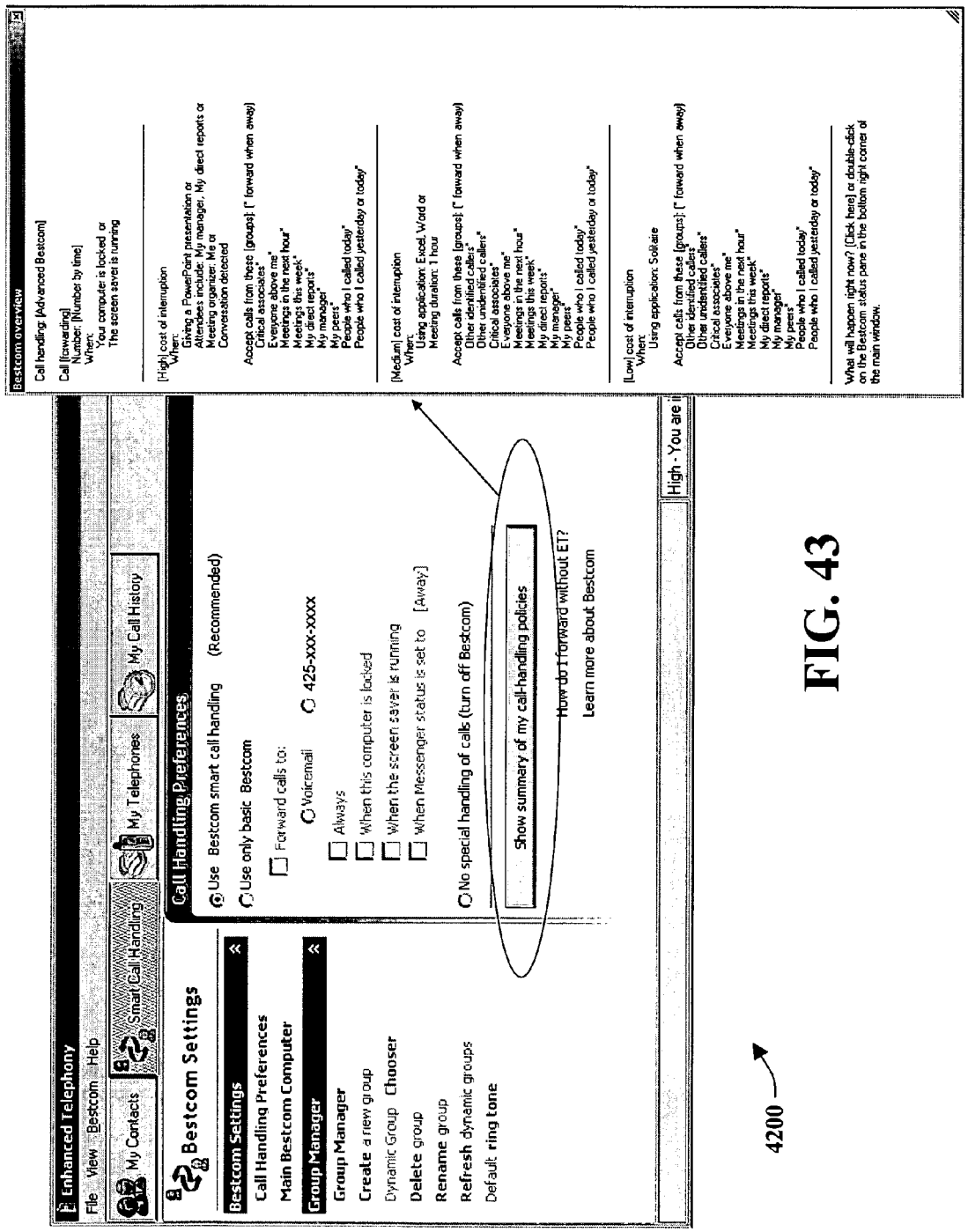
Figure 44:
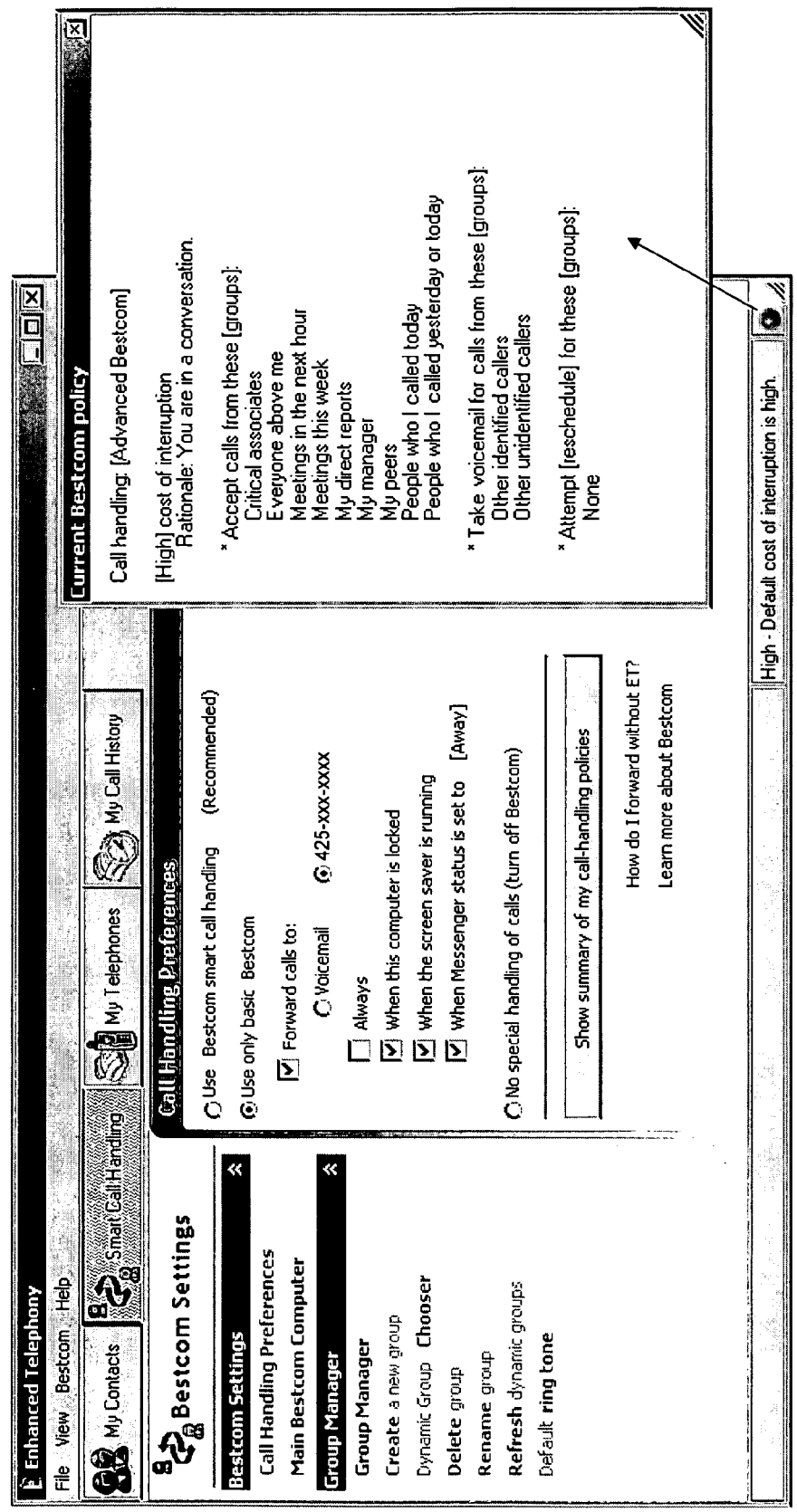
Figure 45:
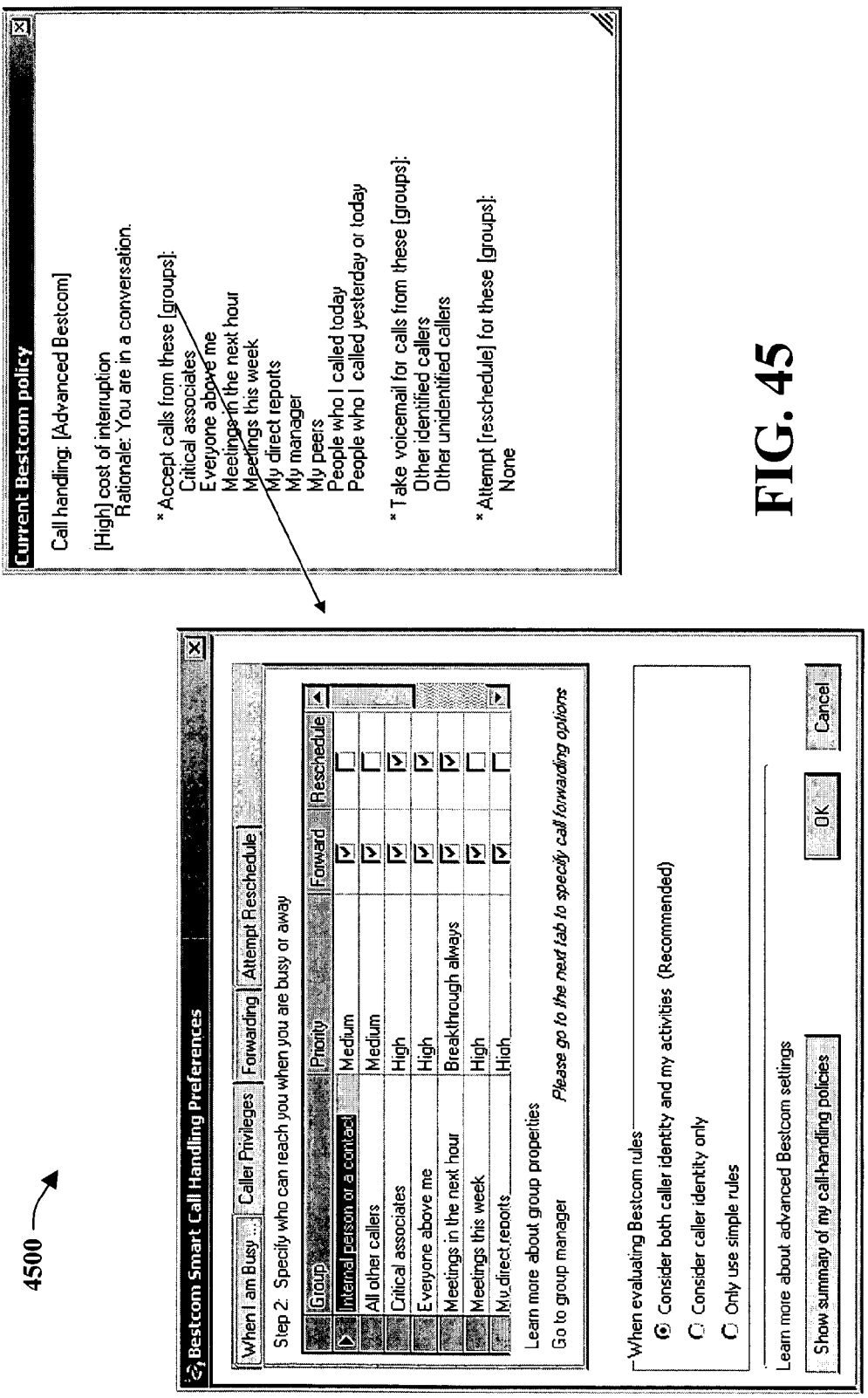
Figure 46:
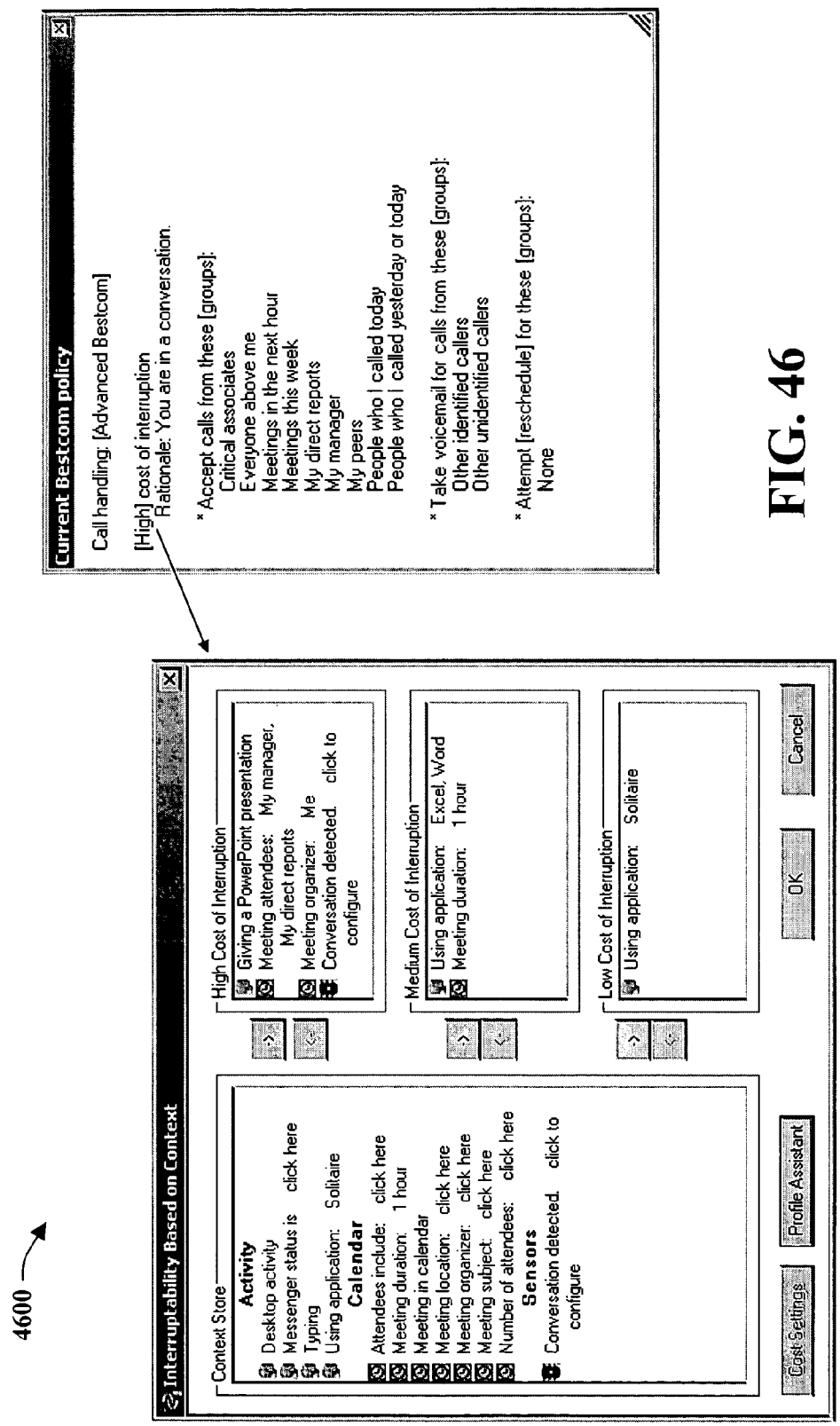
Figure 47:
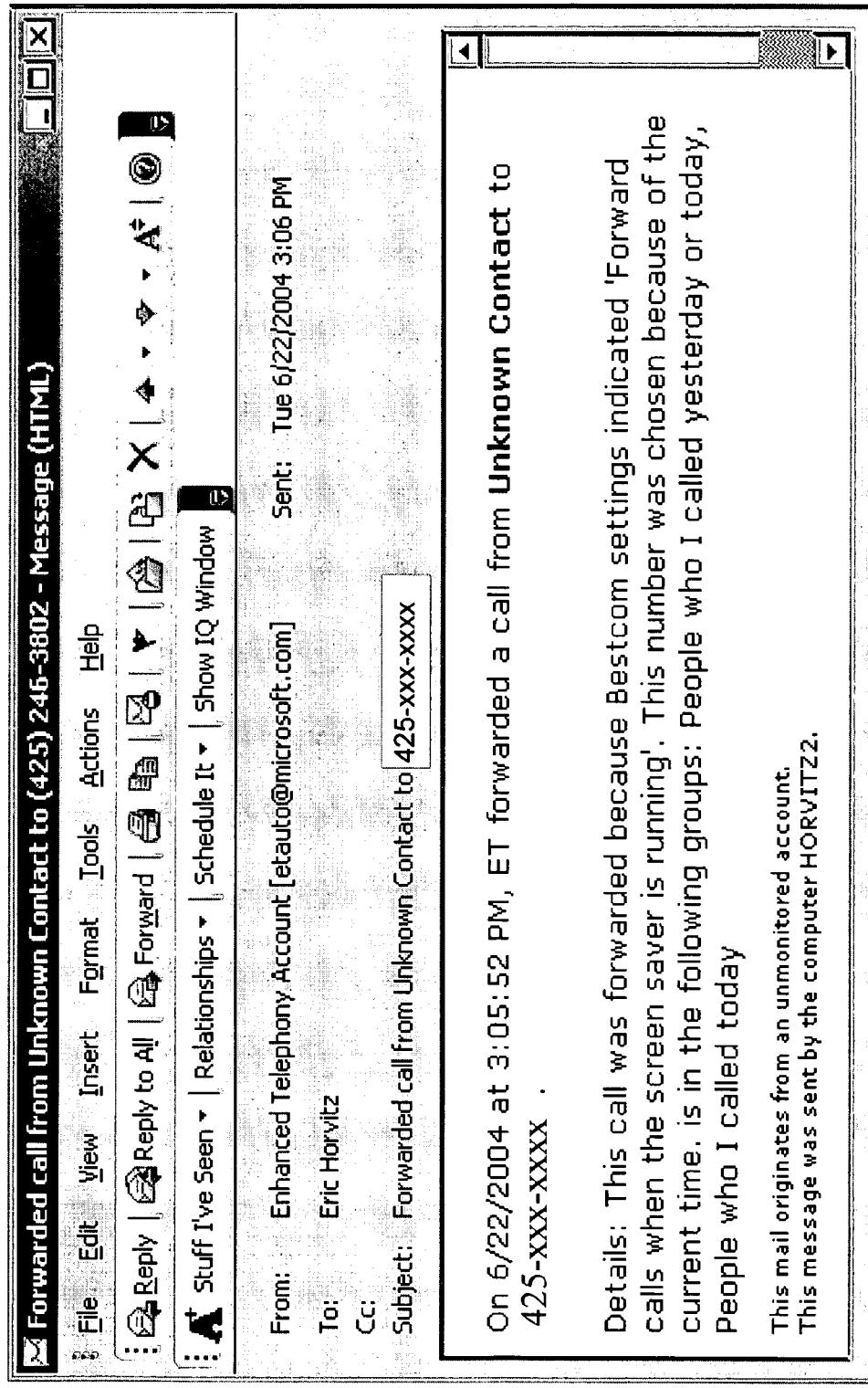

FIG. 43 illustrates a UI 4300 that considers a transparency about policies and what is important. For example, users can view a policy summary based on current settings if they select a "show summary of my call-handling policies" button. Links can be provided in place that allow the user to access and change specific settings. FIG. 44 illustrates a UI 4400 that provides a "what will happen now" feature. By way of example, if users click on the context display, they can review what will happen with the calls of different callers right at this moment. By clicking on links, users can view and changes groups, context, and/or other aspects of the policy (e.g., rescheduling). FIG. 45 illustrates a UI 4500 a group policy assessment form that can be launched upon selecting "groups" in the "what will happen now" policy of FIG. 44. FIG. 46 illustrates a UI 4600 that shows cost of interruption associated the UI 4400 of FIG. 44. FIG. 47 illustrates a UI 4700 that provides a rich trace as an email summary when the handling a call, wherein details about the rationale for the action can be shared.

Figure 48:
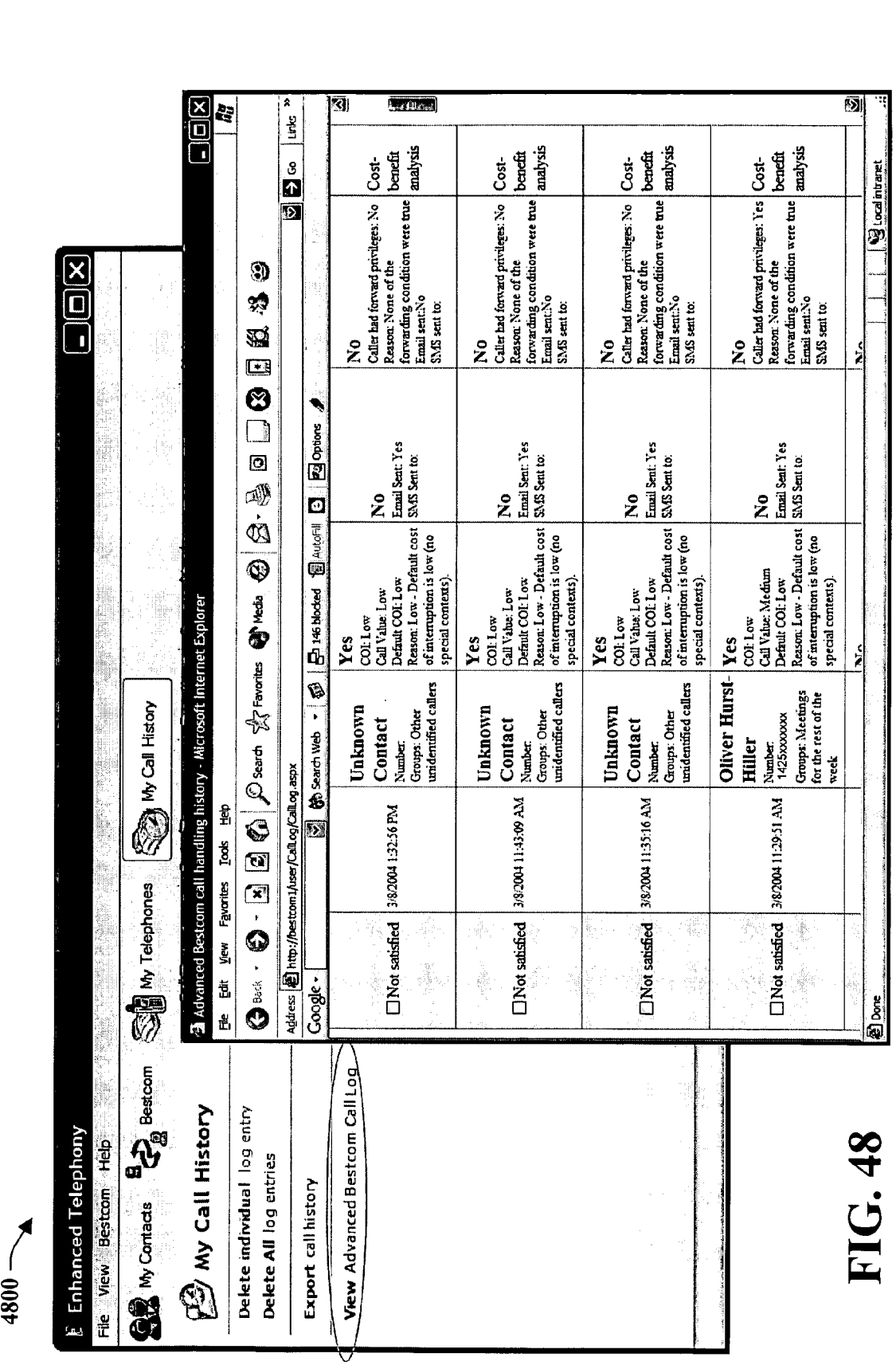
Figure 49:
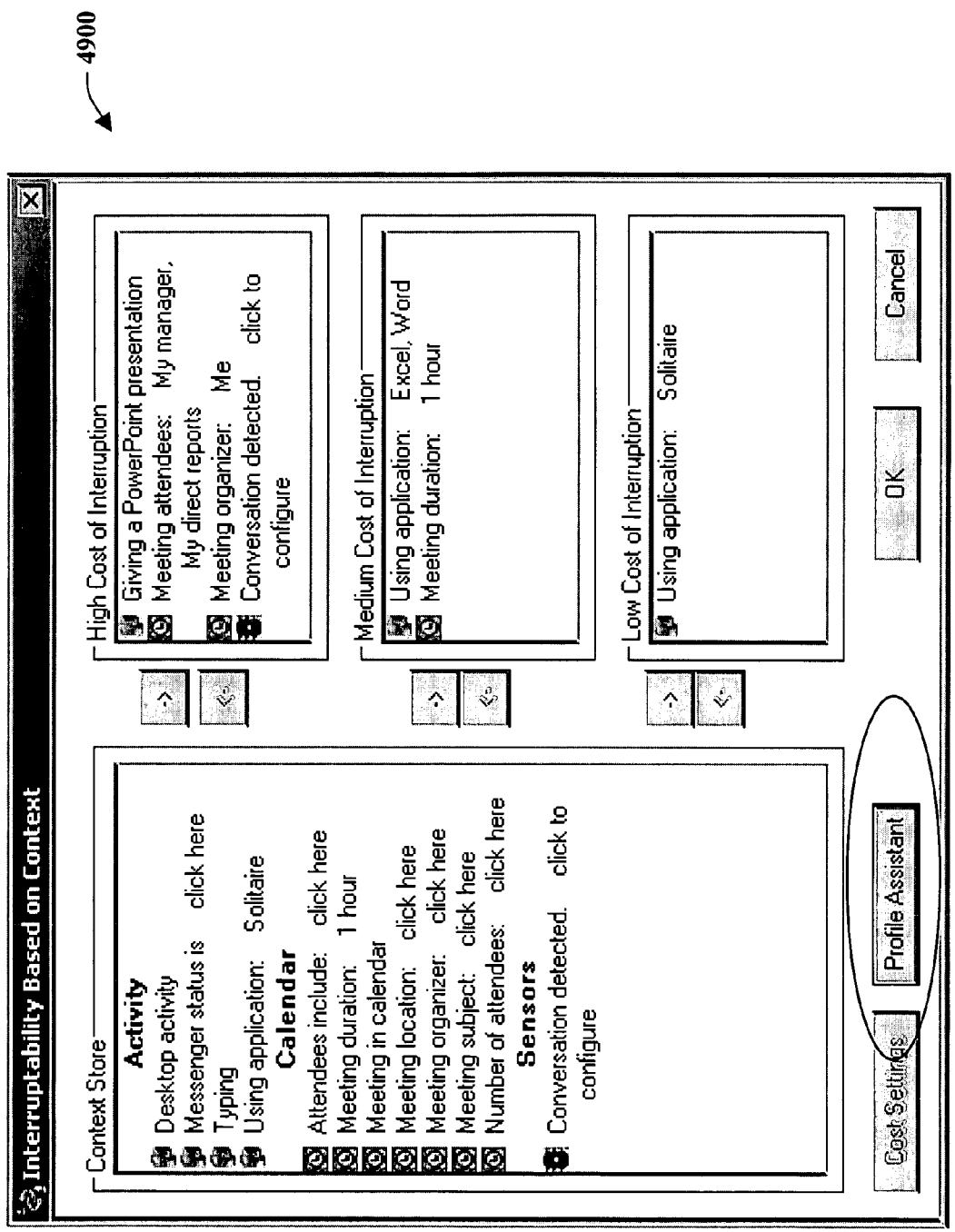
Figure 50:
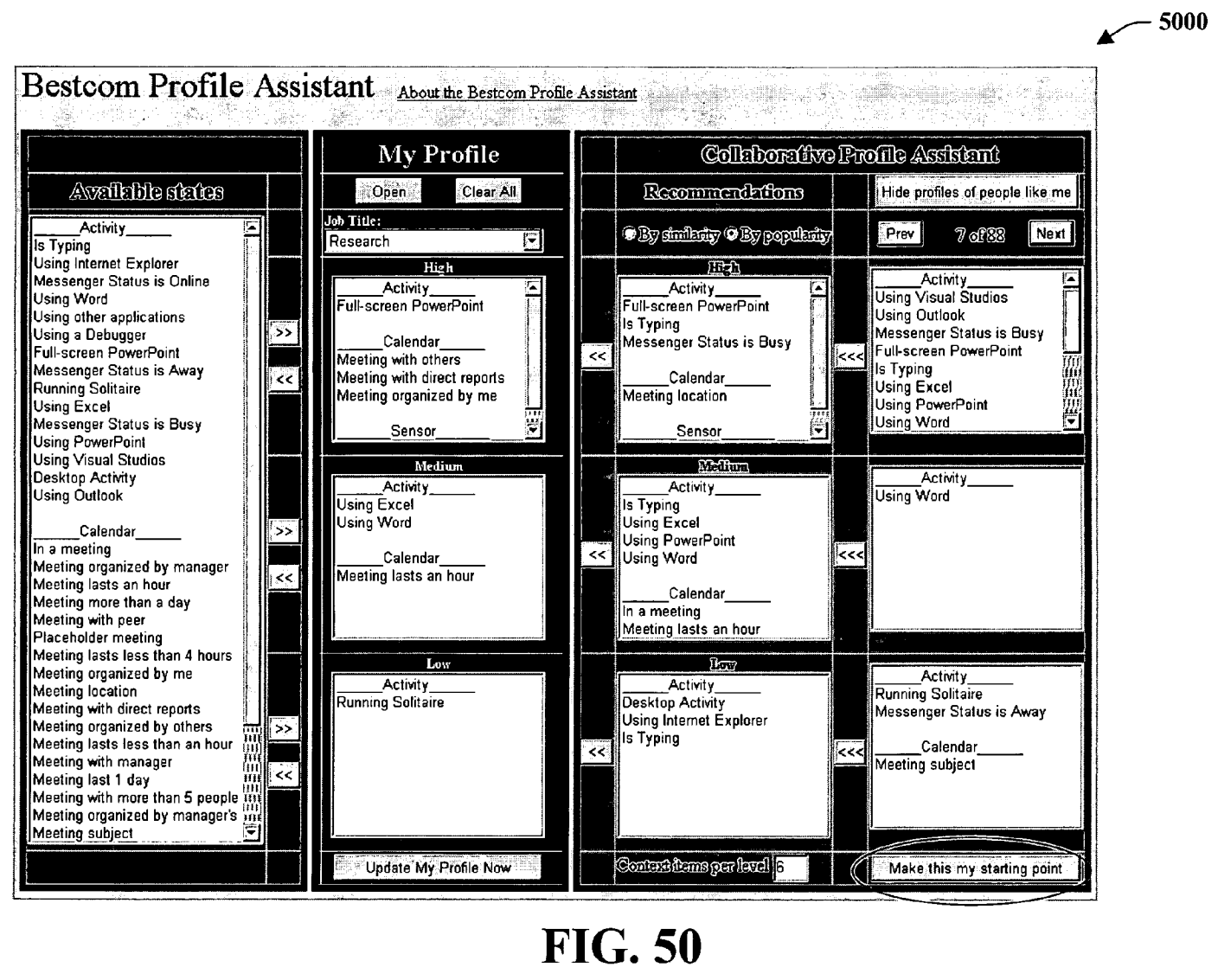

FIG. 48 illustrates a UI 4800 that provides a rich call log that can be accessed later. Users can report back if they were satisfied. This information can be utilized in conjunction with machine learning for making the system better for individual users and communities of users. FIG. 49 illustrates a UI 49 that can be utilized to record preferences on a server and use a statistical method (e.g., "collaborative filtering") to provide assistance with setting or refining preferences. This feature can be invoked by clicking on the Profile Assistant, which invokes a web service. FIG. 50 illustrates a UI 5000 depicts a view of a web service. The My Profile column can be populated with the current settings that have been input to client software, as well as personal demographic information, if available (e.g., an organizational role).

Available observations can be listed by category as illustrated on the left of My Profile. Collaborative Filtering can be employed to the right of the column, and display settings that might be desired can be included in the definition of low, medium, and high cost of interruption, based on the settings that have already been defined. Any of these distinctions in the Recommendations column can be selected and moved into My Profile. Additionally, users can inspect settings by popularity by selecting "By Popularity," which shows a listing by popularity.

Figure 51:
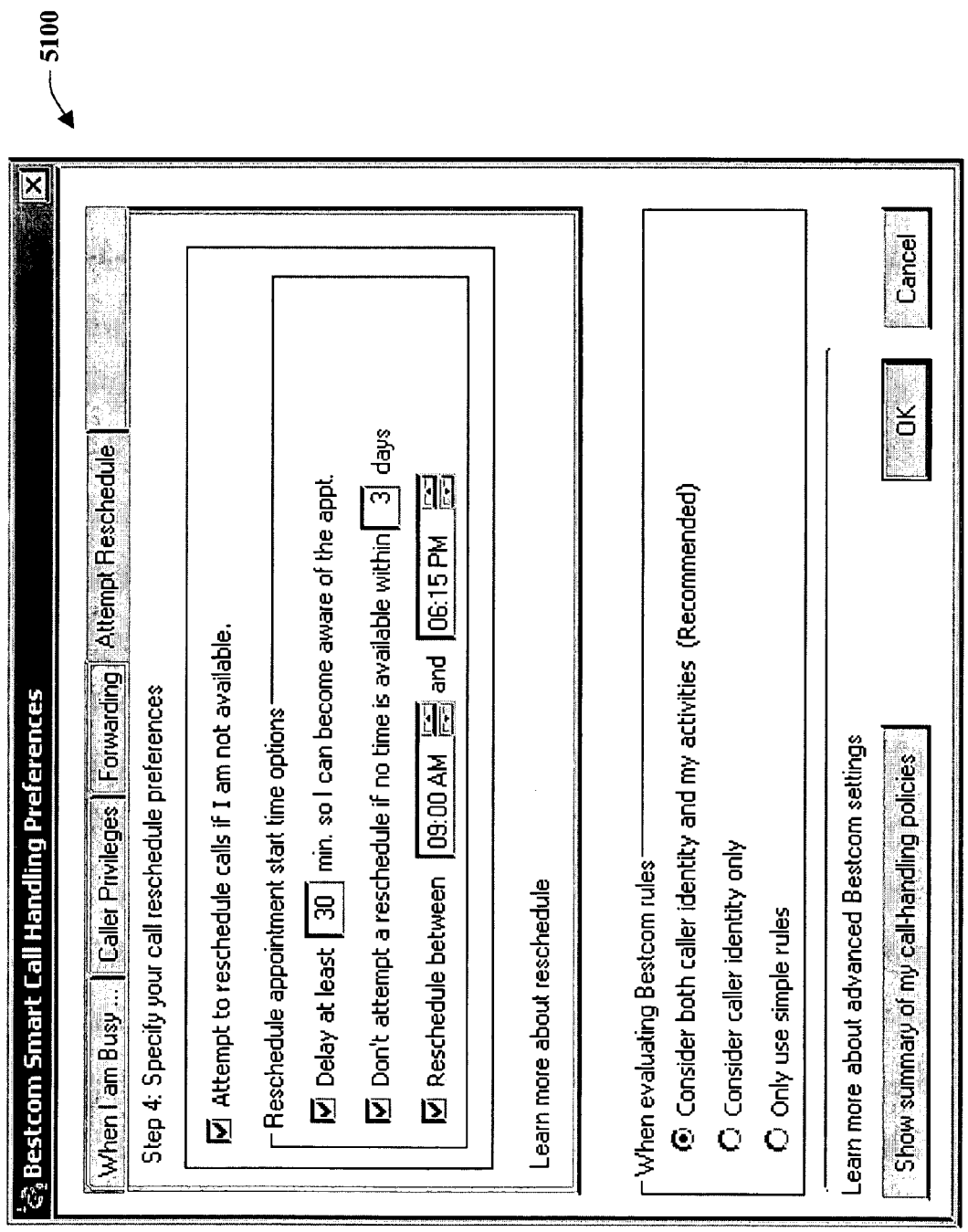
Figure 52:
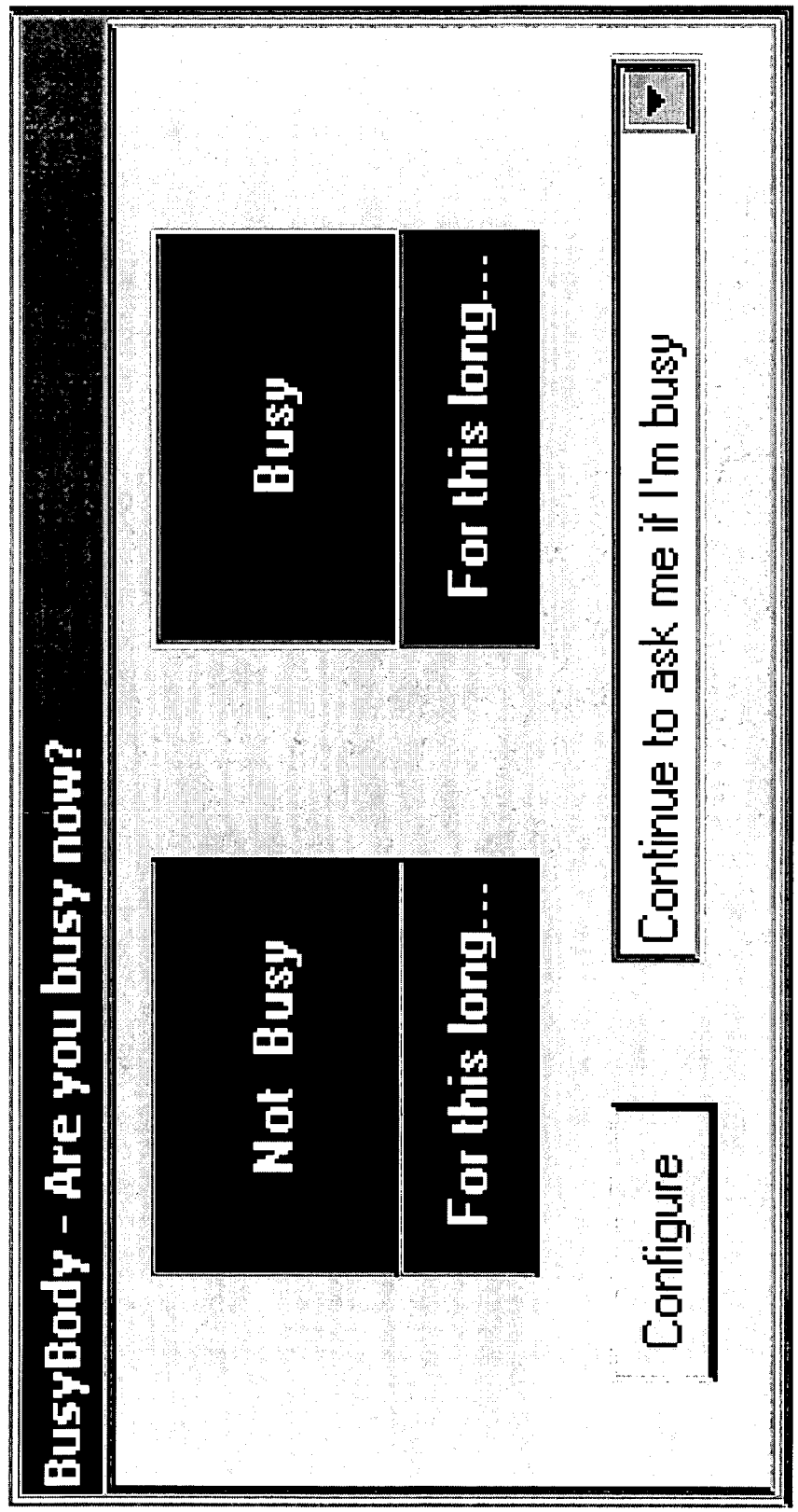
Figure 53:
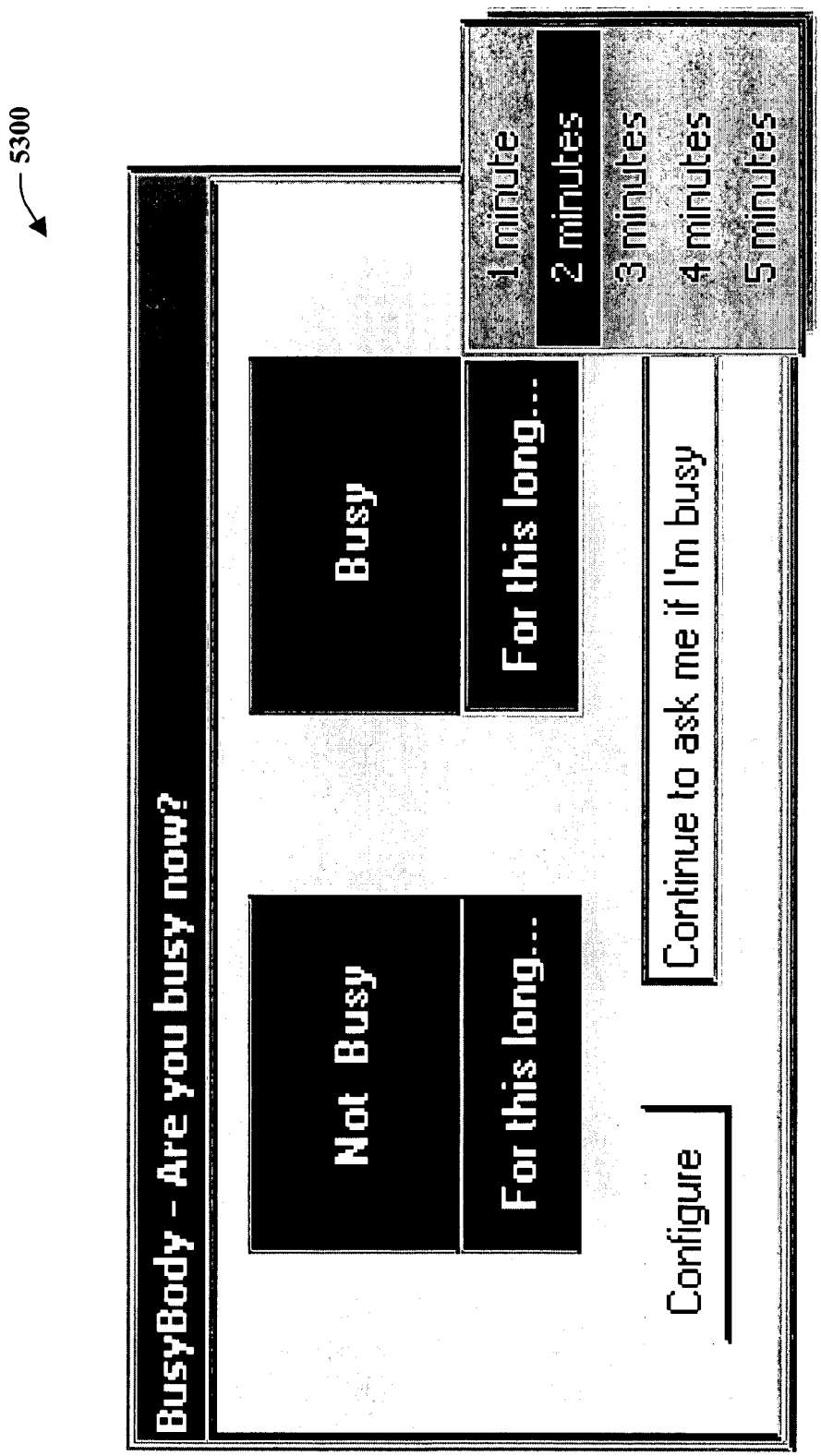

FIG. 51 illustrates a UI 51 that can be utilized by users to specify rescheduling preferences (See the discussion in connection with FIGS. 20-21 for a description of various aspects of rescheduling). A user can utilize this feature when deciding to invoke rescheduling if there will be a suitable slot within 3 days. This can be done during the phone call. FIG. 52 illustrates a UI 5200 that provides another assessment technique with the Coordinate system that is based on "experience sampling." This technique, during a training phase, asks users intermittently via a pop up with audio chime if they are busy or not busy and, if desired, for how long. The system can be configured to pop up at different frequencies and can be turned off after learning is completed. This can be utilized as another training method and used to build probabilistic models that can be utilized in the computation of the expected cost of interruption in Coordinate. FIG. 53 depicts the UI 5200 with a pop up that shows exemplary "how long" scenarios.

Figure 54:
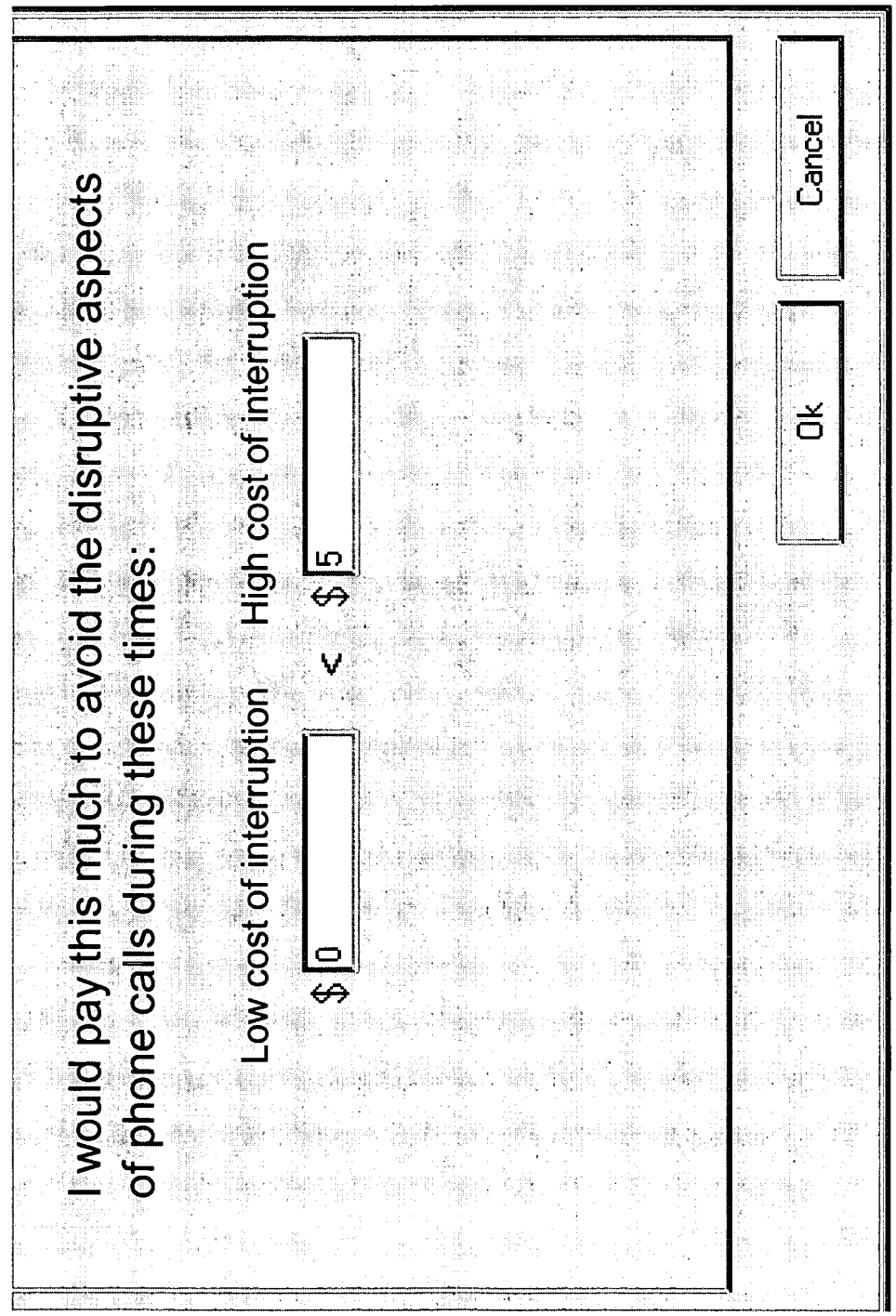
Figure 55:
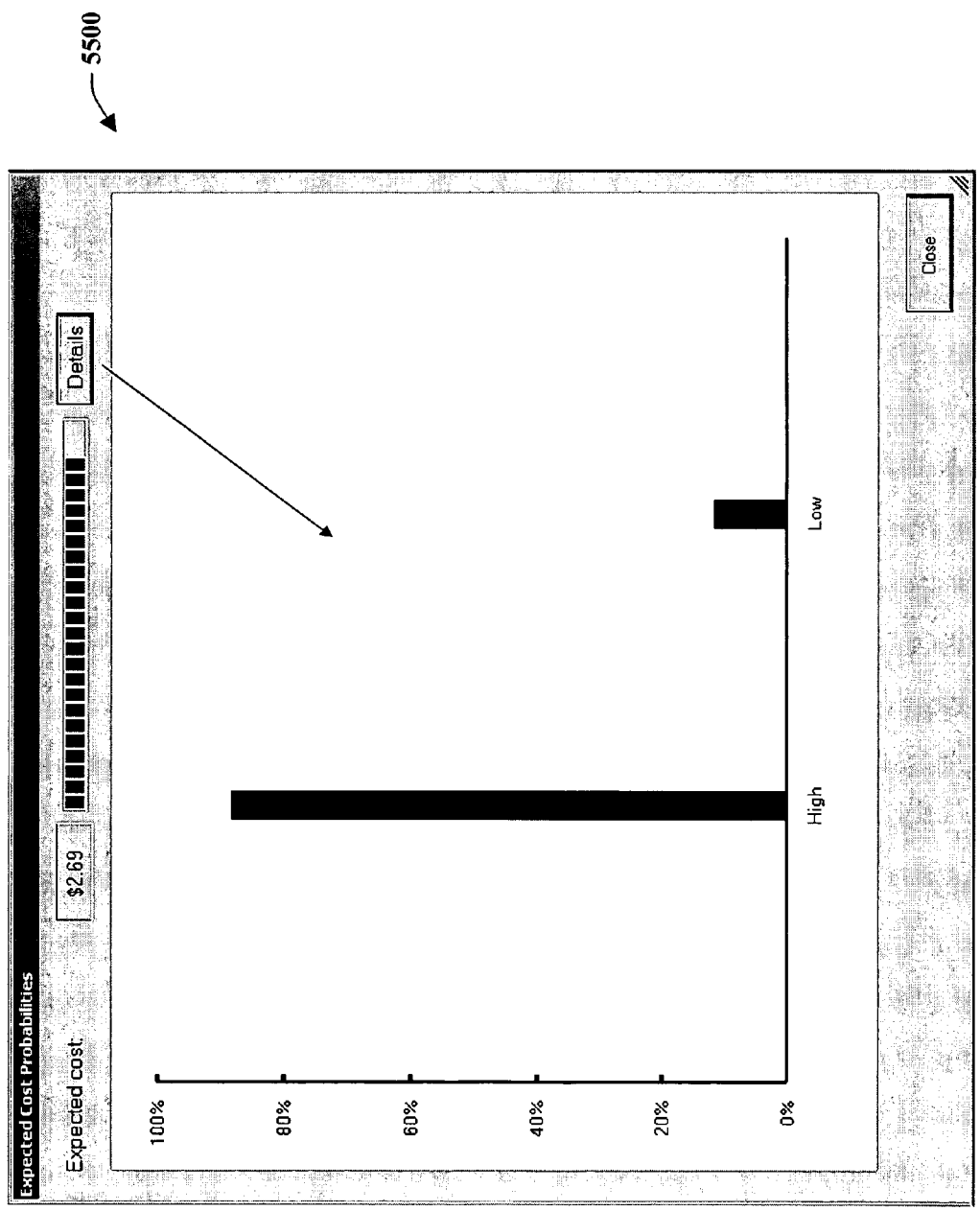
Figure 56:
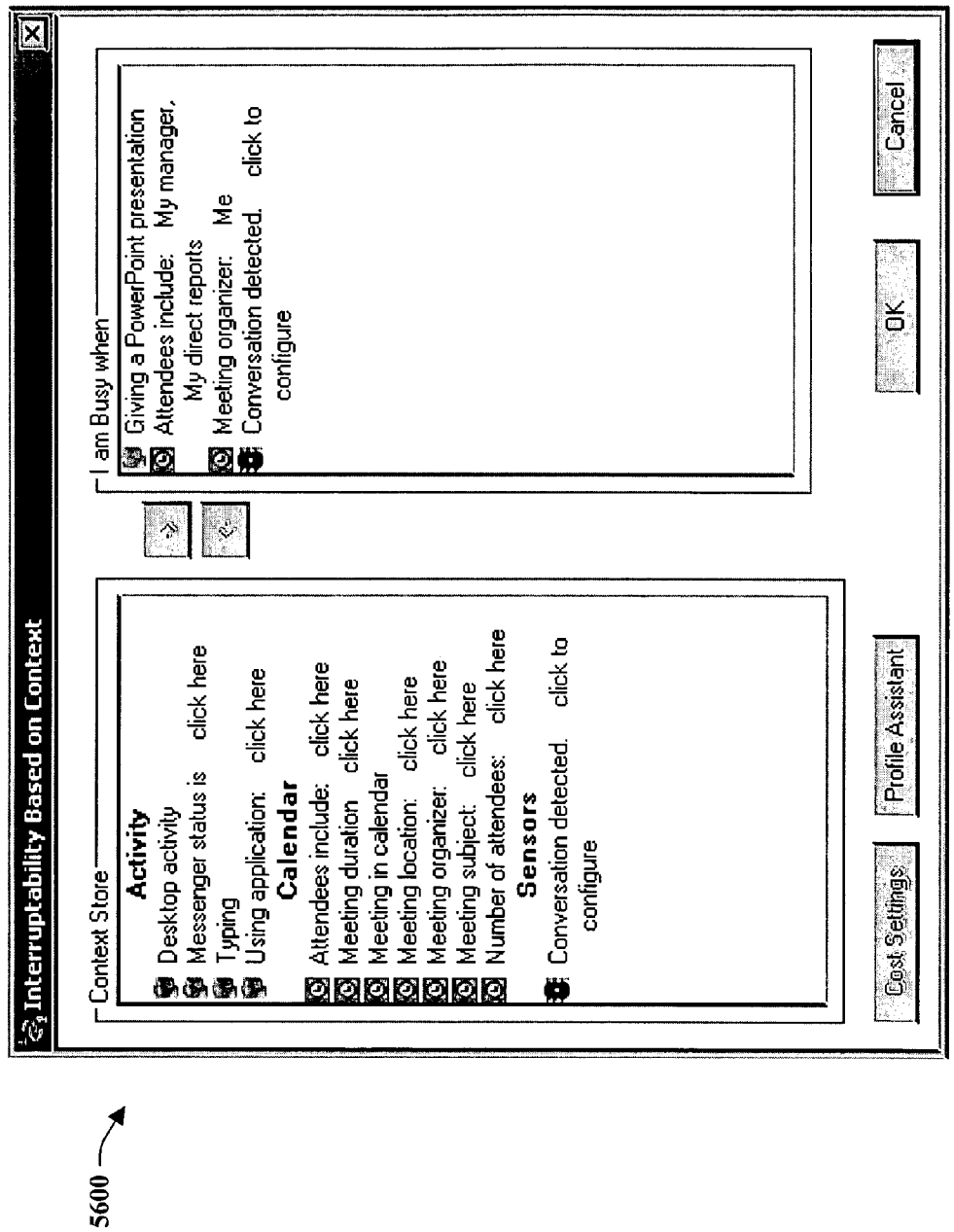
Figure 57:
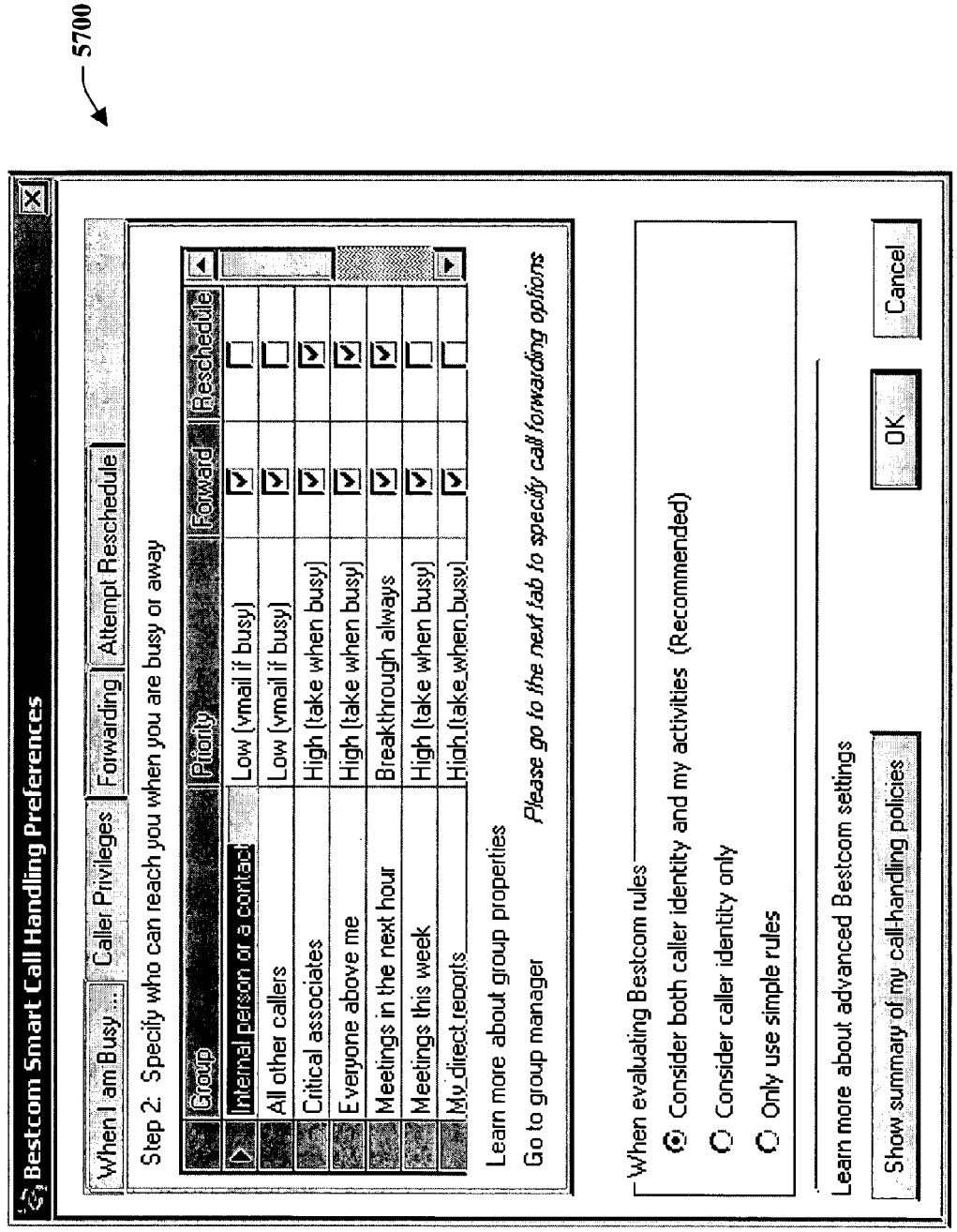

FIG. 54 illustrates a UI 5400 for assessing costs of interruption with a phone call. FIG. 55 illustrates a UI 5500 that utilizes a Bayesian network to reason about the current interruptability of users, in terms of the probability of the user being in a high cost of interruption. The expected cost of the interruption can be computed for a binary hypothesis about a user either being in a high cost state of interruptability or a low/normal state, as the weighted sum of the costs via the following: p(high cost)Cost(high)+[1−p(high cost)]Cost (low), wherein p represents probability. FIGS. 56-57 illustrate UIs 5600 and 5700, respectively, which consider one busy versus normal state. In this approach, users can define when they are busy and policies for handling calls during busy times. This approach represents an "I am Busy when . . . " scenario.

Figure 58:
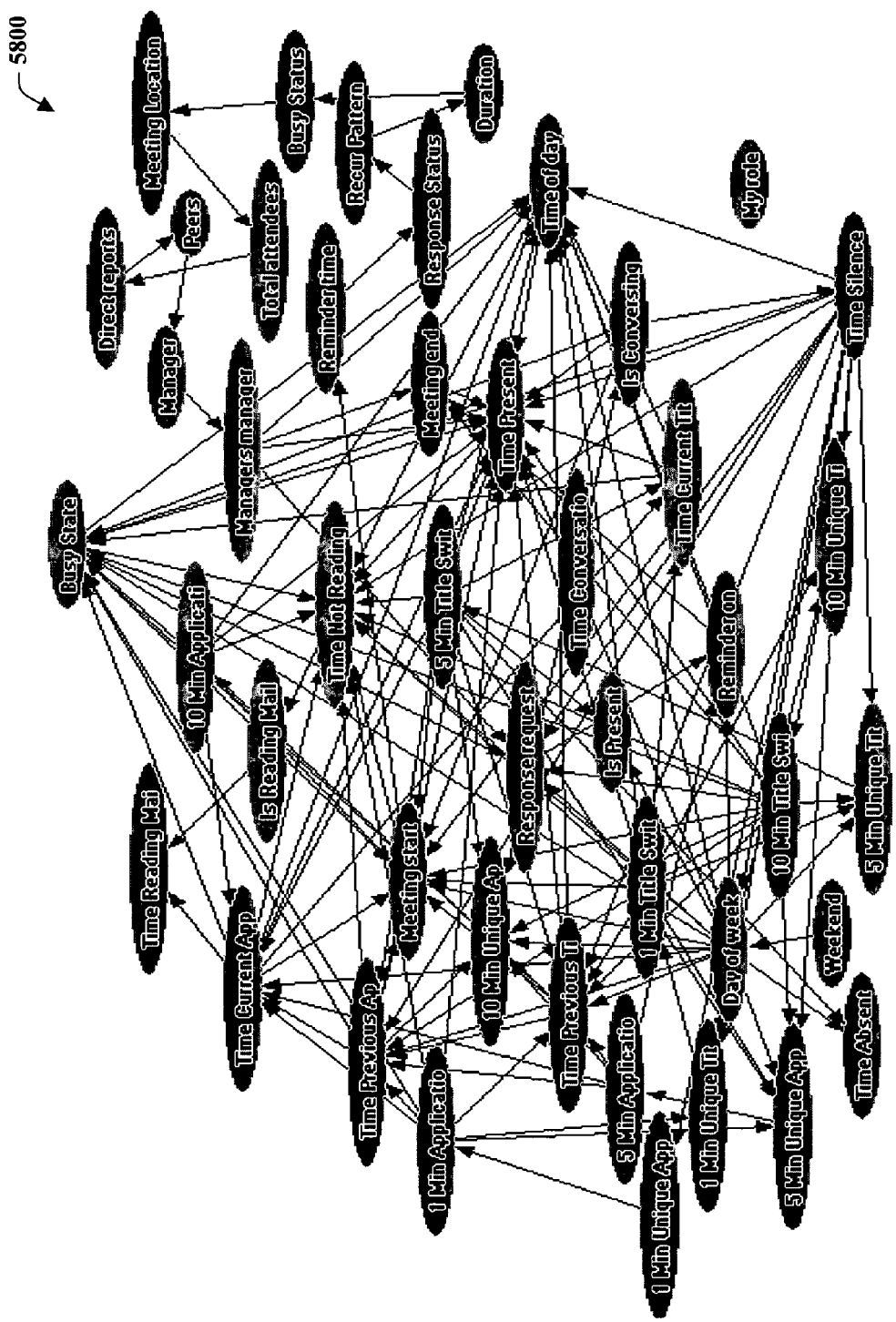
FIG. 58 illustrates an exemplary Bayesian model that can be employed in accordance with an aspect.
Figure 59:
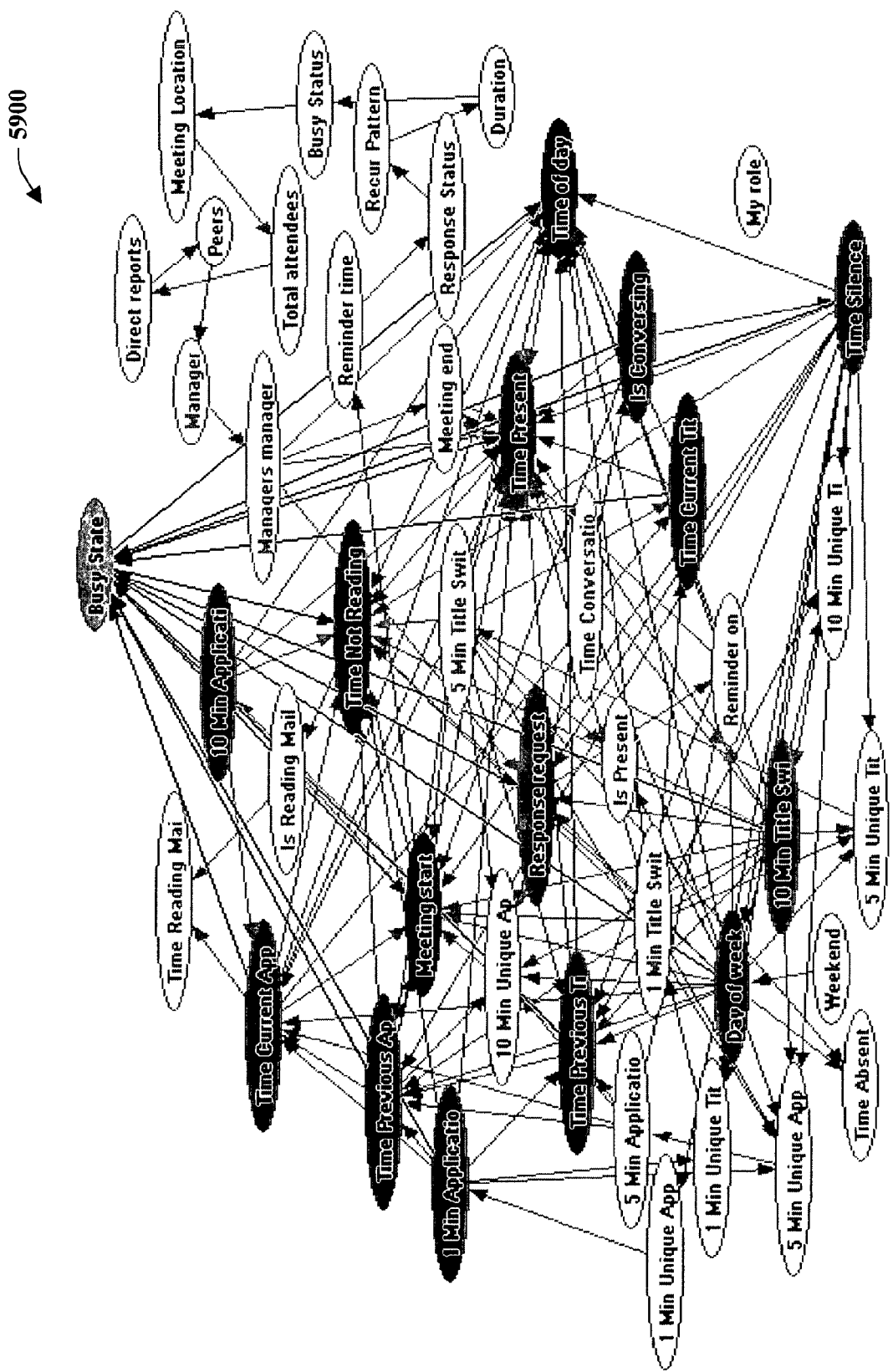
FIG. 59 illustrates an exemplary model that highlights discriminating variables for a particular user.
Figure 60:
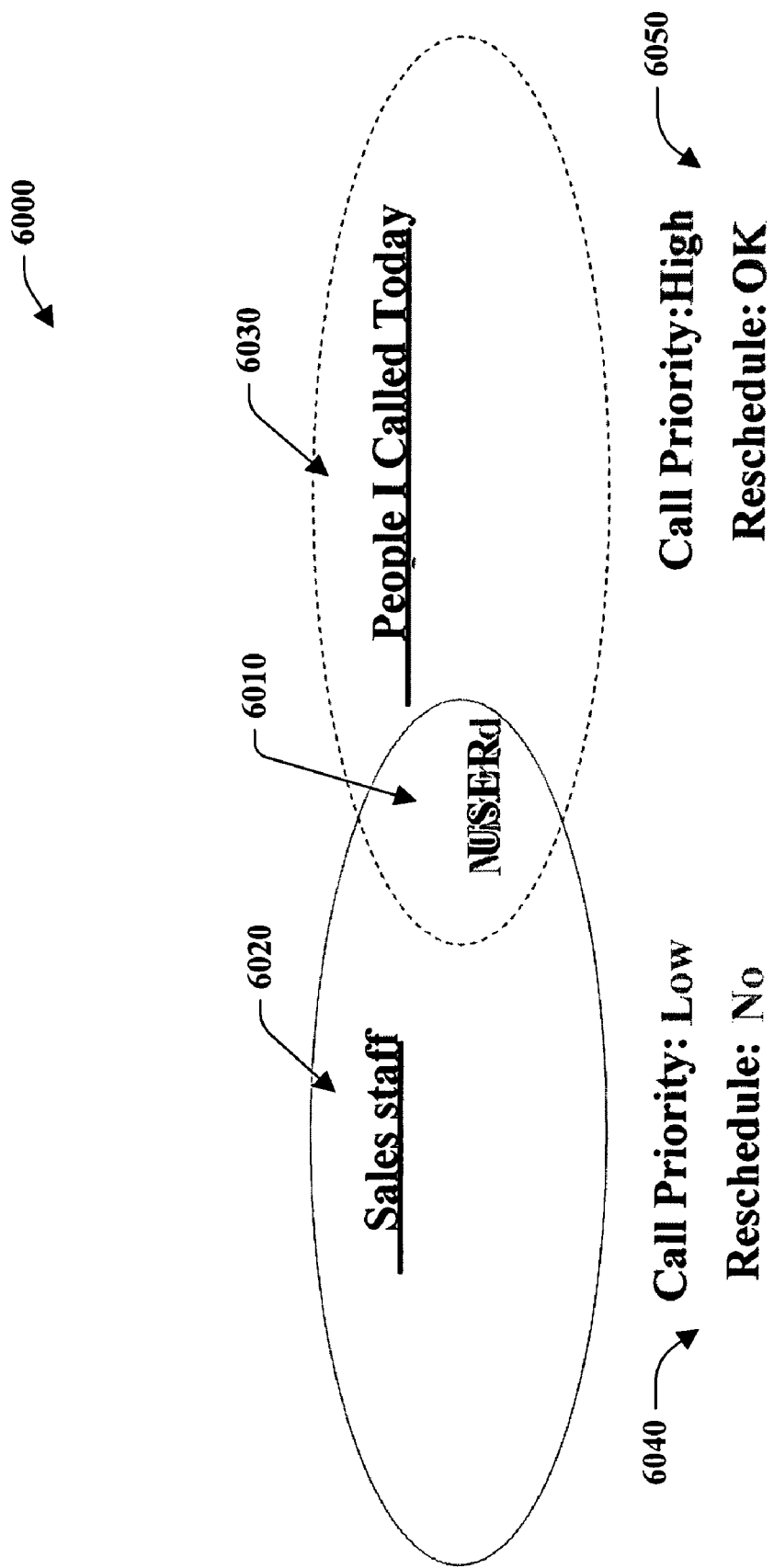
FIG. 60 illustrates exemplary dynamic inheritance in accordance with an aspect of the disclosed innovation.

FIG. 58 illustrates exemplary Bayesian models 5800. These models can be constructed to consider office contextual observations, such as conversation versus a number of conversations, calendar distinctions, time of day, day of week, and desktop activity (e.g., applications on top, switching behavior, etc.). FIG. 59 illustrates another model 5900 that highlights the most important discriminating variables for a particular user. FIG. 60 provides an example of dynamic inheritance. In this figure, a Venn diagram 6000 is utilized to illustrate inheritance of privileges given changing membership in dynamic groups.

In this example, a user 6010 who is a member of a sales staff group 6020 joins a people I called today group 6030. As depicted, the sales staff group 6020 is associated with a "low" call priority and a no reschedule privileges at 6040. The "People I called Today" group 6030, however, is associated with a "high" call priority and a reschedule privileges at 6040. With this configuration, user 6010 inherits a "high" call priority with schedule privileges. This technique can allow users and contexts to inherit the highest priority (or cost of interruption), respectively possible, which can simplify a user's understanding of what will happen in the high-level cost-benefit policy approach. This technique provides callers with breakthrough privileges. Thus, a caller can get through even when block call has been set up in the default interruptability palette.

Management of Context-Sensitive Services

In today's personal and business environments, it is becoming increasingly common for a user to have a multiple communications devices (e.g., computers and voice communications devices) such as a cell phone, a PDA, portable computer, and a desktop computer, for example. Consequently, people are now more free to move around and still stay "connected" to their home and/or business networks to receive and send e-mail messages, process phone calls, and so on. However, with this freedom to roam with many different computing devices comes an added inefficiency, especially for those users who may deal with many computing devices on a regular basis, of now having to login/logout of machines as they are selected for use or non-use. In other words, if a user has four computers at his or her disposal, with a pair located at two different offices (or contexts), one inefficiency involves having to login/logout to each machine as the user moves between the offices, as a basic example. Where it is known that the four machines are assigned to a specific user, for example, the subject invention utilizes at least this knowledge to reduce inefficiencies associated with a user having multiple computing devices.

Figure 61:
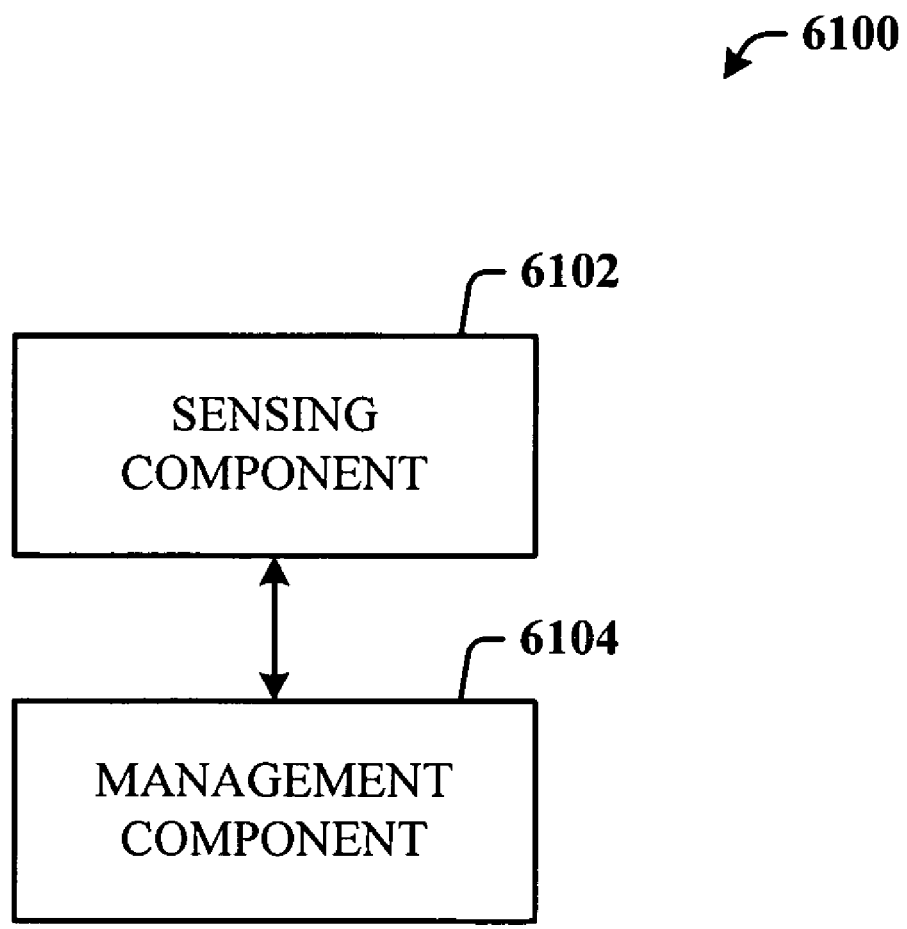
FIG. 61 illustrates a system that facilitates sensing and preferences management for context-sensitive services.

Accordingly, FIG. 61 illustrates a system 6100 that facilitates sensing and preferences management for context-sensitive services. The system 6100 includes a sensing component 6102 that senses a user, and a user context of the user. Sensing can be by user input to a computing device via a keyboard, mouse, for example, or other input means such as voice activation and other automated input mechanisms. For example, if a user logs into a computer, the system 6100 of the invention detects this and the user context becomes known as being with that computer and any other machines in that area. If the user were logging in remotely via a remote client, this can also be determined, since user input did not occur by the input devices of the computer, but by software that facilitates the bypass of such input devices and ports.

The system 6100 also includes a management component 6104 that determines and controls user devices of a context for user interaction in that context. For example, if the sensing component 6102 detects that the user is in an office having three computing devices (e.g., a laptop computer, desktop computer, and a tablet PC), all of which are associated (e.g., assigned or owned) with the user, and the user logged into the desktop computer, the management component 6104 can automatically turn on and log the user into the laptop computer and the tablet PC (if networked). Thus, the management component 6104 becomes aware of the user location (the office with three computers) via the sensing component 6102 and defines (or includes predetermined data that defines that context) that location as a user context. Thereafter, user preferences, rules (or policies), computing functions, and many other parameters can be processed to provide a more efficient user experience with the computing (and/or communications devices) at that location.

Figure 62:
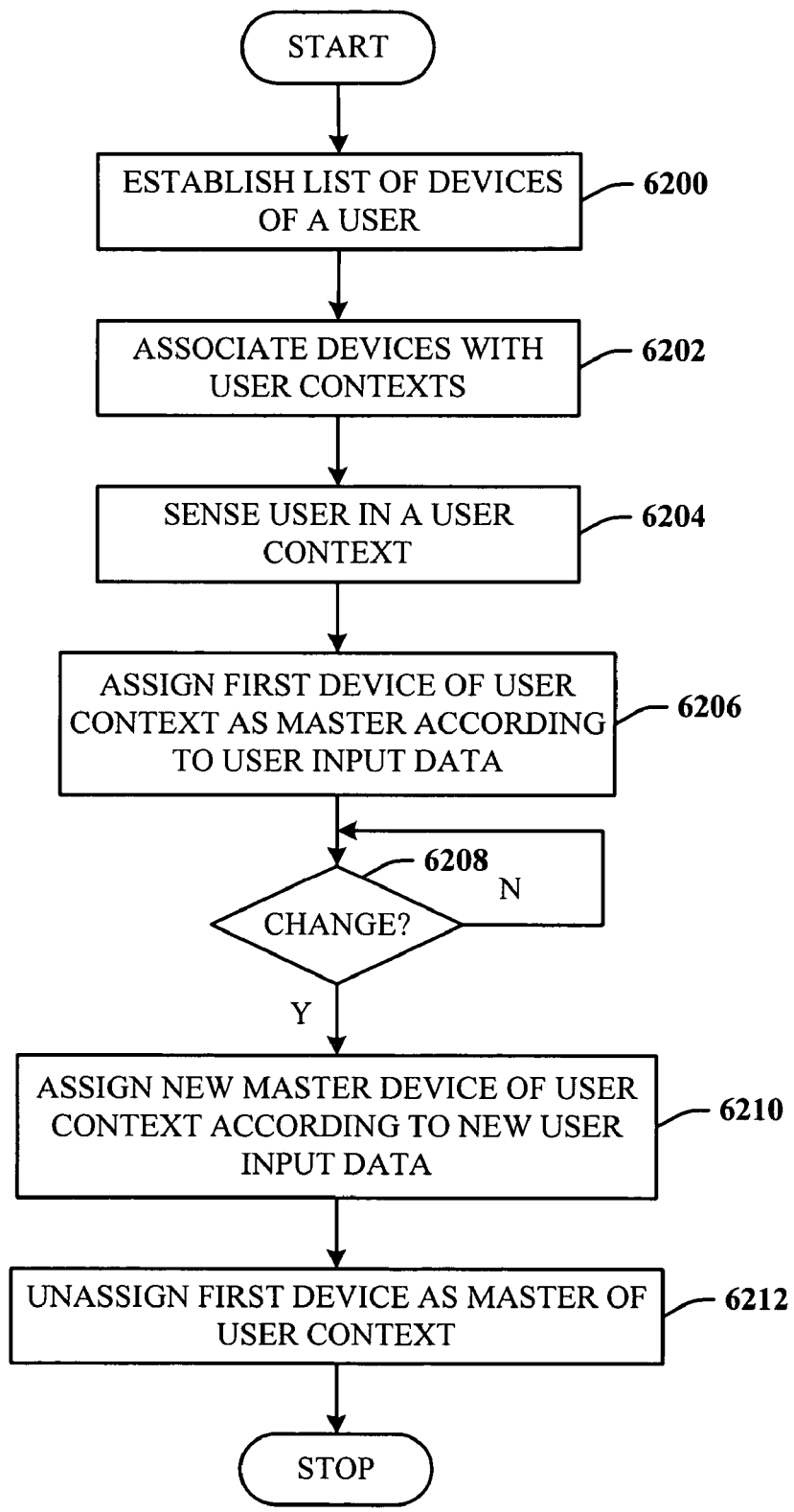
FIG. 62 illustrates a methodology of managing devices in a user context in accordance with the invention based on user input.

FIG. 62 illustrates a methodology of managing devices in a user context in accordance with an aspect based on user input. At 6200, a list of devices can be established in association with the user. Such lists are then stored on a server such that later access is provided when the user is detected in a user context. At 6202, the list of devices can be further associated with their respective locations. The location data is used to define a user context, and the devices associated with that context. At 6204, the sensing component senses the user in one of the user contexts. Again, this can be based on user input to a computer at that location (or user context), for example. At 6206, once the user is known to be in a user context that includes multiple devices, it is within contemplation of the subject invention that one of the devices will be designated a master, in that, the master (or principal) computing device is that which is predicted to be or is detected to be the device with which the user interacts the most. The other devices at that location will then be secondary at that time.

At 6208, the system monitors user activity in that context to determine if a change is required in that the user is interacting with one of the secondary devices more frequently than the master device. If not, flow loops back to the input of 6208 to continue monitoring user device activity. If more user activity is associated with a secondary device, flow proceeds from 6208 to 6210 where that secondary device is elevated to master status. At 6212, the current master is reduced in status to a secondary device. As will be described infra, this change in device status can be used as a trigger to invoke other methods and algorithms that provide rich context-sensitive services.

In one implementation, the server continually monitors and assigns status to the device being used (or not used), and then propagates this information to all clients. In another implementation, the devices (or clients) determine master or secondary status, and then notify the management component (e.g., a server), which then notifies each of the devices as to who is the master. In this second implementation, no device ever knows how any other client devices there are, only the server knows. If the master becomes disconnected, the process is repeated until a new master is assigned. Each device is configured to send a "keep alive" message to the server. If the server does not receive the "keep alive" message from the master within a predetermined period of time, another device will take over as master.

Figure 63:
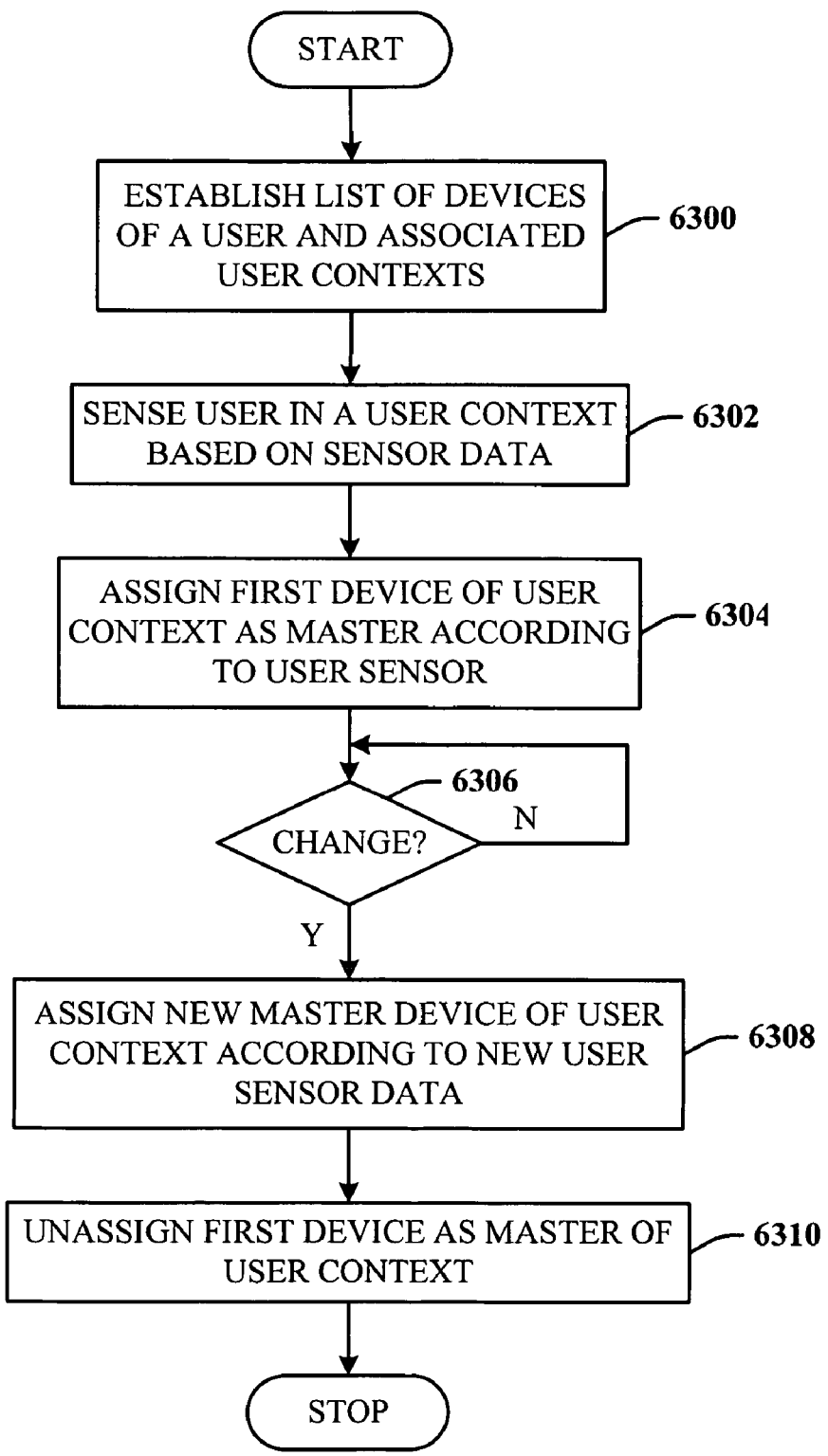
FIG. 63 illustrates a methodology of managing devices in a user context in accordance with the invention based on sensor input.

FIG. 63 illustrates a methodology of managing devices in a user context based on sensor input. At 6300, a list of devices can be established in association with the user. The list of devices can be further associated with their respective locations (or contexts). The location data is used to define a user context, and the devices associated with that context. The list of devices and associated data are then stored on a server such that later access is provided when the user is detected in a user context. At 6302, the sensing component senses the user in one of the user contexts base don sensor data. For example, if the user carries a badge that is read at the location, this information can be used to manage the user context. Another example is where the user answers a landline telephone at that location. Given that the telephone number is associated with that location, the user context can then be ascertained.

At 6304, once the user is known to be in a context that includes multiple devices, a device is assigned as a master. Again, the master computing device is that which is predicted to be or is detected to be the device with which the user interacts the most. The other devices at that location will then be secondary at that time. At 6306, the system monitors user activity in that user context to determine if a change is required, in that the user is interacting with one of the secondary devices more frequently than the master device. If not, flow loops back to the input of 6306 to continue monitoring user device activity. If more user activity is associated with a secondary device, flow proceeds from 6306 to 6308 where that secondary device is elevated to master status. At 6310, the current master is reduced in status to a secondary device. Again, this change in device status can be used as a trigger to invoke other methods and algorithms that provide rich context-sensitive services.

Figure 64:
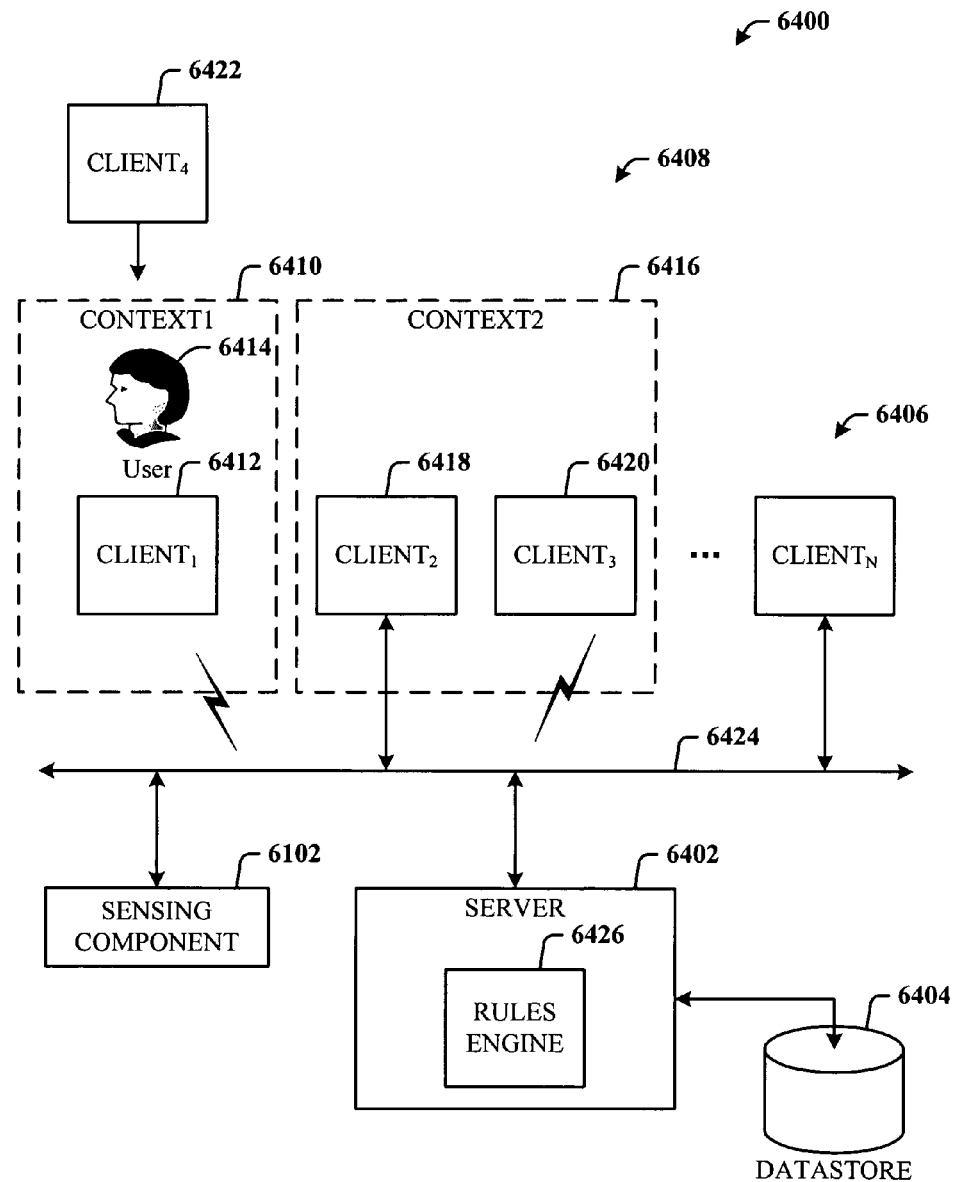
FIG. 64 illustrates a more detailed diagram of a sensing and context management system.

FIG. 64 illustrates a more detailed diagram of a sensing and context management system 6400. The system 6400 includes a server 6402 that stores in a datastore 6404 at least a list of users, device data of devices 6406 (denoted $CLIENT_1$, $CLIENT_2$, $CLIENT_3$, ..., $CLIENT_N$) associated with the users, the locations 6408 (or contexts) (denoted $CONTEXT_1$, $CONTEXT_2$, ...) of the devices, user preferences, and other related information, as desired. As illustrated, a first context 6410 ($CONTEXT_1$) includes a first client machine 6412. Thus, when the associated user 6414 is in the first context 6410, the first client machine 6412 is automatically designated a master, and user preferences associated with that specific machine (and at that time of day and year, for example) can be applied. As described supra, this can be based on the user interacting with the first client 6412 (e.g., moving a mouse to cause interruption of a screensaver, logging in, receiving a phone call in or near the first context 6410, having a badge sensed in or near that context 6410, sensing motion in that context 6410, ...).

If the user 6414 leaves the first context 6410 and enters a second context 6416 that includes second and third devices (6418 and 6420), in one implementation, the first client 6412 retains its master status until a new master is designated. This can occur even if the user logs off the first client 6412, providing solid confirmation that it is no longer going to be used. In another implementation, the status of the first client 6412 is automatically downgraded to secondary status. Thus, there is no device designated as a master among all of the devices associated with the user 6414. When the user 6414 enters the second context 6416, and the sensing component 6102 processes input data that determines that the user is there, one of the second and third clients (6418 and 6420) can automatically be designated as a master. In one implementation, the user is not required to interact with either of the clients (6418 and 6420) before one to be selected as a master. In another embodiment, the user should first interact with one of the clients (6418 and 6420) before the master is designated. Once the master is selected, the other client is designated as a secondary client (or device).

This process can occur in all contexts 6408 of the user 6410. It is to be appreciated that the first and second contexts (6410 and 6416) need not be in separate offices, buildings, or geographic locations, but can be in the same room. Thus, the size and scope of a context is definable by the particular application.

If the user 6414 were to carry a portable computer 6416 into the first context, the defaults information stored in the datastore 6404 would need to be updated. Using conventional triangulation techniques, for example, or other indoor location techniques, such as WhereNet, the approximate location (or context) of the portable computer can be determined. Thus, when the datastore 6404 has been updated, processing of the master in the first context 6410 (not includes two devices) can proceed according to the invention described herein.

As indicated, the clients (6412, 6418 and 6420) can communicate with a network 6424 in a wired and/or wireless manner. Once the server 6402 determines that a client is online (or dropped offline), the sensing and context determination processes are adjusted accordingly. For example, powering down the third client 6420 is an obvious downgrading of it from master status. In this case, the third client 6420 is may not even be designated as a secondary device and the associated configuration files and preferences applied.

The server 6402 includes a rules engine 6426 that processes rules (or policies) defined and/or automatically generated and updated for determining the status of devices, the context of the user, and processing sensor clusters costs and priorities, sensor data, and user input data, for example.

Figure 65:
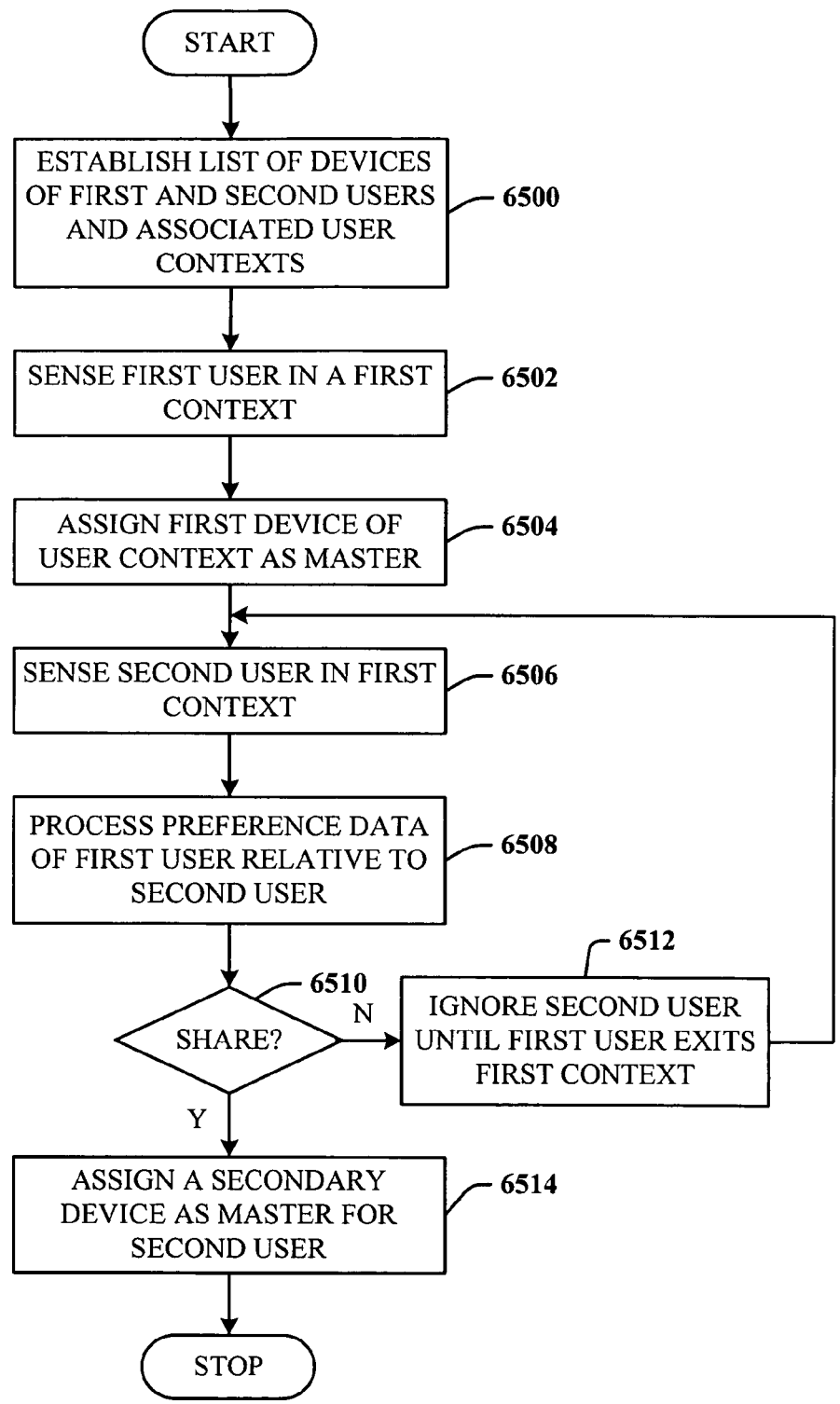
FIG. 65 illustrates a methodology of processing multiple users within a single overlapping context.

FIG. 65 illustrates a methodology of processing multiple users within a single overlapping context. This scenario addresses a situation where computing devices (e.g., multiple desktop computers) may be shared between several users. At 6500, a list of devices for first and second users and associated user contexts, is defined. At 6502, a first user enters a first context and is sensed. At 6504, a first device of the first context is assigned as a master. At 6506, a second user enters the first context and is sensed. At 6508, user preference data of the first user is applied to the first context relative to the second user. In other words, it may be that the user preferences of the first user do not allow for sharing the devices in that context at a given point in time.

However, at a different time, when both users are present, sharing may be allowed. This can be on a first come-first served basis. Accordingly, at 6510, the system determines if sharing is allowed. If not, flow proceeds to 6512 where context processing of the second user is not allowed, and the user is ignored at least until the first user preferences change, the first user leaves the area, or other similar events occur that allow the second user to interact with the context devices. Flow is then back to 6506 to continue sensing the presence of the second user, and applying that data against the preferences of the first user. Alternatively, if sharing is allowed at 6510, a secondary device can be assigned as a "master" for the second user, but which device is a secondary device relative to the first user.

Figure 66:
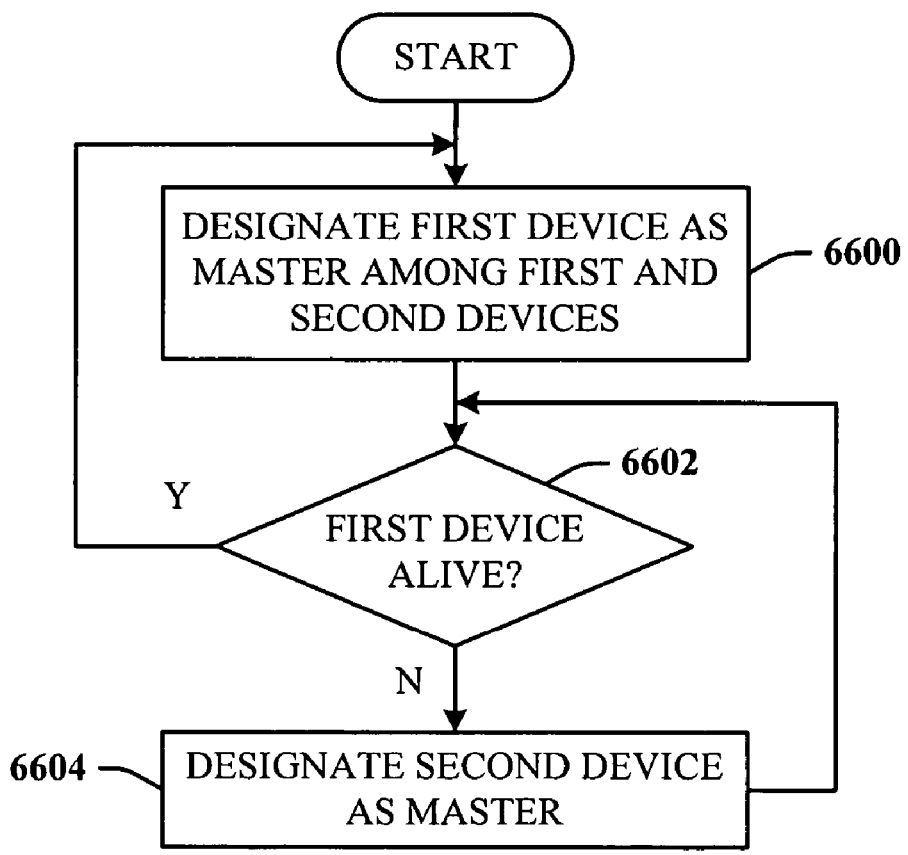
FIG. 66 illustrates a methodology of managing multiple devices when one goes offline.

FIG. 66 illustrates a methodology of managing multiple devices when one goes offline. At 6600, a first device is designated the master among first and second devices. At 6602, the system determines if the first device has gone offline or is not alive (e.g., failed, network connection terminated, user logged out, device is powered down, ...). If not, progress is back to the input of 6600 to continue to designate the first device as master. If the first device is not alive, flow is from 6602 to 6604 where the second device is automatically designated the master. It is to be appreciated that is may be a preference rule that once the first device comes back online (or is alive), that it be redesignated the master. Accordingly, flow is from 6604 back to the input of 6602 to again check if the first device is alive, and if so, back to 6600 to redesignate the first device as master.

Figure 67:
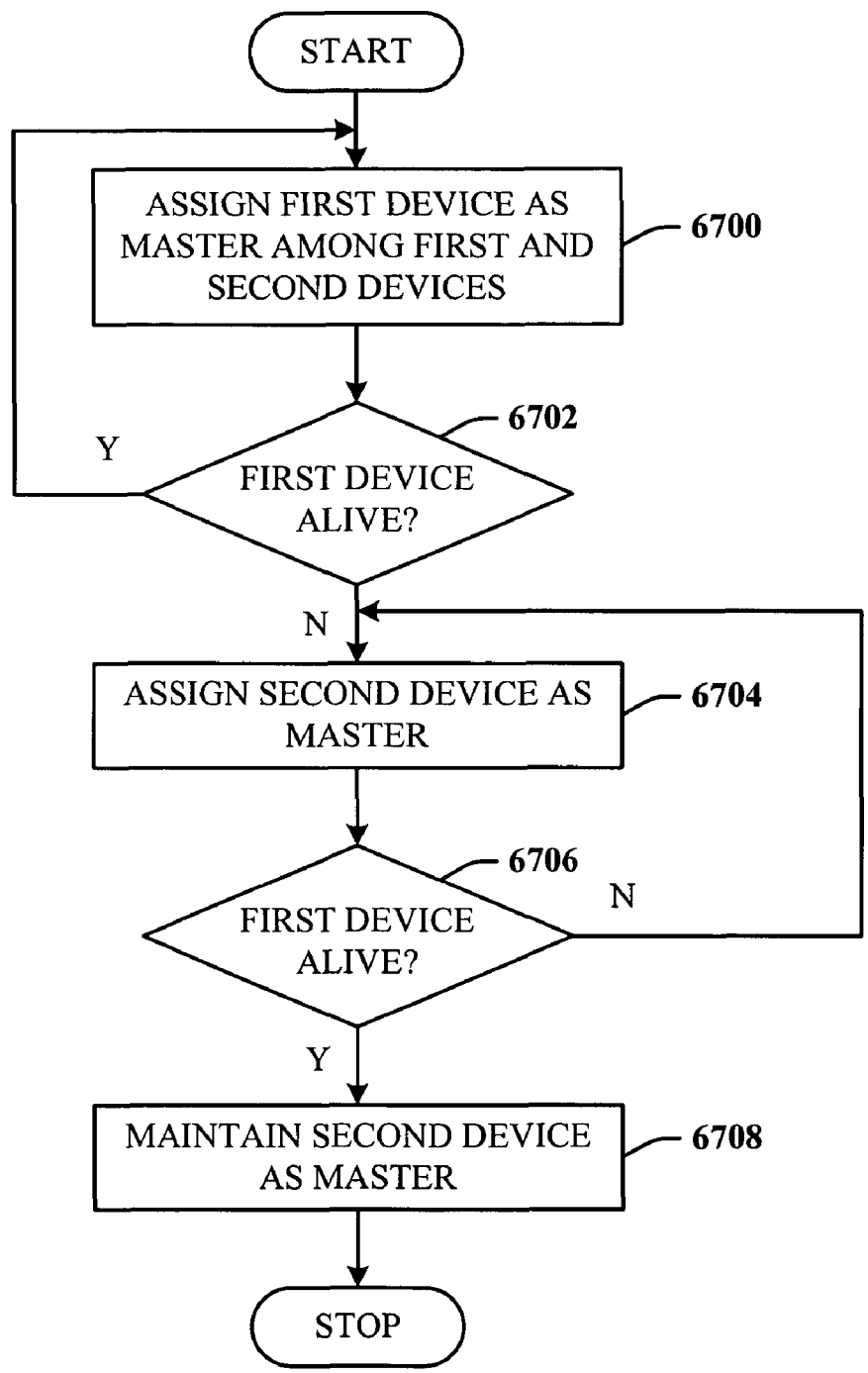
FIG. 67 illustrates a methodology of maintaining a device as master in accordance with an aspect.

FIG. 67 illustrates a methodology of maintaining a device as master. At 6700, a first device is designated the master among first and second devices. At 6702, the system determines if the first device has gone offline or is not alive (e.g., failed, network connection terminated, user logged out, device powered down, . . . ). If not, progress is back to the input of 6700 to continue to designate the first device as master. If the first device is not alive, flow is from 6702 to 6704 where the second device is automatically designated the master. At 6706, the system can again check if the first device is alive. If not, flow is back to 6704 to maintain the first device as master. However, even if the first device is alive, flow proceeds from 6706 to 6708 where the second device is maintained as the master device. This situation can occur between two relatively adjacent computers where the current master device fails, but while the user is working on the new master, the "old" master comes back online. In this case, it may not be desirable to have the old master regain its status due to the application of preferences and other rules that may automatically be invoked.

Figure 68:
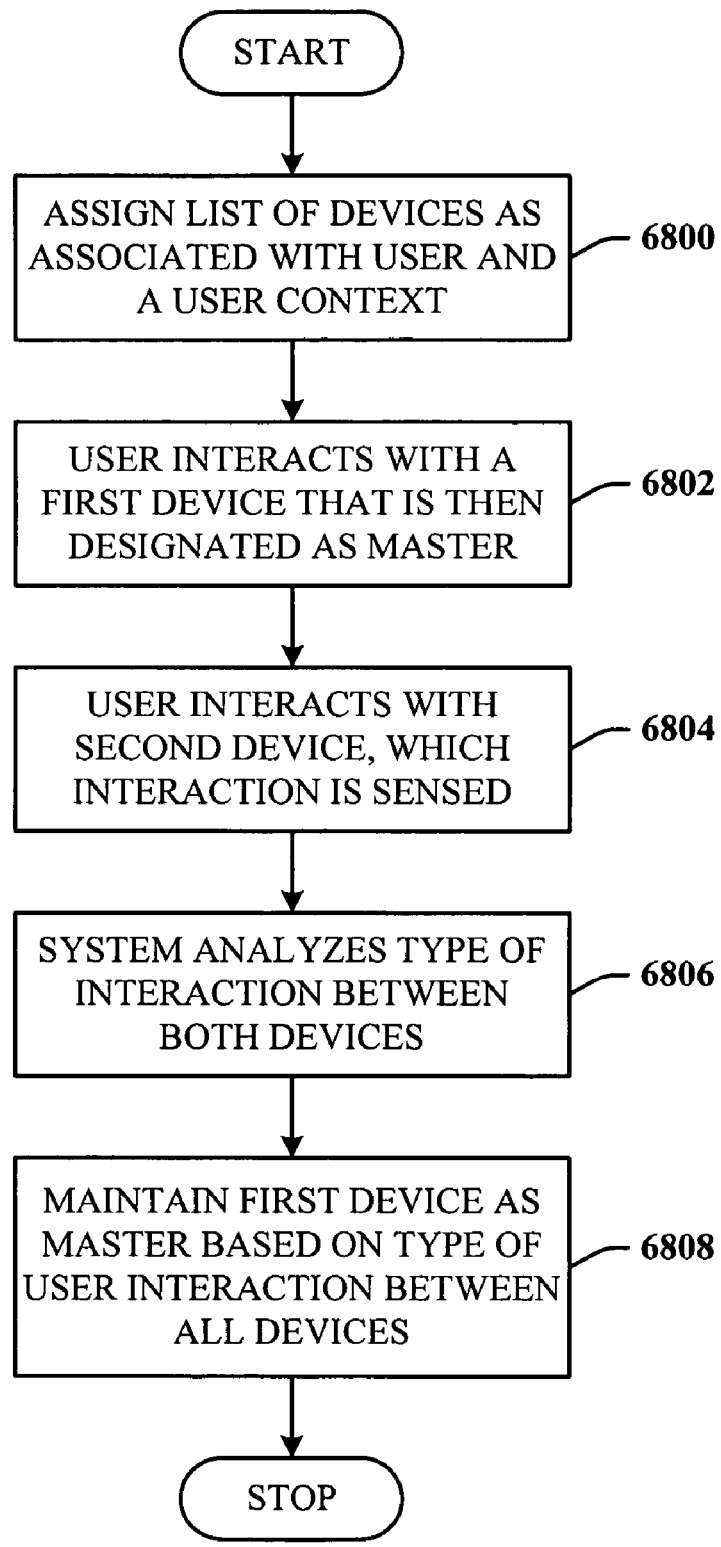
FIG. 68 illustrates an alternative methodology of managing multiple devices based on the type of user interaction.

FIG. 68 illustrates an alternative methodology of managing multiple devices based on the type of user interaction. At 6800, a list of devices are assigned and associated with a user and user contexts. At 6802, a first device is assigned as master due to user interaction therewith. This interaction can be working within a word-processing document, for example. At 6804, user interaction with a second device is sensed by the sensing component, which could indicate that the second device should be elevated from secondary to master. This interaction could be checking e-mail, for example. However, at 6806, the system analyzes the type of user interaction occurring with the two devices. The first device is maintained as the master based on the type of user interaction with the second device, as indicated at 6808. This could be based on a rule that defines word processing as a priority over checking e-mail. Thus, the device stays does not change, since it is more likely that the user will continue to interact more with the first device than the second device.

It should be noted that in all cases, the server (or management component) will update the status of the devices to all other devices. Additionally, the server continually pings the online devices for their online/offline status, and updates the all other devices accordingly. It is within contemplation of the subject invention that each client can host a table of status information that is continually updated by the server. Moreover, each client can host its own client version of the management component such that if a major network failure occurs, any subnet that is still alive that includes all or a portion of the clients can still operate independent of the network failure.

Figure 69:
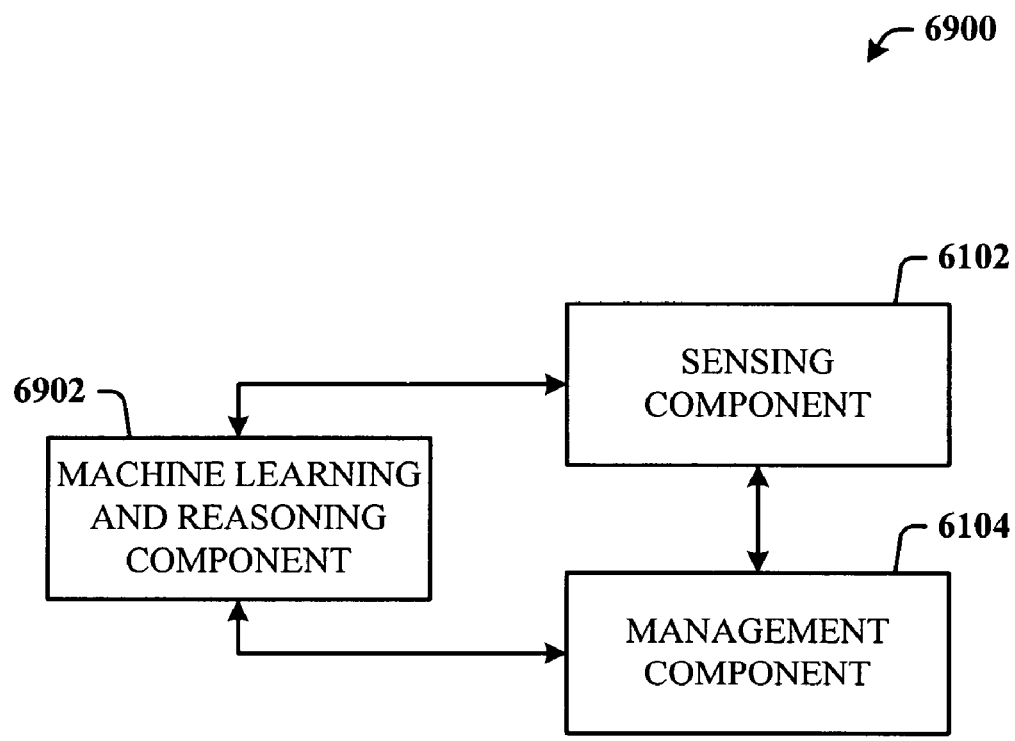
FIG. 69 illustrates a system that employs machine learning and reasoning which facilitates automating one or more features in accordance with the subject invention.

FIG. 69 illustrates a system 6900 that employs a machine learning and reasoning (MLR) component 6902 which facilitates automating one or more features. The system 6900 includes the MLR component 6902 (e.g., in connection with selection) for carrying out various aspects thereof. The MLR component 6902 interfaces to both the sensing component 6102 and the management component 6104. A process for determining when to designate a user device of a context as master can be facilitated via an automatic classifier system and process.

A classifier is a function that maps an input attribute vector, $x=(x1, x2, x3, x4, xn)$, to a class label class(x). The classifier can also output a confidence that the input belongs to a class, that is, $f(x)=confidence(class(x))$. Such classification can employ a probabilistic and/or statistical-based analysis (e.g., factoring into the analysis utilities and costs) to prognose or infer an action that a user desires to be automatically performed. In the case of context management and sensing, for example, attributes can be user input data or other data-specific attributes derived from the type of user input device, and the classes are categories or areas of interest (e.g., levels of priorities).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria predicting where or to what context the user is heading next and, powering on and/or configuring the device accordingly based on user intention and/or past usage in that context. If the user repeatedly uses the same device as a master over a period of days (or weeks), the MLR component 6902 can learn this and invoke new rules accordingly, as an example.

Figure 70:
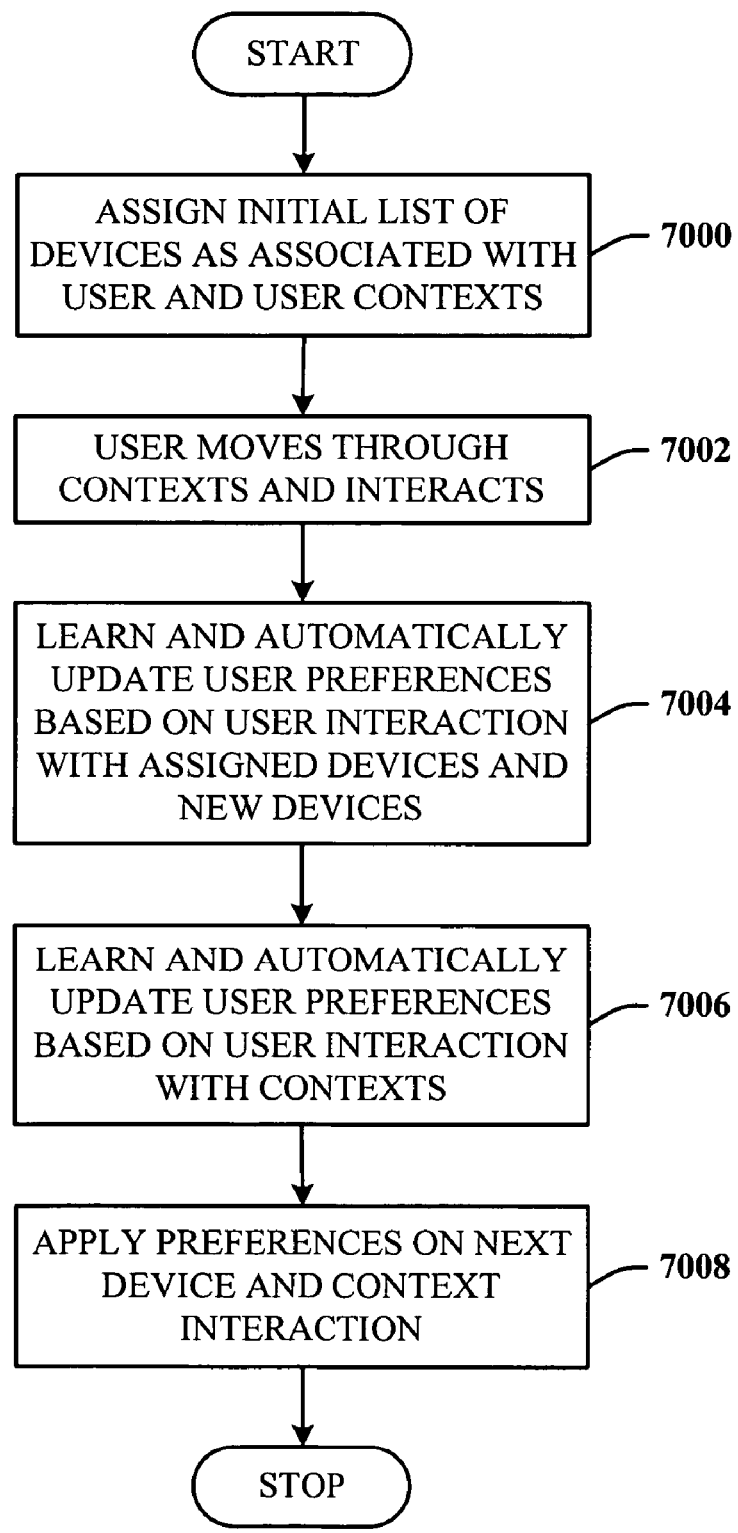
FIG. 70 illustrates a methodology of processing and learning user interactions and updating user preferences.

FIG. 70 illustrates a methodology of processing and learning user interactions and updating user preferences. At 7000, a list of devices is assigned to a user and associated with one or more user contexts. At 7002, the user then moves though contexts interacting with context devices along the way. At 7004, the MLR component learns and automatically updates user preferences based on the user interaction with assigned devices and new devices. At 7006, the MLR component learns and automatically updates user preferences based on the user interaction with user contexts. At 7008, the learned aspects are applied to the user preferences, which are then invoked either immediately, or the next time (or a later time) the user interacts with the devices and contexts.

Figure 71:
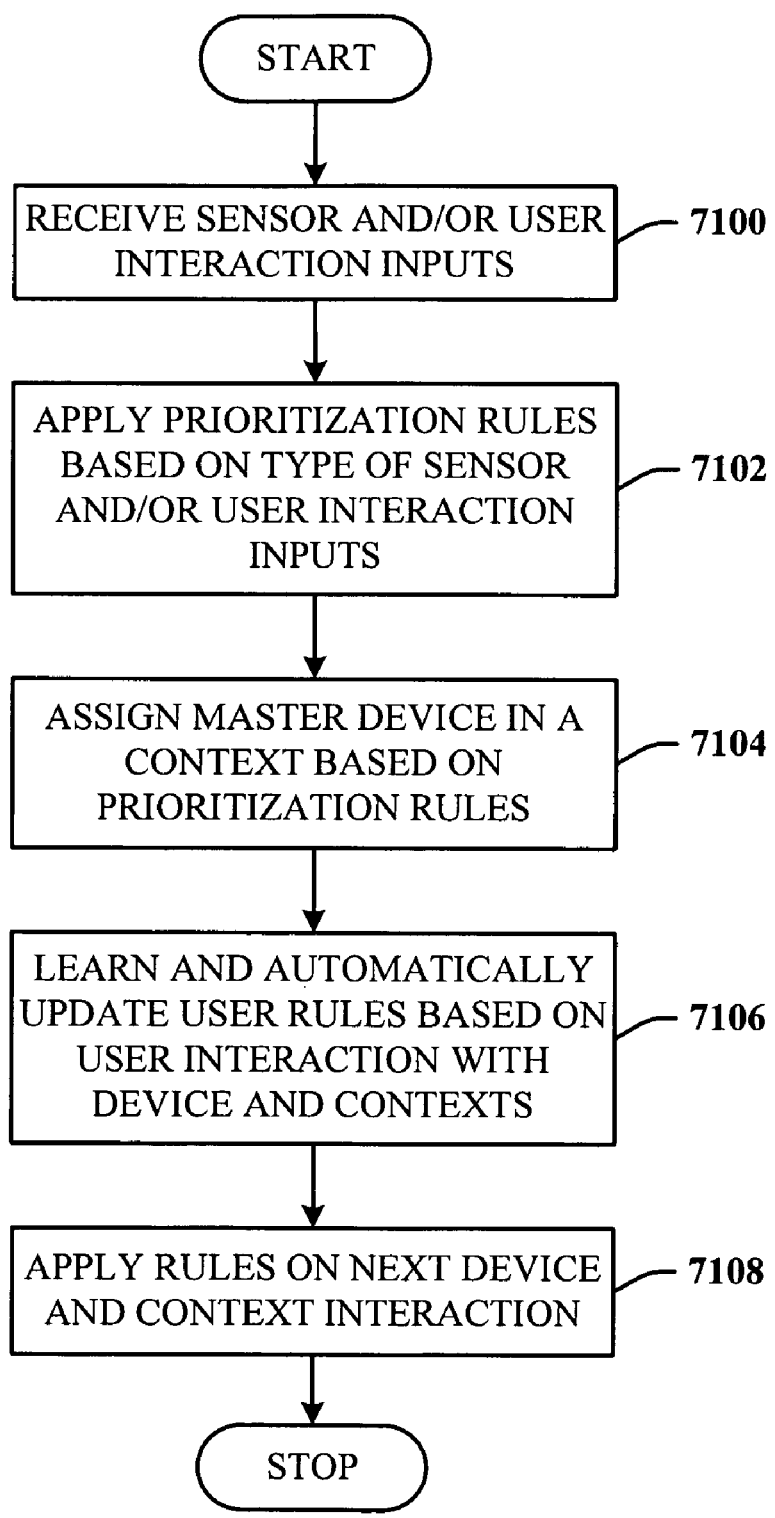
FIG. 71 illustrates a methodology of processing and learning user interactions and updating user rules.

FIG. 71 illustrates a methodology of processing and learning user interactions and updating user rules. At 7100, sensor and/or user interaction inputs are received for processing. At 7102, prioritization rules are applied based on the type of sensor activated and/or user interaction inputs. At 7104, a device of a context is assigned as the master based on the prioritization rules. At 7106, the MLR component facilitates learning and automatically updating user rules based on user interaction with devices and contexts. At 7108, rules are applied on the interaction with the next device and user context.

Figure 72:
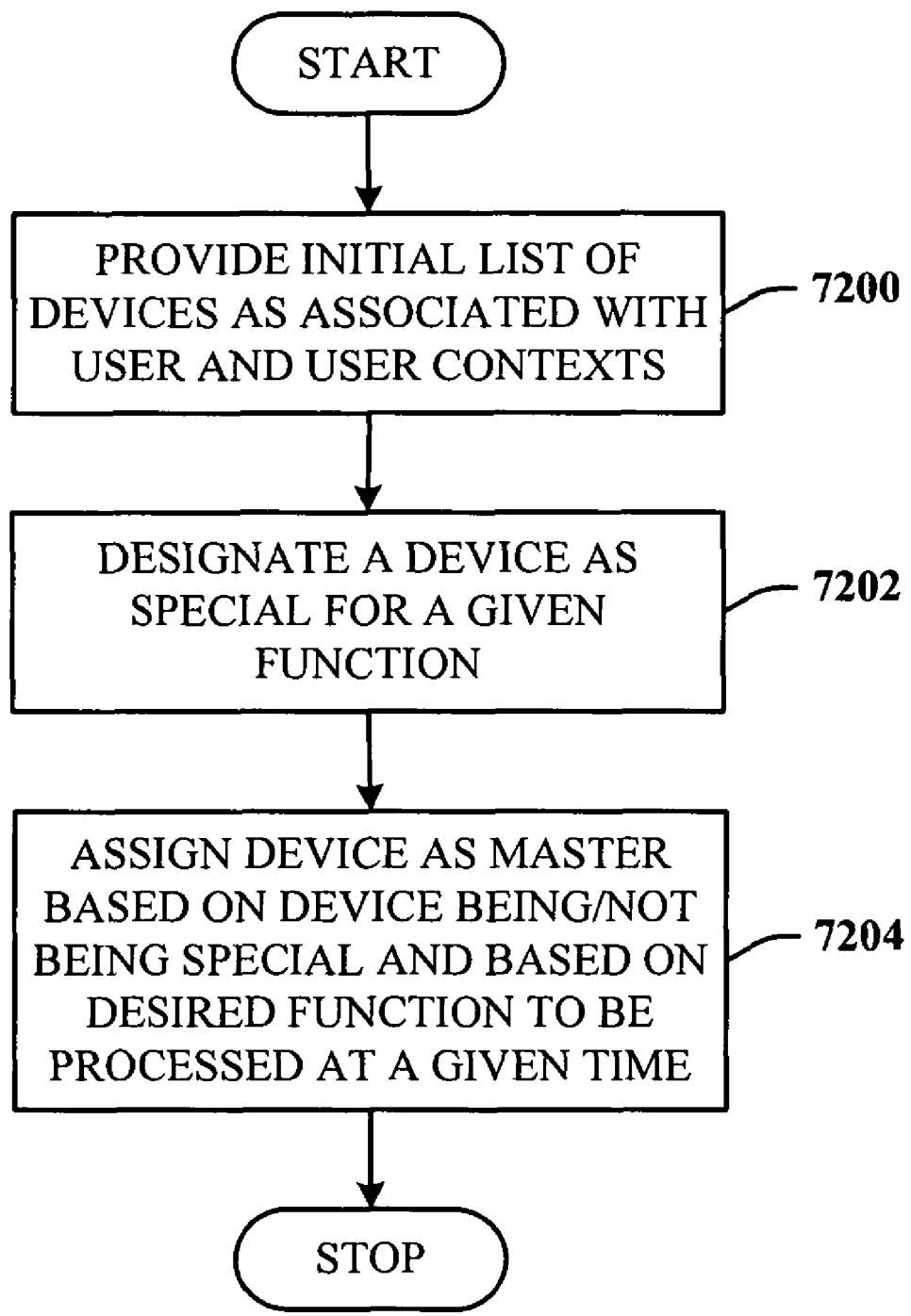
FIG. 72 illustrates a methodology of processing a device marked as special.

FIG. 72 illustrates a methodology of processing a device marked as special. At 7200, provide an initial list of devices that are associated with the user and corresponding user contexts. At 7202, the user designates a device as special for a given function. For example, the device can be "dedicated" to presenting streaming video or use for VoIP, for example, thereby automatically being attached to master status when the user enters the context and is sensed by the sensing component to be in that context. Accordingly, at 7204, the device is assigned as the master being (or not being) special, and based on a desired function to be processed at a given time.

Figure 73:
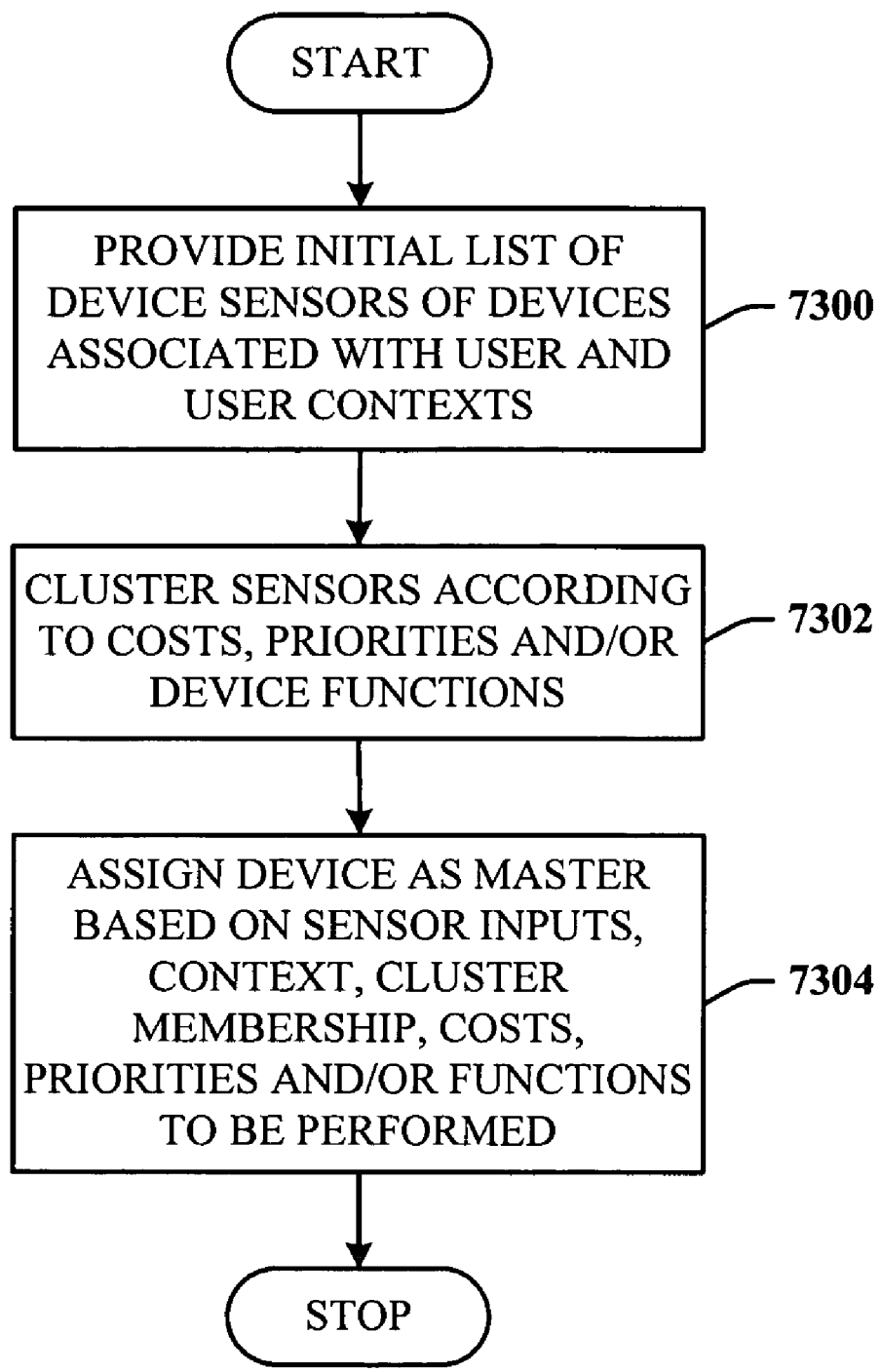
FIG. 73 illustrates a methodology of clustering sensors for selected purposes.

FIG. 73 illustrates a methodology of clustering sensors for selected purposes. At 7300, an initial list of device sensors of devices associated with a user and user context is provided. Note that this list can be updated by learning that the devices no longer use an associated sensor, or now include a sensor that was not previously associated with that device. At 7302, sensors can be clusters according to user preferences. For example, if voice activation is coupled with a particular user context, and the user interacts with a device of the context also via a mouse, such combination of inputs can be employed to automatically designate that device as a master. More specifically, the device can be assigned as master in that context based on sensor grouping, sensor inputs, context, cluster membership, costs associated with applying a rule that invokes a sensor cluster, priorities, and/or functions to be performed, as indicated at 7304.

In a brief, but not all-inclusive summary, the sensing and context-awareness architecture can detect that a user is active on a given device, and manage device processes as the user moves from device to device, context to context, and even within a single context. In one example, if a user is detected on a computer, a rule can be invoked that routes a telephone call to the nearest phone. Another rule could be invoked such that if the user is interacting with that computer, then the call is not routed to the nearest phone, or not routed right away, but after a predetermined amount of time.

The rules (or policies) can be employed such that given a number of different input parameters (e.g., type of device, user, user interaction with the device, user preferences, . . . ), the rules are processed to effect the way the sensing and context-awareness architecture functions. The rules can be stored and executed on at least one of the client device and the server. Machine information can be used to invoke preferences as how that machine will operate and interact with a given user.

The context architecture can be used to exclude other user such that only a given user will be allowed to interact with devices of the one or more contexts. In one example, the system powers up and down devices based on where the user could be heading and what the user is currently doing on a set of machines within a context.

The sensing component is sufficiently robust to sense not only user input interactions of a device (e.g., via keyboard, mouse, microphone, touch screen, . . . ), but also via sensors of another device that the user is not interacting with. For example, if the user is working on an existing master desktop computer, but gets up, a pocket device that is recognized by the context architecture as being alive on the network, but a secondary device and employs an accelerometer, for example, can be sensed to cause the master desktop computer to enter an idle phase, or even logoff and power down. Carrying this further, if the sensing component can sense the actual acceleration values of the pocket device, and detects that the sensor exhibited over 25 g's, it can be inferred that the user may have fallen an become injured, thereby invoking a rules that would cause a nearby or perhaps the nearest device to take over as master, and enable VoIP for contacting medical help. This is but one example of the many benefits that can be achieved with the subject invention.

The invention also facilitates determining which set of software and sensor cluster can be used at a given time. Additionally, the system converges on a set of sensing devices and applications rules based on policy such as the last active, which has the most signal strength, for example, and process ties according what sensors provide the best cost for the given situation.

As indicated herein, it is within contemplation of the disclosed innovation to have a multi-master scenario with each master controlling one type of processing. Consider a situation where a user has two machines running the disclosed architecture; a laptop computer, and a desktop computer. The user is at a conference center with the laptop. The conference center has no corporate or exchange access, but only Internet access. The desktop computer is at the user's office with full corporate LAN and exchange access. Since desktop machine has corporate access, then it can become the "master" for the purpose of processing the rules, policies, call control, and sending email through the exchange server. Since the laptop is the current active machine, it should still be the "master" for the purpose of sensing user activity, and can talk back to the server that also hosts the innovative architecture, via the Internet.

Notwithstanding efficiency issues, a single "master" avoids duplication of work which might cause undesirable user interactions. For example, if two or more machines were to process rules and then send email based on the rules (e.g., sending email about a missed call), then the user could have two or more email messages informing of the same missed phone call.

Figure 74:
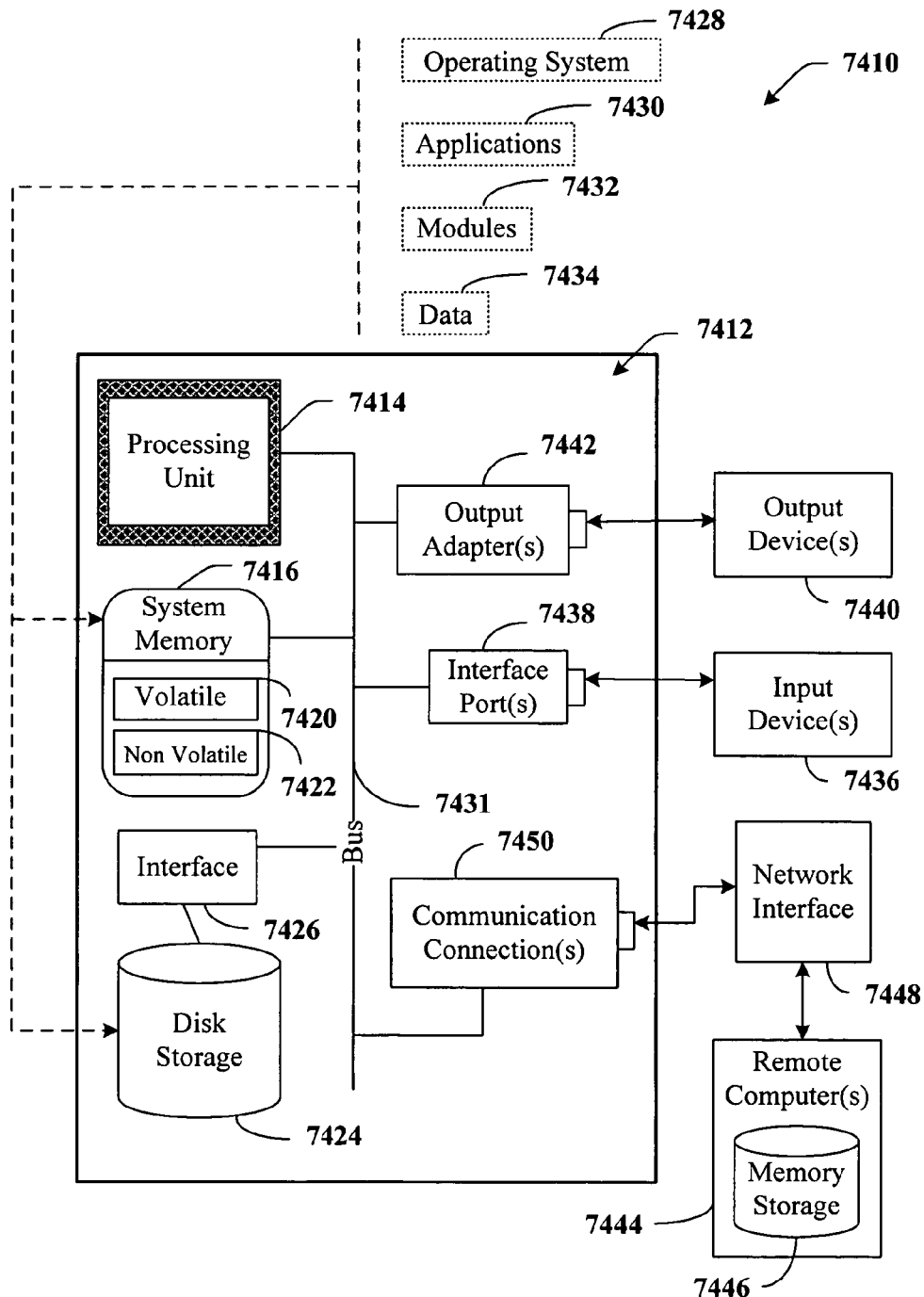
FIG. 74 illustrates a suitable operating environment.

With reference to FIG. 74, an exemplary environment 7410 for implementing various aspects of the innovation includes a computer 7412. The computer 7412 includes a processing unit 7414, a system memory 7416, and a system bus 7418. The system bus 7418 couples system components including, but not limited to, the system memory 7416 to the processing unit 7414. The processing unit 7414 can be any of various available processors. Dual microprocessors and other multiprocessor architectures also can be employed as the processing unit 7414.

The system bus 7418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 7416 includes volatile memory 7420 and nonvolatile memory 7422. The basic input/output system (BIOS), containing the basic routines to transfer information between elements within the computer 7412, such as during start-up, is stored in nonvolatile memory 7422. By way of illustration, and not limitation, nonvolatile memory 7422 can include read only memory (ROM), programmable ROM (PROM), electrically programmable ROM (EPROM), electrically erasable ROM (EEPROM), or flash memory. Volatile memory 7420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 7412 also includes removable/non-removable, volatile/non-volatile computer storage media. FIG. 74 illustrates, for example a disk storage 7424. Disk storage 7424 includes, but is not limited to, devices like a magnetic disk drive, floppy disk drive, tape drive, Jaz drive, Zip drive, LS-100 drive, flash memory card, or memory stick. In addition, disk storage 7424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 7424 to the system bus 7418, a removable or non-removable interface is typically used such as interface 7426.

It is to be appreciated that FIG. 74 describes software that acts as an intermediary between users and the basic computer resources described in suitable operating environment 7410. Such software includes an operating system 7428. Operating system 7428, which can be stored on disk storage 7424, acts to control and allocate resources of the computer system 7412. System applications 7430 take advantage of the management of resources by operating system 7428 through program modules 7432 and program data 7434 stored either in system memory 7416 or on disk storage 7424. It is to be appreciated that the subject innovation can be implemented with various operating systems or combinations of operating systems.

A user enters commands or information into the computer 7412 through input device(s) 7436. Input devices 7436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 7414 through the system bus 7418 via interface port(s) 7438. Interface port(s) 7438 include, for example, a serial port, a parallel port, a game port, and a universal serial bus (USB). Output device(s) 7440 use some of the same type of ports as input device(s) 7436. Thus, for example, a USB port may be used to provide input to computer 7412, and to output information from computer 7412 to an output device 7440. Output adapter 7442 is provided to illustrate that there are some output devices 7440 like monitors, speakers, and printers, among other output devices 7440 that require special adapters. The output adapters 7442 include, by way of illustration and not limitation, video and sound cards that provide a means of connection between the output device 7440 and the system bus 7418. It should be noted that other devices and/or systems of devices provide both input and output capabilities such as remote computer(s) 7444.

Computer 7412 can operate in a networked environment using logical connections to one or more remote computers, such as remote computer(s) 7444. The remote computer(s) 7444 can be a personal computer, a server, a router, a network PC, a workstation, a microprocessor based appliance, a peer device or other common network node and the like, and typically includes many or all of the elements described relative to computer 7412. For purposes of brevity, only a memory storage device 7446 is illustrated with remote computer(s) 7444. Remote computer(s) 7444 is logically connected to computer 7412 through a network interface 7448 and then physically connected via communication connection 7450. Network interface 7448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 7450 refers to the hardware/software employed to connect the network interface 7448 to the bus 7418. While communication connection 7450 is shown for illustrative clarity inside computer 7412, it can also be external to computer 7412. The hardware/software necessary for connection to the network interface 7448 includes, for exemplary purposes only, internal and external technologies such as, modems including regular telephone grade modems, cable modems and DSL modems, ISDN adapters, and Ethernet cards.

Figure 75:
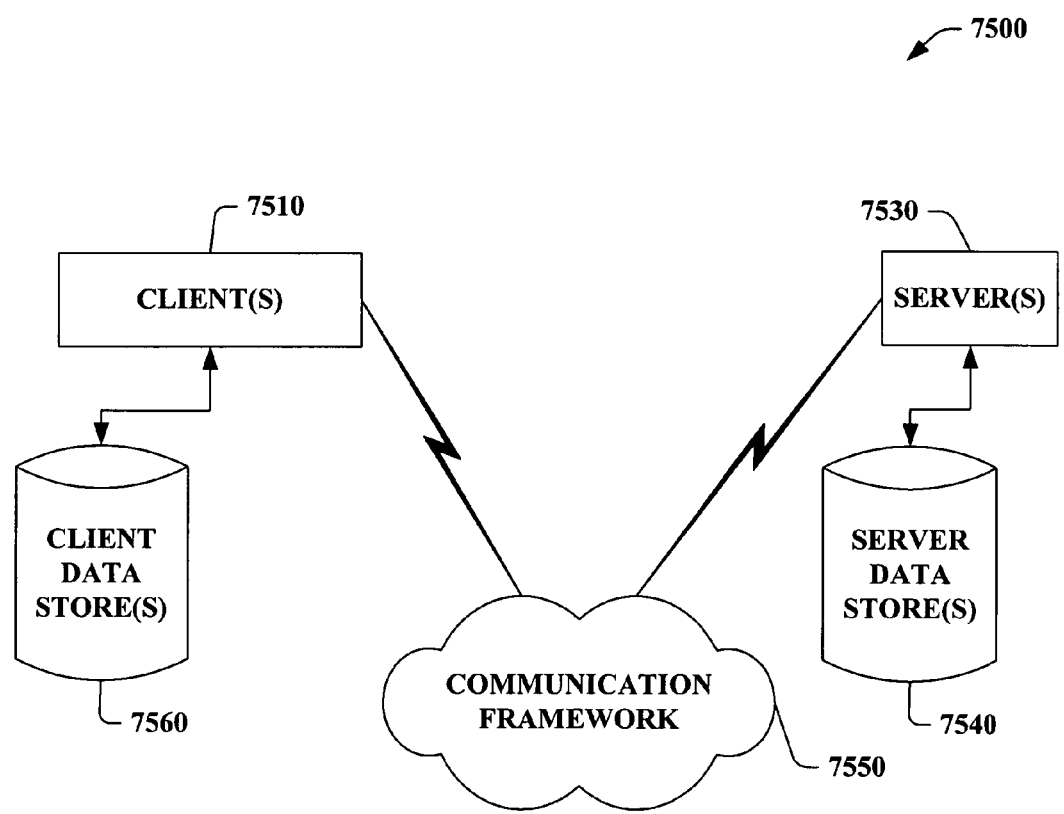
FIG. 75 illustrates a sample computing environment with which the present innovation can interact.

FIG. 75 is a schematic block diagram of a sample-computing environment 7500 with which the innovation can interact. The system 7500 includes one or more client(s) 7510. The client(s) 7510 can be hardware and/or software (e.g., threads, processes, computing devices). The system 7500 also includes one or more server(s) 7530. The server(s) 7530 can also be hardware and/or software (e.g., threads, processes, computing devices). The servers 7530 can house threads to perform transformations, for example. One possible communication between a client 7510 and a server 7530 may be in the form of a data packet adapted to be transmitted between two or more computer processes. The system 7500 includes a communication framework 7550 that can be employed to facilitate communications between the client(s) 7510 and the server(s) 7530. The client(s) 7510 are operably connected to one or more client data store(s) 7560 that can be employed to store information local to the client(s) 7510. Similarly, the server(s) 7530 are operably connected to one or more server data store(s) 7540 that can be employed to store information local to the servers 7530.

What has been described above includes examples of the innovation. It is, of course, not possible to describe every conceivable combination of components or methodologies for purposes of describing the innovation, but one of ordinary skill in the art may recognize that many further combinations and permutations are possible. Accordingly, the innovation is intended to embrace all such alterations, modifications, and variations that fall within the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the term "includes" and variants thereof are used in the detailed description or the claims, these terms are intended to be inclusive in a manner similar to the term "comprising."

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

What is claimed is:

1. A system that facilitates management of a user context, comprising:
    at least one processor configured with instructions that, when executed on the at least one processor, perform a method comprising:

establishing the user context as associated with a first computing device and a second computing device;

sensing user interaction data between a user and the first computing device and the user and the second computing device;

designating one of the first computing device and the second computing device as a master device and designating the other of the first computing device and the second computing device as a secondary device;

applying rules to the master device and to the secondary device based on the user; and based on the rules, performing a first type of operation on the master device and a second type of operation on the secondary device.

2. The system of claim 1, wherein the method further comprises sensing a current user context via user interaction with a device in the current user context.

3. The system of claim 1, wherein designating one of the first computing device and the second computing device as a master device and designating the other of the first computing device and the second computing device as a secondary device is performed based on the user interaction data.

4. The system of claim 1, wherein the method further comprises changing a device status of at least one of the master device and the secondary device based on the user interaction.

5. The system of claim 1, wherein the method further comprises sensing a current user context based on data unrelated to the user interaction data.

6. The system of claim 1, wherein:
the master device comprises a first master device; and
the method further comprises designating a new device as a new master device if the first master device goes offline.

7. A server that employs the system of claim 1.

8. The system of claim 1, wherein the method further comprises predicting a device in a future user context with which the user will interact.

9. The system of claim 8, wherein the method further comprises managing the operation of the predicted device in the future user context based on a predicted future user interaction with the predicted device.

10. The system of claim 1, wherein designating one of the first computing device and the second computing device as a master device and designating the other of the first computing device and the second computing device as a secondary device is performed based on an application with which the user is interacting.

11. A computer-implemented method of managing devices in a user context, comprising:
sensing user interaction data between a user and a first device;
based on the sensed user interaction data, establishing the user context as associated with the first device and other devices of the user context;
applying user preferences based on at least one of the user, the first device, the other devices, and the user context;
determining whether the first device is a device with which the user interacts most frequently; and
when it is determined that the first device is the device with which the user interacts most frequently, managing operation of the first device according to a first type of operation and managing operation of the other devices in the user context according to a second type of operation, wherein managing operation of the first device and managing operation of the other devices are performed based on the user preferences.

12. The method of claim 11, further comprising restricting access to at least one of the first device and the other devices of the user context based on the user.

13. The method of claim 11, further comprising clustering sensors employed in the act of sensing into sensor clusters such that utilization of a first sensor of a first sensor cluster invokes user preferences that are different than user preferences associated with a second sensor of a second sensor cluster.

14. The method of claim 11, further comprising acts of:
designating the first device as a master device based on the user interaction data; and
maintaining the first device as the master device when the user interacts with a second device.

15. The method of claim 11, further comprising at least one of the acts of:
predicting to a level of confidence a new device with which the user will interact; and
updating policies associated with user preferences based on the user interaction in the user context.

16. The method of claim 11, further comprising establishing which of a set of sensors or set of policies is utilized for taking automated actions, the act of establishing which of a set is utilized being determined by acts of:
establishing relevance of one or more of the set of sensors or devices in near proximity or across multiple locations, based on the observations by or status of the one or more of the set of sensors; and
optionally communicating the observations by or status of any one or more of the set of sensors, the observations by or status of the one or more of the set of sensors includes findings, policies, and local or global decisions about the usage of sensors and policies among multiple components of a system.

17. The method of claim 11, further comprising designating the first device as special based on an associated capability such that the first device operates independently of the user preferences.

18. A system that manages devices in a user context, comprising:
means for establishing the user context as associated with a first computing device and a second computing device;
means for sensing user interaction data between a user and the first computing device and the user and the second computing device;
means for designating one of the first computing device and the second computing device as a master device and designating the other of the first computing device and the second computing device as a secondary device;
means for applying rules to the master device and to the secondary device based on the user; and
means for, based on the rules, performing a first type of operation on the master device and a second type of operation on the secondary device.

19. The system of claim 18, wherein designating one of the first computing device and the second computing device as a master device and designating the other of the first computing device and the second computing device as a secondary device is performed based on the sensed user interaction data.

20. The system of claim 18, wherein designating one of the first computing device and the second computing device as a master device and designating the other of the first computing device and the second computing device as a secondary device is performed based on an application with which the user is interacting.

* * * * *